US00RE49105E

(19) United States
(12) Reissued Patent
Smitherman

(10) Patent Number: US RE49,105 E
(45) Date of Reissued Patent: *Jun. 14, 2022

(54) SELF-CALIBRATED, REMOTE IMAGING AND DATA PROCESSING SYSTEM

(71) Applicant: Visual Intelligence LP, Houston, TX (US)

(72) Inventor: Chester L. Smitherman, Houston, TX (US)

(73) Assignee: VI TECHNOLOGIES, LLC, Houston, TX (US)

( * ) Notice: This patent is subject to a terminal disclaimer.

(21) Appl. No.: 16/661,868

(22) Filed: Oct. 23, 2019

Related U.S. Patent Documents

Reissue of:
(64) Patent No.: 9,797,980
Issued: Oct. 24, 2017
Appl. No.: 15/200,883
Filed: Jul. 1, 2016

U.S. Applications:
(63) Continuation of application No. 13/772,994, filed on Feb. 21, 2013, now Pat. No. 9,389,298, which is a
(Continued)

(51) Int. Cl.
*G01C 11/02* (2006.01)
*G03B 37/04* (2021.01)
(Continued)

(52) U.S. Cl.
CPC ..... *G01C 11/02* (2013.01); *G01C 21/20* (2013.01); *G01S 17/86* (2020.01); *G01S 19/14* (2013.01); *G03B 37/04* (2013.01); *H04N 17/002* (2013.01)

(58) Field of Classification Search
CPC ..... G01C 11/02; G01C 21/20; G01S 17/86; G01S 19/14; G03B 37/04; H04N 17/002
See application file for complete search history.

(56) References Cited

U.S. PATENT DOCUMENTS 1,699,136 A 1/1929 Eliel
1,910,425 A 5/1933 Cahill
(Continued)

FOREIGN PATENT DOCUMENTS

CA 2268611 10/2000
CA 2268611 A1 10/2000
(Continued)

OTHER PUBLICATIONS

Sep. 17, 2006 Office Action/Final Rejection mailed for U.S. Appl. No. 10/229,626.
(Continued)

*Primary Examiner* — Catherine M Tarae
(74) *Attorney, Agent, or Firm* — Foley & Lardner LLP

(57) ABSTRACT

An imaging sensor system, having a view of a target area comprising: a rigid mount unit having at least two imaging sensors disposed within the mount unit, wherein a first imaging and a second imaging sensor each has a focal axis passing through an aperture in the mount unit, wherein the first imaging sensor generates a first image area comprising a first data array of pixels and the second imaging sensor generates a second image area comprising a second data array of pixels, wherein the first and second imaging sensors are offset to have a first image overlap area in the target area, wherein the first sensors image data bisects the second sensors image data in the first image overlap area.

76 Claims, 17 Drawing Sheets

Related U.S. Application Data continuation of application No. 12/798,899, filed on Apr. 13, 2010, now Pat. No. 8,483,960, which is a continuation-in-part of application No. 11/581,235, filed on Oct. 11, 2006, now Pat. No. 7,725,258, which is a continuation-in-part of application No. 10/664,737, filed on Sep. 18, 2003, now Pat. No. 7,127,348.

(60) Provisional application No. 60/412,504, filed on Sep. 20, 2002.

(51) Int. Cl.

| | |
|---|---|
| ***H04N 17/00*** | (2006.01) |
| ***G01S 19/14*** | (2010.01) |
| ***G01C 21/20*** | (2006.01) |
| ***G01S 17/86*** | (2020.01) |

(56) References Cited

U.S. PATENT DOCUMENTS

| | | | | |
|---|---|---|---|---|
| 2,036,062 | A | 3/1936 | Lutz | |
| 2,104,976 | A | 1/1938 | Eliel | |
| 2,433,534 | A | 12/1947 | Sonne | |
| 2,720,029 | A | 10/1955 | Eliel | |
| 2,747,012 | A | 5/1956 | Dresser | |
| 2,896,501 | A | 7/1959 | Stamps | |
| 2,955,518 | A | 10/1960 | Perry | |
| 2,988,953 | A | 6/1961 | Barnett | |
| 3,109,057 | A | 10/1963 | Slavecki et al. | |
| 3,518,929 | A | 7/1970 | Glenn, Jr. | |
| 3,527,880 | A | 9/1970 | Gordon | |
| 4,217,607 | A | 8/1980 | Cohen | |
| 4,313,678 | A | 2/1982 | Colvocoresses | |
| 4,322,741 | A | 3/1982 | Kawabayashi | |
| 4,398,195 | A | 8/1983 | Dano | |
| 4,504,914 | A | 3/1985 | Hofmann | |
| 4,543,603 | A | 9/1985 | Laures | |
| 4,583,703 | A | 4/1986 | Kline | |
| 4,650,305 | A | 3/1987 | Hines | |
| 4,686,474 | A | 8/1987 | Olsen et al. | |
| 4,689,748 | A | 8/1987 | Hofmann | |
| 4,708,472 | A | 11/1987 | Hofmann | |
| 4,712,010 | A | 12/1987 | Alm | |
| 4,724,449 | A | 2/1988 | Wright | |
| 4,750,810 | A | 6/1988 | Tomlin et al. | |
| 4,754,327 | A | 6/1988 | Lippert | |
| 4,757,378 | A | 7/1988 | Hackett, Jr. et al. | |
| 4,764,008 | A | 8/1988 | Wren | |
| 4,814,711 | A | 3/1989 | Olsen et al. | |
| 4,887,779 | A | 12/1989 | Large | |
| 4,935,629 | A | 6/1990 | Livermore et al. | |
| 4,951,136 | A | 8/1990 | Drescher et al. | |
| 4,956,705 | A | 9/1990 | Wright | |
| 4,964,721 | A | 10/1990 | Ulich et al. | |
| 4,965,572 | A | 10/1990 | Adamson | |
| 5,013,917 | A | 5/1991 | Ulich | |
| 5,027,199 | A | 6/1991 | Suzuki | |
| 5,029,009 | A | 7/1991 | Ulich et al. | |
| 5,045,937 | A | 9/1991 | Myrick | |
| 5,104,217 | A | 4/1992 | Pleitner et al. | |
| 5,138,444 | A | 8/1992 | Hiramatsu | |
| 5,166,789 | A | 11/1992 | Myrick | |
| 5,187,754 | A | 2/1993 | Currin et al. | |
| 5,193,124 | A | 3/1993 | Subbarao | |
| 5,198,657 | A | 3/1993 | Trost et al. | |
| 5,231,401 | A | 7/1993 | Kaman et al. | |
| 5,247,356 | A | 9/1993 | Ciampa | |
| 5,249,034 | A | 9/1993 | Minato | |
| 5,259,037 | A | 11/1993 | Plunk | |
| 5,262,953 | A | 11/1993 | de Waard et al. | |
| 5,266,799 | A | 11/1993 | Steinitz et al. | |
| 5,276,321 | A | 1/1994 | Chang et al. | |
| 5,308,022 | A | 5/1994 | Cronkhite et al. | |
| 5,317,394 | A | 5/1994 | Hale et al. | |
| 5,332,968 | A | 7/1994 | Brown | |
| 5,347,539 | A | 9/1994 | Sridhar et al. | |
| 5,371,358 | A | 12/1994 | Chang et al. | |
| 5,379,065 | A | 1/1995 | Cutts | |
| 5,414,462 | A | 5/1995 | Veatch | |
| 5,426,476 | A | 6/1995 | Fussell et al. | |
| 5,448,936 | A | 9/1995 | Turner | |
| 5,450,125 | A | 9/1995 | Ulich et al. | |
| 5,467,271 | A | 11/1995 | Abel et al. | |
| 5,471,056 | A | 11/1995 | Prelat | |
| 5,517,419 | A | 5/1996 | Lanckton et al. | |
| 5,555,018 | A | 9/1996 | von Braun | |
| 5,557,397 | A | 9/1996 | Hyde et al. | |
| 5,596,494 | A | 1/1997 | Kuo | |
| 5,604,534 | A | 2/1997 | Hedges et al. | |
| 5,625,409 | A | 4/1997 | Rosier et al. | |
| 5,633,946 | A | 5/1997 | Lachinski et al. | |
| 5,639,964 | A | 6/1997 | Djorup | |
| 5,647,015 | A | 7/1997 | Choate et al. | |
| 5,668,593 | A | 9/1997 | Lareau et al. | |
| 5,721,611 | A | 2/1998 | Kellner | |
| 5,734,507 | A | 3/1998 | Harvey | |
| 5,765,044 | A | 6/1998 | Murai et al. | |
| 5,790,188 | A | 8/1998 | Sun | |
| 5,798,786 | A | 8/1998 | Lareau et al. | |
| 5,815,314 | A | 9/1998 | Sudo | |
| 5,872,590 | A | 2/1999 | Aritake et al. | |
| 5,878,356 | A | 3/1999 | Garrot, Jr. et al. | |
| 5,886,821 | A | 3/1999 | Sohn | |
| 5,894,323 | A | 4/1999 | Kain et al. | |
| 5,937,212 | A | 8/1999 | Kurahashi et al. | |
| 5,953,054 | A | 9/1999 | Mercier | |
| 5,963,664 | A | 10/1999 | Kumar et al. | |
| 5,982,951 | A | 11/1999 | Katayama et al. | |
| 5,999,211 | A | 12/1999 | Hedges et al. | |
| 6,002,815 | A | 12/1999 | Immega et al. | |
| 6,005,987 | A | 12/1999 | Nakamura et al. | |
| 6,055,012 | A | 4/2000 | Haskell et al. | |
| 6,075,905 | A | 6/2000 | Herman et al. | |
| 6,078,701 | A | 6/2000 | Hsu et al. | |
| 6,087,984 | A | 7/2000 | Keller et al. | |
| 6,125,329 | A | 9/2000 | Place et al. | |
| 6,130,705 | A | 10/2000 | Lareau et al. | |
| 6,173,087 | B1 | 1/2001 | Kumar et al. | |
| 6,204,799 | B1 | 3/2001 | Caputi, Jr. | |
| 6,209,834 | B1 | 4/2001 | Stonehouse | |
| 6,211,906 | B1 | 4/2001 | Sun | |
| 6,281,970 | B1 | 8/2001 | Williams et al. | |
| 6,282,301 | B1 | 8/2001 | Haskett | |
| 6,282,362 | B1 * | 8/2001 | Murphy | H04N 5/9201 386/224 |
| 6,323,858 | B1 | 11/2001 | Gilbert et al. | |
| 6,353,409 | B1 | 3/2002 | Keller et al. | |
| 6,356,646 | B1 * | 3/2002 | Spencer | G06K 9/0063 348/144 |
| 6,393,163 | B1 | 5/2002 | Burt et al. | |
| 6,422,508 | B1 | 7/2002 | Barnes | |
| 6,434,280 | B1 | 8/2002 | Peleg et al. | |
| 6,456,938 | B1 | 9/2002 | Barnard | |
| 6,473,119 | B1 | 10/2002 | Teuchert | |
| 6,526,352 | B1 | 2/2003 | Breed et al. | |
| 6,542,831 | B1 | 4/2003 | Moosmuller et al. | |
| 6,553,311 | B2 | 4/2003 | Ahearn et al. | |
| 6,570,612 | B1 | 5/2003 | Saund et al. | |
| 6,597,818 | B2 | 7/2003 | Kumar et al. | |
| 6,597,991 | B1 | 7/2003 | Meron et al. | |
| 6,611,289 | B1 | 8/2003 | Yu et al. | |
| 6,664,529 | B2 | 12/2003 | Pack et al. | |
| 6,694,064 | B1 * | 2/2004 | Benkelman | G06K 9/0063 348/144 |
| 6,694,094 | B2 | 2/2004 | Partynski et al. | |
| 6,711,475 | B2 | 3/2004 | Murphy | |
| 6,747,686 | B1 | 6/2004 | Bennett | |
| 6,766,226 | B2 | 7/2004 | Andersen | |
| 6,771,208 | B2 | 8/2004 | Lutter et al. | |
| 6,781,707 | B2 | 8/2004 | Peters et al. | |
| 6,826,358 | B2 | 11/2004 | Partynski et al. | |
| 6,834,163 | B2 | 12/2004 | Trunz et al. | |
| 6,839,972 | B2 * | 1/2005 | Jackson | H04N 13/246 33/286 |

(56) References Cited

U.S. PATENT DOCUMENTS

| | | | | |
|---|---|---|---|---|
| 6,954,310 | B2 | 10/2005 | Holloway et al. | |
| 7,006,132 | B2 | 2/2006 | Pereira et al. | |
| 7,006,709 | B2 | 2/2006 | Kang et al. | |
| 7,009,638 | B2 | 3/2006 | Gruber et al. | |
| 7,019,777 | B2 | 3/2006 | Sun | |
| 7,127,348 | B2 | 10/2006 | Smitherman et al. | |
| 7,184,072 | B1 | 2/2007 | Loewen et al. | |
| 7,212,938 | B2 * | 5/2007 | Mai | G01C 11/00 702/104 |
| 7,339,614 | B2 | 3/2008 | Gruber et al. | |
| 7,365,774 | B2 | 4/2008 | Louis et al. | |
| 7,424,133 | B2 | 9/2008 | Schultz et al. | |
| 7,437,062 | B2 | 10/2008 | Holcomb | |
| 7,725,258 | B2 | 5/2010 | Smitherman | |
| 7,787,659 | B2 | 8/2010 | Schultz et al. | |
| 7,995,799 | B2 | 8/2011 | Schultz et al. | |
| 8,068,643 | B2 | 11/2011 | Schultz et al. | |
| 8,462,209 | B2 | 6/2013 | Sun | |
| 2002/0060784 | A1 | 5/2002 | Pack et al. | |
| 2002/0085094 | A1 | 7/2002 | Teuchert | |
| 2002/0101438 | A1 | 8/2002 | Ham et al. | |
| 2002/0163582 | A1 | 11/2002 | Gruber et al. | |
| 2003/0048357 | A1 | 3/2003 | Kain et al. | |
| 2003/0081827 | A1 | 5/2003 | Paz-Pujalt et al. | |
| 2003/0138247 | A1 | 7/2003 | Trunz et al. | |
| 2003/0169259 | A1 | 9/2003 | Lavelle et al. | |
| 2003/0198364 | A1 * | 10/2003 | Yonover | G06K 9/3241 382/103 |
| 2003/0210336 | A1 | 11/2003 | Khan et al. | |
| 2004/0041914 | A1 | 3/2004 | Peters, III et al. | |
| 2004/0054488 | A1 | 3/2004 | Mai | |
| 2004/0257441 | A1 | 12/2004 | Pevear et al. | |
| 2007/0046448 | A1 | 3/2007 | Smitherman | |
| 2008/0278828 | A1 | 11/2008 | Rau et al. | |
| 2009/0295924 | A1 | 12/2009 | Peters, III et al. | |
| 2010/0235095 | A1 | 9/2010 | Smitherman | |
| 2011/0091076 | A1 | 4/2011 | Schultz et al. | |
| 2012/0020571 | A1 | 1/2012 | Schultz et al. | |

FOREIGN PATENT DOCUMENTS

| | | | |
|---|---|---|---|
| CA | 2534968 | | 6/2013 |
| CA | 2534968 | C | 6/2013 |
| CN | 101344391 | | 1/2009 |
| CN | 101344391 | A | 1/2009 |
| CN | 102506868 | | 6/2012 |
| CN | 102506868 | A | 6/2012 |
| CN | 103038761 | | 7/2016 |
| CN | 103038761 | B | 7/2016 |
| DE | 28 11 428 | | 9/1979 |
| DE | 2811428 | A1 | 9/1979 |
| DE | 19714396 | | 10/1998 |
| DE | 19714396 | A1 | 10/1998 |
| DE | 10341822 | | 9/2005 |
| DE | 10341822 | A1 | 9/2005 |
| EP | 0 494 700 | | 7/1992 |
| EP | 0494700 | A2 | 7/1992 |
| EP | 1 069 547 | | 1/2001 |
| EP | 1069547 | A1 | 1/2001 |
| EP | 1 178 283 | | 2/2002 |
| EP | 1178283 | A1 | 2/2002 |
| EP | 1 189 021 | | 3/2002 |
| EP | 1189021 | A1 | 3/2002 |
| EP | 1 231 780 | | 1/2004 |
| EP | 1231780 | A3 | 1/2004 |
| GB | 2 284 273 | | 1/1997 |
| GB | 2284273 | A | 1/1997 |
| JP | 7028400 | | 1/1995 |
| JP | 7028400 | A | 1/1995 |
| JP | 8030194 | | 2/1996 |
| JP | 8030194 | A | 2/1996 |
| JP | 8335298 | | 12/1996 |
| JP | 8335298 | A | 12/1996 |
| JP | 2005333336 | | 12/2005 |
| JP | 2006-217131 | | 8/2006 |
| JP | 2006-217131 | A | 8/2006 |
| JP | 2007323615 | | 12/2007 |
| JP | 2008109477 | | 5/2008 |
| JP | 2009-501350 | | 1/2009 |
| JP | 2009-501350 | A | 1/2009 |
| JP | 2010-085719 | | 4/2010 |
| JP | 2010-85719 | A | 4/2010 |
| WO | WO-99/18732 | | 4/1999 |
| WO | WO-99/18732 | A1 | 4/1999 |
| WO | WO-99/34346 | A1 | 4/1999 |
| WO | WO-1999/34346 | | 7/1999 |
| WO | WO-02/006892 | | 1/2002 |
| WO | WO-02/06892 | A2 | 1/2002 |
| WO | WO-02/012830 | | 2/2002 |
| WO | WO-02/12830 | A1 | 2/2002 |
| WO | WO-02/065155 | | 8/2002 |
| WO | WO-02/065155 | A1 | 8/2002 |
| WO | WO-2004/021692 | | 3/2004 |
| WO | WO-2004/021692 | A2 | 3/2004 |
| WO | WO-2004/028134 | | 4/2004 |
| WO | WO-2004/028134 | A2 | 4/2004 |

OTHER PUBLICATIONS

Feb. 19, 2008, Reponse to Office Action/Non-Final Rejection dated Jun. 7, 2007 for U.S. Appl. No. 11/128,656, filed May 13, 2005.

Mar. 3, 2009 Office Action/Final Rejection mailed for U.S. Appl. No. 11/128,656, filed May 13, 2005.

Dec. 14, 2009 Office Action/Final Rejection mailed for U.S. Appl. No. 11/581,235, filed Oct. 11, 2006.

Jul. 30, 2012 Preliminary Amendment for U.S. Appl. No. 12/462,533, filed Aug. 5, 2009.

Jul. 9, 2014 Supplementary European Search Report and Written Opinion mailed in European Patent Application EP11862219.0.

3Di Press Release, 3Di Acquires Eagle Scan; Spatial Data Tecnnoiogy Firm Enhances Digital Photography and LIDAR Mapping with Eagle Scan Acquisition, May 9, 2000.

Alamus, et al., On the accuracy and performance of the GeoMobil System, IAPRS vol. XXXV, Part B5, Comm. V (XXth ISPRS Congress, Istanbul, Jul. 12-23, 2004) 262-67, available at URL http://www.isprs.org/proceedings/XXXV/congress/comm5/comm5.aspx.

Bagley, Study of Search-Light Triangulation, The Military Engineer 18(100) (July-Aug. 1926) 280-283.

CA Nov. 26, 2010 Examiner's Report issued for Canadian Patent Application 2,534,968.

CA May 26, 2011 Response to Examiner's Report for Nov. 26, 2010 for Canadian Patent Application 2,534,968.

CA Jun. 6, 2011 Amendment "C" Response to Examiner's Report of Nov. 26, 2010 for Canadian Patent Application 2,534,968.

CA May 28, 2012 Amendment "D" to Examiner's Report issued Dec. 19, 2011 for Canadian Application 2,534,968.

CA Aug. 3, 2012 Response to Examiner's Report issued on Feb. 13, 2012 for Canadian Patent Application 2,534,978.

CA May 27, 2013 Examiner's Report mailed for Canadian Patent Application 2,534,978.

CA Nov. 26, 2013 Response to Examiner's report mailed for Canadian Patent Application 2,534,978.

Campbell, {i}Origins of Aerial Photographic Interpretation, U.S. Army, 1916 to 1918{/i}, Photogrammetric Engineering & Remote Sensing 74(1) (Jan. 2008) 77-93.

Campos-Marquetti et al., Digital Terrain Mapping of Bernalillo County, New Mexico using Digital Orthophotography and Airborne LIDAR.

CN Jan. 12, 2007 Office Action issued for Chinese Patent Application 03820463.0 (with English translation).

CN Oct. 19, 2007 Office Action issued for Chinese Patent Application 03820463.0 (with English translation).

CN Mar. 16, 2017 First Office Action issued for Chinese Patent Application No. 201380053255.8 filed Jul. 26, 2013 (with English translation).

EA Oct. 20, 2005 Office Action issued for Eurasian Patent Application 200500412 (with English translation).

(56) References Cited

OTHER PUBLICATIONS

EA Sep. 28, 2006 Notification of Preparedness for Granting (Decision of Grant) issued for Eurasian Patent Application 200500513 (with English translation).
EP Jan. 18, 2011 Response to Communication of Jul. 15, 2010 for European Patent Application 03755838.4.
EP May 27, 2011 Response to Communication of Jul. 15, 2010 for Euopean Patent Application 03755838.4.
Leberl, et al., The UltraCam Story, Photogrammetry, Remote Sensing & Spatial Information Sciences 39(B1) (2012) 39-44, available at URL http://download.microsoft.com/download/C/7/0/C70BAE4C-4A56-4410-9A4D-64533D70B66A/papersandpublications/TheUltraCamStory.pdf.
Mohamed, Advancements in the Development of DORIS, Photogrammatic Week '01, pp. 1-11 (2001).
Mohamed, M.R. Mostafa, et al. Emerge DSS: A Fully Integrated Digital System for Airborne Mapping: Sep. 22-23, 2003; http://www.isprs.org/commission1/theory_tech_realities/.
Mostafa, Camera/IMU boresight calibration: New advances and performance analysis (2002), available at URL http://applanix.com/articles-and-papers/pos-av/256-cameraimu-boresight-calibration-new-advances-and-performance-analysis.html (12 pages).
Mostafa, Performance analysis of the DSS in map production environment (2004), available at URL http://applanix.com/articles-and-papers/dss.html (6 pages).
Neukum, et al., The airborne HRSC-AX cameras: evaluation of the technical concept and presentation of application results after one year of operations, Photogrammetric Week 01 (D. Fritsch & R. Spiller, Eds.) (2001) 117-31, available at URL http://www.ifp.uni-stuttgart.de/publications/phowo01/Neukum.pdf.
PCT Apr. 6, 1999 International Search Report issued for International Application No. PCT/JP98/05679.
PCT Oct. 20, 2004 International Search Report issued for International Application PCT/US2003/026950.
PCT Dec. 9, 2004 International Preliminary Examination Report issued for International Application PCT/US03/028420.
PCT Dec. 13, 2004 International Preliminary Examination Report issued for International Application No. PCT/US2003/26950 dated Jan. 10, 2005.
PCT Aug. 4, 2005 International Preliminary Examination Report issued for International Application PCT/US2003/029375.
Schade, {i}Combining GPS and photogrammetry for a kinematic surveying system{/i}, Geodetical Information Magazine 8(12) (Dec. 1994) 32-33 & 35.
Schultz, et al., A system for real-time generation of geo-referenced terrain models, SPIE Enabling Technologies for Law Enforcement, Boston, MA (Nov. 5-8, 2000) (8 pages).
Surveys From Above: A Brief History of Aerial Survey Photography in the C&GS{/i} (Jul. 17, 2009), http://www.ngs.noaa.gov/web/about_ngs/history/camera_timeline_web.pdf.
Track'Air The Tracker: snapBASE Aerial Survey Management Utility Users Manual (2008) (51 pages).
Xuan et al.; A combined sensor system of digital camera with LiDAR; 2007 IEEE Intl. Geoscience and Remote Sensing Sym., Barcelona, 2007, pp. 589-592.*
AU Apr. 11, 2008 Examiner's Report issued for Australian Patent Application 2003/273338.
AU Aug. 20, 2007 Examiner's Report issued for Australian Patent Application 2003/262941.
CA Dec. 12, 2008 Voluntary Amendment "A" for Canadian Patent Application 2,534,968.
CA Mar. 31, 2011 Voluntary Amendment "D" for Canadian Patent Application 2,534,978.
CA Jun. 6, 2011 Amendment "C" Response to Examiner's Report dated Nov. 26, 2010 for Canadian Patent Application 2,534,968.
CA Dec. 19, 2011 Examiner's Report issued for Canadian Patent Application 2,534,968.
CA Feb. 13, 2012 Examiner's Report issued for Canadian Patent Application 2,534,978.
CN Apr. 25, 2007 Response to Office Action for Chinese Patent Application 03820463.0.
EA Nov. 25, 2005 Response to Office Action dated Oct. 20, 2005 for Eurasian Application 200500412.
EP May 14, 2007 European Supplemental Search Report issued during prosecution of EP 03791891.
EP Sep. 7, 2007 Communication Pursuant to Article 96(2) issued for European Patent Application 03791891.9.
EP Sep. 29, 2008 European Supplemental Search Report issued for European Patent Application EP 03755838.4.
EP Oct. 30, 2008 Supplemental Search Report for European Patent Application 03755838.4.
EP Dec. 23, 2008 Response to Oct. 30, 2008 Communication for European Patent Application 03755838.4.
EP Jul. 15, 2010 Communication Pursuant to Article 94(3) EPC for European Patent Application 03755838.3.
EP Jul. 29, 2010 Result of Consultation for European Patent Application 03755838.4.
EP Oct. 10, 2011 Summons to Attend Oral Proceedings for European Patent Application 03755838.4.
EP Jan. 4, 2012 Response to Oct. 10, 2011 Summons to Attend Oral Proceedings for European Patent Application 03755838.4.
EP Jan. 6, 2012 Supplemental Response to Oct. 10, 2010 Summons to Attend Oral Proceedings for European Patent Application 03755838.4.
EP Mar. 8, 2012 Decision to Refuse for European Patent Application 03755838.4.
EP Jul. 13, 2012 Statement of Grounds of Appeal for European Patent Application 03755838.4.
IN Feb. 12, 2007 Office Action for Indian Patent Application 773/DELNP/2005.
IN Apr. 13, 2007 Response to Office Action dated Feb. 12, 2007 for Indian Patent Application 773/DELNP/2005.
PCT Feb. 27, 2004 International Search Report issued for International Application PCT/US03/28420.
PCT Apr. 30, 2004 International Search Report issued for International Application PCT/US03/28727.
PCT May 13, 2004 International Written Opinion issued for International Application PCT/US03/28420.
PCT Sep. 17, 2004 International Written Opinion issued for International Application PCT/US2003/028727.
PCT Nov. 17, 2004 Response to Written Opinion for International Application PCT/US03/28727.
PCT Jan. 10, 2005 International Preliminary Examination Report issued for International Application PCT/US03/26950.
PCT Feb. 7, 2005 International Search Report issued for International Application PCT/US2003/029375.
PCT Feb. 18, 2005 International Preliminary Examination Report issued for International Application PCT/US03/28420.
PCT May 5, 2005 International Written Opinion issued for International Application PCT/US03/29375.
PCT Jun. 3, 2005 Response to Written Opinion issued for International Application PCT/US03/29375.
PCT Sep. 2, 2005 International Preliminary Examination Report issued for International Application PCT/US03/29375.
PCT Jun. 27, 2011 International Search Report issued for International Application PCT/US2011/000575.
PCT Oct. 23, 2012 International Preliminary Report on Patentability issued for International Application PCT/US2011/000575.
Jan. 7, 2004 Office Action/Non-Final Rejection mailed for U.S. Appl. No. 10/247,441, filed Sep. 19, 2002.
Jul. 7, 2004 Response to Office Action dated Jan. 7, 2004 for U.S. Appl. No. 10/247,441, filed Sep. 19, 2002.
Dec. 7, 2004 Office Action mailed for U.S. Appl. No. 10/664,737, filed Sep. 18, 2003.
Dec. 22, 2004 Office Action/Final Rejection mailed for U.S. Appl. No. 10/247,441, filed Sep. 19, 2002.
Feb. 22, 2005 Response to Office Action/Final Rejection dated Dec. 22, 2004 for U.S. Appl. No. 10/247,441, filed Sep. 19, 2002.
Mar. 2, 2005 Response to Office Action dated Dec. 7, 2004 for U.S. Appl. No. 10/664,737, filed Sep. 18, 2003.

(56) References Cited

OTHER PUBLICATIONS

Apr. 14, 2005 Response to Office Action/Non-Compliant Amendment dated Mar. 14, 2005 for U.S. Appl. No. 10/664,737, filed Sep. 18, 2003.
May 19, 2005 Office Action mailed for U.S. Appl. No. 10/244,980, filed Sep. 17, 2002.
Jun. 8, 2005 Office Action/Final Rejection mailed for U.S. Appl. No. 10/664,737, filed Sep. 18, 2003.
Mar. 16, 2005 Notice of Allowability mailed for U.S. Appl. No. 10/247,441, filed Sep. 19, 2002.
Aug. 19, 2005 Examiner's Interview Summary mailed for U.S. Appl. No. 10/664,737, filed Sep. 18, 2003.
Sep. 7, 2005 Response to Office Action/Final Rejection dated Jun. 8, 2005 for U.S. Appl. No. 10/664,737, filed Sep. 18, 2003.
Oct. 28, 2005 Response to Office Action and Request for Reconsideration of Restriction Requirement dated Sep. 30, 2005 for U.S. Appl. No. 10/229,626, filed Aug. 28, 2002.
Dec. 5, 2005 Advisory Action mailed for U.S. Appl. No. 10/664,737, filed Sep. 18, 2003.
Dec. 8, 2005 Response to Office Action and Request for Continued Examination for U.S. Appl. No. 10/664,737, filed Sep. 18, 2003.
Feb. 13, 2006 Notice of Allowability mailed for U.S. Appl. No. 10/664,737, filed Sep. 18, 2003.
Jan. 10, 2006 Office Action mailed for U.S. Appl. No. 10/244,980, filed Sep. 17, 2002.
Jan. 11, 2006 Office Action/Non-Final Rejection mailed for U.S. Appl. No. 10/229,626.
Feb. 13, 2006 Notice of Allowability for U.S. Appl. No. 10/664,737, filed Sep. 18, 2003.
Jun. 20, 2006 Notice of Allowance mailed for U.S. Appl. No. 10/664,737, filed Sep. 18, 2003.
Jun. 20, 2006 Response to Office Action dated Jan. 11, 2006 for U.S. Appl. No. 10/229,626, filed Aug. 28, 2002.
Nov. 17, 2006 Office Action/Final Rejection mailed for U.S. Appl. No. 10/229,626.
Nov. 20, 2006 Office Action mailed for U.S. Appl. No. 11/128,656.
Jan. 5, 2007 Notice of Allowability mailed for U.S. Appl. No. 10/244,980, filed Sep. 17, 2002.
Feb. 28, 2007 Response to Office Action/Final Rejection for U.S. Appl. No. 10/229,626, filed Aug. 28, 2002.
Mar. 21, 2007 Response to Office Action dated Nov. 20, 2006 for U.S. Appl. No. 11/128,656, filed May 13, 2005.
Mar. 29, 2007 Advisory Action for U.S. Appl. No. 10/229,626, filed Aug. 28, 2002.
Apr. 12, 2007 Response to Advisory Action dated Nov. 17, 2006 for U.S. Appl. No. 10/229,626.
Jun. 7, 2007 Office Action mailed for U.S. Appl. No. 11/128,656, filed May 13, 2005.
Jul. 6, 2007 Office Action/Non-Final Rejection mailed for U.S. Appl. No. 10/229,626.
Sep. 13, 2007 Examiner Interview Summary for U.S. Appl. No. 10/229,626, filed Aug. 28, 2002.
Sep. 17, 2007 Response to Office Action/Non-Final Rejection dated Jul. 6, 2007 for U.S. Appl. No. 10/229,626, filed Aug. 28, 2002.
Dec. 7, 2007 Office Action mailed for U.S. Appl. No. 10/229,626, filed Aug. 28, 2002.
Jan. 8, 2008 Examiner Interview Summary for U.S. Appl. No. 10/229,626, filed Aug. 28, 2002.
Feb. 19, 2008 Response to Office Action/Non-Final Rejection dated Jun. 7, 2007 for U.S. Appl. No. 11/128,656, filed May 13, 2005.
Jun. 5, 2008 Response to Office Action/Final Rejection dated Dec. 6, 2007/Request for Continued Examination for U.S. Appl. No. 10/229,626, filed Aug. 28, 2002.
Jul. 17, 2008 Office Action mailed for U.S. Appl. No. 11/128,656, filed May 13, 2005.
Aug. 20, 2008 Office Action/Non-Final Rejection mailed for U.S. Appl. No. 10/229,626, filed Aug. 28, 2002.
Nov. 26, 2008 Response to Office Action dated Jul. 17, 2008 for U.S. Appl. No. 11/128,656, filed May 13, 2005.
Dec. 19, 2008 Response to Office Action/Non-Final Rejection dated Aug. 20, 2008 for U.S. Appl. No. 10/229,626, filed Aug. 28, 2002.
Mar. 3, 2009 Office Action mailed for U.S. Appl. No. 11/128,656, filed May 13, 2005.
Mar. 17, 2009 Office Action mailed for U.S. Appl. No. 10/229,626, filed Aug. 28, 2002.
May 12, 2009 Response to Office Action/Non-Final Rejection dated Mar. 3, 2009 for U.S. Appl. No. 11/128,656, filed May 13, 2005.
May 19, 2009 Response to Office Action dated Mar. 17, 2009 for U.S. Appl. No. 10/229,626, filed Aug. 28, 2002.
Jun. 11, 2009 Advisory Action mailed for U.S. Appl. No. 10/229,626, filed Aug. 28, 2002.
Jul. 13, 2009 Response to Office Action dated Mar. 17, 2009 for U.S. Appl. No. 10/229,626, filed Aug. 28, 2002.
Jul. 30, 2009 Notice of Allowability mailed for U.S. Appl. No. 11/128,656, filed May 13, 2005.
Aug. 4, 2009 Office Action/Non-Final Rejection mailed for U.S. Appl. No. 11/581,235, filed Oct. 11, 2006.
Aug. 31, 2009 Response to Office Action dated Aug. 4, 2009 for U.S. Appl. No. 11/581,235, filed Oct. 11, 2006.
Oct. 5, 2009 Office Action/Non-Final Rejection mailed for U.S. Appl. No. 10/229,626.
Dec. 14, 2009 Office Action mailed for U.S. Appl. No. 11/581,235, filed Oct. 11, 2006.
Dec. 17, 2009 Response to Office Action/Final Rejection dated Dec. 14, 2009 for U.S. Appl. No. 11/581,235, filed Oct. 11, 2006.
Jan. 12, 2010 Notice of Allowability mailed for U.S. Appl. No. 11/581,235, filed Oct. 11, 2006.
Mar. 1, 2010 Examiner's Interview Summary mailed for U.S. Appl. No. 10/229,626, filed Aug. 28, 2002.
Mar. 2, 2010 Response to Office Action dated Oct. 5, 2009 for U.S. Appl. No. 10/229,626, filed Aug. 28, 2002.
Mar. 5, 2010 Office Action/Non-Final Rejection mailed for U.S. Appl. No. 11/805,109, filed May 22, 2007.
Mar. 17, 2010 Preliminary Amendment for U.S. Appl. No. 12/462,533, filed Aug. 5, 2009.
Mar. 18, 2010 Preliminary Amendment for U.S. Appl. No. 12/583,815, filed Aug. 26, 2009.
Jun. 1, 2010 Response to Office Action/Non-Final Rejection dated Mar. 5, 2010 for U.S. Appl. No. 11/805,109, filed May 22, 2007.
Jun. 10, 2010 Office Action mailed for U.S. Appl. No. 12/462,563, filed Aug. 5, 2009.
Jun. 21, 2010 Notice of Allowability mailed for U.S. Appl. No. 10/229,626, filed Aug. 28, 2002.
Aug. 5, 2010 Office Action/Final Rejection for U.S. Appl. No. 11/805,109, filed May 22, 2007.
Nov. 2, 2010 Response to Office Action Non-Final Rejection dated Aug. 5, 2010 / Request for Continued Examination for U.S. Appl. No. 11/805,109, filed May 22, 2007.
Dec. 13, 2010 Notice of Allowability for U.S. Appl. No. 12/462,563, filed Aug. 5, 2009.
Nov. 18, 2010 Response to Office Action/Non-Final Rejection dated Jun. 10, 2010 for U.S. Appl. No. 12/462,563, filed Aug. 5, 2009.
Jan. 10, 2011 Notice of Allowability for U.S. Appl. No. 11/805,109, filed May 22, 2007.
Jul. 30, 2012 Preliminary Amendment U.S. Appl. No. 12/462,533, filed Aug. 5, 2009.
Burt, Peter J., et al. "A Multiresolution Spline with Application to Image Mosiacs" ACM Transactions on Graphics, vol. 2, No. 4, Oct. 1983, pp. 217-236.
Sanchez, Richard D. "Airborne Digital Sensor System and GPS-aided Inertial Technology for Direct Geopositioning in Rough Terrain". Open-File Report 2004-1391; USGS; Reston, VA.
Sep. 6, 2012 Office Action mailed for U.S. Appl. No. 12/798,899, filed Apr. 13, 2010.
Feb. 27, 2013 Response to Office Action dated Sep. 6, 2012 for U.S. Appl. No. 12/798,899, filed Apr. 13, 2010.
Feb. 27, 2013 Notice of Allowability mailed for U.S. Appl. No. 12/583,815, filed Aug. 26, 2009.
Aug. 27, 2012 Notice of Allowability mailed for U.S. Appl. No. 11/805,109, filed May 22, 2007.
PCT Jan. 7, 2014 International Search Report and Written Opinion issued for International Application No. PCT/US2013/052278.

(56) References Cited

OTHER PUBLICATIONS

Press Release, Houston Company to provide before and after photography of hurricane path on web, dated Aug. 27, 1998.
VISI Air DAVe web page, archived on Feb. 21, 1999.
Brochure, Visual Intelligence Products and Services, dated Aug. 14, 1999.
Brochure, Visual Intelligence Products and Services, dated Oct. 21, 1999.
Press Release, AirRECON III delivers substantial cost and time savings to Enron subsidiary by integrating Visual Intelligence's proprietary class location software with its seamless color, rectified digitally collected photography, dated Jan. 10, 2000.
Brochure, Limited Time Special, dated Feb. 1, 2000.
Abstract, Inexpensive 6-inch resolute, digital ortho-imagery with sub-meter accuracy, dated Apr. 13, 2000.
AirRECON III—The 3rd Generation micropixel digital color aerial photo system, as published on VISI website, archived by the Wayback Machine on Oct. 28, 2000.
Brochure, With Visual Intelligence's high resolution, fast delivery and low cost, you get better alignment sheets and more accurate census counts, dated Aug. 30, 2000.
Brochure, Visual Intelligence Systems, Inc. 15-cm color orthophotography 480 band, .5-m hyperspectral 15-cm LIDAR, dated Feb. 7, 2001.
Brochure, Real-Time Disaster Assessment System, dated Oct. 13, 2001.
Brochure, Real-Time Disaster Assessment System, dated Jun. 6, 2002.
Al-Bayari et al., Quality Assessment of DTM and Orthophoto Generated by Airborne Laser Scanning System Using Automated Digital Photogrammetry, Commission III, PCV Symposium 2002.
E.P. Baltsavias, Airborne laser scanning: existing systems and firms and other resources, ISPRS Journal of Photogrammetry & Remote Sensing 54 (1999), pp. 164-198.
Berg and Ferguson, Airborne Laser Mapping for Highway Engineering Applications, Proceedings of the ASPRS Annual Convention, St. Louis, USA. (2001).
Brown et al., Inertial Instrument System for Aerial Surveying, U.S. Geological Survey Professional Paper 1390 (1987).
Ellis and Dodd, Applications and Lessons Learned with Airborne Multispectral Imaging, Fourteenth International Conference on Applied Geologic Remote Sensing, Las Vegas, Nevada, Nov. 6-8, 2000.
Ellum and El-Sheimy, Land-Based Mobile Mapping Systems, Photogrammetric Engineering & Remote Sensing Jan. 2002, pp. 13-28.
Haala et al., On the Use of Multispectral and Stereo Data From Airborne Scanning Systems for DTM Generation and Landuse Classification, IAPRS vol. 32/4, ISPRS Comm. IV Symposium on GIS—Between Visions and Applications (1998).
Haala et al., Calibration of Directly Measured Position and Attitude by Aerotriangulation of Three-Line Airborne Imagery, Commission III, Working Group 1 (2000).
Haala et al., On the Performance of Digital Airborne Pushbroom Cameras for Photogrammetric Data Processing—A Case Study, IAPRS vol. XXXIII (ISPRS Congress, Amsterdam 2000).
Hess et al., Geocoded digital videography for validation of land cover mapping in the Amazon Basin, International Journal of Remote Sensing, vol. 23, Issue 7, Feb. 2002.
Ip, Analysis of Integrated Sensor Orientation for Aerial Mapping, UCGE Reports No. 20204, Jan. 2005.
Ip et al., System Performance Analysis of INS/DGPS Integrated System for Mobile Mapping System (MMS), Commission VI, WG VI/4 (2004).
Jacobsen, Potential and Limitation of Direct Sensor Orientation, IAPRS vol. XXXIII, Part B3, pp. 429-435 (ISPRS Congress, Amsterdam 2000).
Jacobsen, Calibration Aspects in Direct Georeferencing of Frame Imagery, ISPRS Commission I/FIEOS 2002 Conference Proceedings.
Kocaman, GPS and INS Integration with Kalman Filtering for Direct Georeferencing of Airborne Imagery, Geodetic Seminar Report, Institute of Geodesy and Photogrammetry, Jan. 30, 2003.
Leberl et al., Novel Concepts for Aerial Digital Cameras, ISPRS Commission I Symposium, Denver, Colorado, Nov. 2002.
Lutes, DAIS: A Digital Airborne Imaging System, ISPRS Commission I/FIEOS 2002 Conference Proceedings, Nov. 2002.
Mann and Chiarito, Technologies for Positioning and Placement of Underwater Structures, prepared for U.S. Army Corps of Engineers, ERDC TR-INP-00-1, Mar. 2000.
Petrie, Déjà Vu—The Configurations of the New Airborne Digital Imagers Are All Rooted in the Distant Past!, GeoInformatics, Jul./Aug. 2000.
Petrie, Further Advances in Airborne Digital Imaging: Several New Imagers Introduced at ASPRS, GeoInformatics, Jul./Aug. 2006.
Pollock, Development of a Highly Automated System for the Remote Evaluation of Individual Tree Parameters, Integrated Tools Proceedings, Boise, Idaho, Aug. 16-20, 1998, pp. 638-645.
Savopol et al., A Digital Multi CCD Camera System for Near Real-Time Mapping, IAPRS vol. XXXIII, Part B1, pp. 266-271 (ISPRS Congress, Amsterdam 2000).
Schenk and Csatho, Fusion of LIDAR data and aerial imagery for a more complete surface description, International Archives of Photogrammetry Remote Sensing and Spatial Information Sciences 34.3/A (2002), pp. 310-317.
Schultz et al., Integrating Small Format Aerial Photography, Videography, and a Laser Profiler for Environmental Monitoring, ISPRS Comm. II, WG 1 Workshop on Integrated Sensor Calibration and Orientation (1999).
Talaya et al., Integration of a terrestrial laser scanner with GPS/IMU orientation sensors, Proceedings of the XXth ISPRS Congress, vol. 35 (2004).
Tempelmann, Udo, et al., Photogrammetric software for the LH Systems ADS40 airborne digital sensor, IAPRS, vol. XXXIII, Part B2, pp. 552-559 (ISPRS Congress, Amsterdam 2000).
Hinsken, L. et al., Triangulation of LH Systems' ADS40 imagery using Orima GPS/IMU, IAPRS 34.3/A (2002), pp. 156-162.
Sandau, Rainer, et al., Design principles of the LH Systems ADS40 airborne digital sensor, IAPRS vol. XXXIII, Part B1, pp. 258-265 (ISPRS Congress, Amsterdam 2000).
Roeser et al., New Potential and Application of ADS, IAPRS vol. XXXIII, Part B1, pp. 251-257 (ISPRS Congress, Amsterdam 2000).
Leica Press Release, Leica ADS40 to Make American Debut Apr. 12, 2002, Apr. 12, 2002.
Santmire, Technology Changing View for Aerial Photography Pros, Houston Business Journal, Jul. 2, 2000.
Bossler and Schmidley, Airborne Integrated Mapping System (AIMS): Recent Results in Applications for Large-Scale Mapping, URISA 1997 Annual Conference Proceedings, Toronto, Canada, Jul. 1997.
Grejner-Brzezinska, Direct Exterior Orientation of Airborne Imagery with GPS/INS System: Performance Analysis, Navigation, vol. 46, No. 4, pp. 261-270 (1999).
Grejner-Brzezinska, D., and B. Phuyal, Positioning accuracy of the airborne integrated mapping system, Proceedings of the 1998 National Technical Meeting of the Institute of Navigation, Long Beach, CA, Jan. 1998, pp. 713-721.
Grejner-Brzezinska and Wang, Gravity Modeling for High-Accuracy GPS/INS Integration, Navigation, 45(3) (1998), pp. 209-220.
Grejner-Brzezinska, Direct Sensor Orientation in Airborne and Land-based Mapping Applications, Report No. 461, Geodetic GeoInformation Science, Dept. of Civil and Environmental Engineering and Geodetic Science, Jun. 2001.
Grejner-Brzezinska et al., Multi-Sensor Systems for Land-Based and Airborne Mapping: Technology of the Future?, IAPRS vol. XXXIV, Part 2, Comm. II, pp. 31-42 (Xi'an, Aug. 20-23, 2002).
Li et al., Object Recognition from AIMS Data Using Neural Networks, Report No. 462, Geodetic and GeoInformation Science, Dept. of Civil and Environmental Engineering and Geodetic Science, Dec. 1998.

(56) References Cited

OTHER PUBLICATIONS

Toth, Direct Platform Orientation of MultiSensor Data Acquisition Systems, IAPRS vol. 32/4, ISPRS Commission IV Symposium on GIS—Between Visions and Applications, pp. 629-634 (Stuttgart, Germany 1998).
Toth, Experiences with frame CCD arrays and direct georeferencing, Photogrammetric Week '99, pp. 95-109 (1999).
Toth, Calibrating Airborne Lidar Systems, IAPRS vol. XXXIV, Part 2, Comm. II, pp. 475-480 (Xi'an, Aug. 20-23, 2002).
Toth, Charles K., and Dorota A. Grejner-Brzezinska, Performance analysis of the airborne integrated mapping system (AIMS), IAPRS 32 (1997), pp. 320-326, available at https://www.cfm.ohio-state.edu/research/AIMS/paper3.htm.
Toth, Charles, and D. Grejner-Brzezinska, DEM Extraction from High-Resolution Direct-Digital Airborne Imagery, ISPRS Commission III Symposium on Object Recognition and Scene Classification from Multispectral and Multisensor Pixels, IAPRS vol. XXXII, Part 3/1, pp. 184-189 (1998).
Toth, C., and Dorota A. Grejner-Brzezinska, Complementarity of LIDAR and stereo imagery for enhanced surface extraction, IAPRS vol. XXXIII, Part B3/2, pp. 897-904 (ISPRS Congress, Amsterdam 2000).
Lithopoulos, E., Blake Reid, and Bruno Scherzinger, The position and orientation system (POS) for survey applications, IAPRS 31 (1996), pp. 467-471.
Mostafa, et al., A fully digital system for airborne mapping, Proceedings of the International Symposium on Geodesy, Geomatics, and Navigation—KIS 1997, Banff, Canada, Jun. 3-6, 1997, pp. 463-471.
Mostafa et al., Ground Accuracy from Directly Georeferenced Imagery, GIM International, vol. 14, N. 12, Dec. 2000.
Mostafa and Schwarz, Multi-Sensor System for Airborne Image Capture and Georeferencing, Photogrammetric Engineering & Remote Sensing, vol. 66, No. 12, Dec. 2000, pp. 1417-1423.
Mostafa, Airborne Image Georeferencing by GPS-aided Inertial Systems: Concepts and Performance Analysis, 22nd Asian Conf. on Remote Sensing, Nov. 5-9, 2001.
Mostafa, Boresight Calibration of Integrated Inertial/Camera Systems, Proceedings of the International Symposium on Kinematic Systems in Geodesy, Geomatics and Navigation—KIS 2001, Banff, Canada, Jun. 5-8, 2001, pp. 440-445.
Mostafa and Hutton, Direct Positioning and Orientation Systems: How Do They Work? What is the Attainable Accuracy?, Proceedings, American Society of Photogrammetry and Remote Sensing Annual Meeting, St. Louis, MO, USA, Apr. 24-27, 2001.
Mostafa and Schwarz, The Development and Testing of an Integrated GPS/SINS/Multi-Camera System for Airborne Mapping, The 3rd International Symposium on Mobile Mapping Technology, Cairo, Egypt, Jan. 3-5, 2001.
Mostafa et al., Airborne Direct Georeferencing of Frame Imagery: An Error Budget, The 3rd International Symposium on Mobile Mapping Technology, Cairo, Egypt, Jan. 3-5, 2001.
Diener et al., Radiometric Normalisation and Colour Composite Generation of the DMC, IAPRS vol. XXXIII, Part B1, pp. 83-88 (ISPRS Congress, Amsterdam 2000).
Digital Mapping Camera Brochure (2002).
Heier, Deploying DMC in today's workflow, Photogrammetric Week 2001, pp. 35-45.
Heier, Helmut, and Alexander Hinz, A digital airborne camera system for photogrammetry and thematic applications, ISPRS Joint Workshop on Sensors and Mapping from Space, Hanover, Germany, Sep. 27-30, 1999.
Hinz, The Z/I Imaging Digital Aerial Camera System, Photogrammetric Week '99, pp. 109-115 (1999).
Hinz et al., Digital Modular Camera: System Concept and Data Processing Workflow, IAPRS vol. XXXIII, Part B2, pp. 164-171 (ISPRS Congress, Amsterdam 2000).
Hinz et al., DMC—The Digital Sensor Technology of Z/I-Imaging, Photogrammetric Week '01, pp. 93-103 (2001).
Tang et al., Geometric Accuracy Potential of the Digital Modular Camera, IAPRS vol. XXXIII, Part B4, pp. 1051-1057 (ISPRS Congress, Amsterdam 2000).
Zeitler and Doerstel, Geometric Calibration of the DMC: Method and Results, Pecora 15/Land Satellite Information IV/ISPRS Commission I/FIEOS 2002 Conference Proceedings (2002).
Mohamed, Navigating the Ground from Air: Active Monitoring with GPS/INS Geo-referenced LiDAR, Proceedings of the 2003 National Technical Meeting of the Institute of Navigation, Anaheim, CA, Jan. 2003, pp. 593-601.
Mohamed, Advancements in the Development of DORIS, Photogrammatic Week '01, pp. 1-11.
Mohamed and Price, Near the Speed of Flight: Aerial Mapping with GPS/INS Direct Georeferencing, GPS World, Mar. 2002, pp. 40-45.
Mohamed et al., The Development of DORIS: An Overview, 3rd International Symposium on Mobile Mapping Technology, Cairo—Egypt, Jan. 3-5, 2001.
Guangping He, Design of a Mobile Mapping System for GIS Data Collection, IAPRS vol. XXXI, Part B2 (Vienna 1996), pp. 154-159.
Guangping He, Design and Application of the GPSVision Mobile Mapping System, IAPRS vol. XXXIV, Part 2, Comm. II (Xi'an Aug. 20-23, 2002), pp. 163-168.
He and Orvets, Capturing Road Network Using Mobile Mapping Technology, IAPRS vol. XXXIII, Part B2, pp. 272-277 (ISPRS Congress, Amsterdam 2000).
He, Guangping, Kurt Novak, and Wenhao Feng, On the integrated calibration of a digital stereo-vision system, IAPRS vol. XXIX, Part B5, pp. 139-145 (Washington, D.C., Aug. 2-14, 1992).
Grejner-Brzezinska and Toth, Precision Mapping of Highway Linear Features, IAPRS, vol. XXXIII, Part B2, pp. 233-240 (2000).
Grejner-Brzezinska, D. A., Direct georeferencing at the Ohio State University: A historical perspective, Photogrammetric Engineering and Remote Sensing Journal of the American Society for Photogrammetry and Remote Sensing, vol. 68, No. 6 (Jun. 2002), pp. 557-560.
Graefe et al., The road data acquisition system MoSES—determination and accuracy of trajectory data gained with the Applanix POS/LV, Proceedings of 3rd International Symposium on Mobile Mapping Technology, Jan. 2001.
Graefe, Quality Management in Kinematic Laser Scanning Applications (2007).
Optech ALTM Brochure (Aug. 1994).
Okubo, Airborne Laser Measurement Technology in Japan, Proceedings of FIG Working Week 2001, Seoul, Korea, May 6-11, 2001.
Press Release, EnerQuest Systems Announces LIDAR Point Classification Technology Sep. 16, 2002, Sep. 16, 2002.
Mietz et al., An Evaluation of LIDAR Vertical Accuracy in Grand Canyon, Arizona, Jul. 2002, pp. 1-15.
Press Release, EnerQuest Wins Contract for LIDAR Mapping of Grand Canyon, Oct. 4, 2000.
Cascade Siskiyou National Monument Hyperspectral Imagery / LIDAR Project Final Report, Oct. 23, 2002.
Beard et al, The Ultracam Camera Control and Data Acquisition System, in Advanced Telescope and Instrumentation Control Software II, Lewis, H., SPIE 4848, Astronomical Telescopes and Instrumentation, Waikoloa 2002.
Leberl and Gruber, Flying the New Large Format Digital Aerial Camera Ultracam, Photogrammetric Week '03, D. Fritsch, Ed., Wichmann-Verlag, Heidelberg, pp. 67-76 (2003).
Leberl et al., The Ultracam Large Format Aerial Digital Camera System, Proceedings of the American Society for Photogrammetry & Remote Sensing, Anchorage, Alaska, May 5-9, 2003, pp. 1-6.
El-Sheimy, A Mobile Multi-Sensor System for GIS Applications in Urban Centers, IAPRS vol. XXXI, Part B2, ISPRS Comm. II, pp. 95-100 (Vienna, Jul. 9-19, 1996).
Tao, Automated Approaches to Object Measurement and Feature Extraction from Georeferenced Mobile Mapping Image Sequences, Ph.D Dissertation (Dept. of Geomatics Engineering, Calgary, Alberta) (Oct. 1997).
Tao, Innovations on Multi-Sensor and Multi-Platform Integrated Data Acquisition (1999).

(56) References Cited

OTHER PUBLICATIONS

Tao, Mobile Mapping Technology for Road Network Data Acquisition, Journal of Geospatial Engineering, vol. 2, No. 2, pp. 1-13 (2000).
Alamus and Talaya, Airborne Sensor Integration and Direct Orientation of the CASI System, IAPRS vol. XXXIII, Part B1, pp. 5-11 (ISPRS Congress, Amsterdam 2000).
Allan and Holland, Digital Photogrammetry, Developments at Ordnance Survey, IAPRS vol. XXXIII, Part B2, pp. 46-51 (ISPRS Congress, Amsterdam 2000).
Hill et al., Wide-Area Topographic Mapping and Applications Using Airborne Light Detection and Ranging (LIDAR) Technology, Photogrammetric Engineering & Remote Sensing, Aug. 2000, pp. 908-914.
Louis, John, et al., Operational use and calibration of airborne video imagery for agricultural and environmental land management applications, Proceedings of the 15th Biennial Workshop on Color Photography and Air Videography (1995).
Pendleton, Map Compilation from Aerial Photographs, USGS Bulletin: 788-F (1928), pp. 379-432.
Petrie, ISPRS 2000 Technical Exhibition, GeoInformatics Oct./Nov. 2000, pp. 30-35.
Petrie, Optical Imagery from Airborne & Spaceborne Platforms: Comparisons of Resolution, Coverage, & Geometry for a Given Ground Pixel Size, GeoInformatics, Jan./Feb. 2002, pp. 28-35.
Renslow et al, Evaluation of Multi-Return LIDAR for Forestry Applications, RSAC-2060/4810-LSP-0001-RPT1, Nov. 2000.
Sun et al., Spatial Resolution Enhancement and Dynamic Range Extending of a Computerized Airborne Multicamera Imaging System, in Sensor Fusion: Architectures, Algorithms and Applications IV, Belur V. Dasarathy (Ed.), Proceedings of SPIE vol. 4051 (2000), pp. 118-125.
ASPRS Camera Calibration Panel Report, sponsored by U.S. Geological Survey, Jan. 2000.
LIDAR for Hire, Point of Beginning Magazine, Jan. 26, 2001.
3Di Press Release, 3Di Acquires Eagle Scan; Spatial Data Technology Firm Enhances Digital Photography and LIDAR Mapping with Eagle Scan Acquisition, May 9, 2000.
Printout of Optech's "ALTM System Components" webpage, dated May 1, 2002.
Printout of Optech's "ALTM Specifications" webpages, dated May 1, 2002.
Printout of Optech's "How ALTMs Work" webpage, dated May 1, 2002.
Printout of Optech's "ALTM Products" webpages, dated May 1, 2002.
Printout of Optech's "ALTM REALM Software" webpage, dated May 1, 2002.
Printout of Optech's "ALTM Survey Operation" webpages, dated May 1, 2002.
Oct. 18, 2005 Response to Office Action dated May 19, 2005 for U.S. Appl. No. 10/244,980, filed Sep. 17, 2002.
Apr. 11, 2006 Response to Office Action dated Jan. 10, 2006 for U.S. Appl. No. 10/244,980, filed Sep. 17, 2002.
Jul. 13, 2006 Office Action/Non-Final Rejection mailed for U.S. Appl. No. 10/244,980, filed Sep. 17, 2002.
Nov. 10, 2006 Response to Office Action/Non-Final Rejection dated Jul. 13, 2006 for U.S. Appl. No. 10/244,980, filed Sep. 17, 2002.
Nov. 20, 2006 Examiner's Interview Summary Record for U.S. Appl. No. 10/244,980, filed Sep. 17, 2002.
May 20, 2013 Office Action/Restriction Requirement mailed for U.S. Appl. No. 12/462,533, filed Aug. 5, 2009.
Jun. 7, 2013 Response to Office Action/Restriction Requirement dated May 20, 2013 for U.S. Appl. No. 12/462,533, filed Aug. 5, 2009.
Sep. 20, 2013 Office Action/Non-Final Rejection mailed for U.S. Appl. No. 12/462,533, filed Aug. 5, 2009.
Dec. 4, 2013 Response to Office Action/Non-Final Rejection dated Sep. 20, 2013 for U.S. Appl. No. 12/462,533, filed Aug. 5, 2009.
Feb. 7, 2014 Office Action/Final Rejection mailed for U.S. Appl. No. 12/462,533, filed Aug. 5, 2009.
Jun. 5, 2014 Response to Office Action/Final Rejection dated Feb. 7, 2014 for U.S. Appl. No. 12/462,533, filed Aug. 5, 2009.
Apr. 1, 2013 Notice of Allowance/Allowability for U.S. Appl. No. 12/798,899, filed Apr. 13, 2010.
CA May 27, 2013 Examiner's Report for Canadian Patent Application No. 2,534,978.
CA Nov. 26, 2013 Amendment "F" Response to Examiner's Report dated May 27, 2013 for Canadian Patent Application No. 2,534,978.
EP Jun. 11, 2013 Response to EPO communication under Rules 161(2) and 162 EPC dated Dec. 6, 2012, with amended claims, filed in European Patent Application EP11862219.0.
EP Jul. 9, 2014 Supplementary European Search Report and Written Opinion mailed in European Patent Application EP11862219.0.
Hagolle, et al., *How to double the spatial resolution of a push-broom instrument*, Geoscience and Remote Sensing Symposium, 1994. IGARSS '94. Surface and Atmospheric Remote Sensing: Technologies, Data analysis and Interpretation., International, Pasadena, CA, USA (Aug. 8-12, 1994), New York, NY, USA, IEEE, vol. 3 (Aug. 8, 1994), 1553-1555.
Aug. 27, 2014 Notice of Allowance and Notice of Allowability with Examiner's Statement of Reasons for Allowance mailed in U.S. Appl. No. 12/462,533, filed Aug. 5, 2009.
CA Oct. 23, 2014 Examiner's Report issued for Canadian Patent Application 2,534,978.
Nov. 19, 2014 Notice of Allowance/Allowability mailed in U.S. Appl. No. 13/590,735, filed Aug. 21, 2012.
Grejner-Brzezinska, *Airborne Integrated Mapping System: Positioning Component*, Proceedings of the 53rd Annual Meeting of the Institute of Navigation, Albuquerque, NM, Jun. 1997, 225-235.
CA Jan. 30, 2015 Response to Examiner's Report dated Oct. 23, 2014 in Canadian Patent Application No. 2534978 filed Aug. 28, 2003.
CN Feb. 27, 2015 Notification of First Office Action mailed in Chinese Patent Application No. 201180029220.1 filed Mar. 31, 2011 (with English translation).
EP Feb. 3, 2015 Response to Supplementary European Search Report dated Jul. 9, 2014 in European Patent Application No. 11862219.0 filed Mar. 31, 2011.
JP Dec. 16, 2014 Office Action mailed in Japanese Patent Application No. 2013-518368 filed Mar. 31, 2011 (with English translation).
JP Mar. 24, 2015 Response to Office Action filed in Japanese Patent Application No. 2013-518368 filed Mar. 31, 2011 (with English translation of amended claims).
CA Jul. 20, 2015 Examiner's Report issued for Canadian Patent Application No. 2,534,978, filed Aug. 28, 2003.
CN Jul. 13, 2015 Response to Feb. 27, 2015 First Office Action filed in Chinese Patent Application No. 201180029220.1 filed Mar. 31, 2011 (with English translation).
JP Apr. 14, 2015 Decision of Rejection issued in Japanese Patent Application No. 2013-518368 filed Mar. 31, 2011 (with English translation).
Abd-Elrahman, et al., *Detection of positional errors in systems utilizing small-format digital aerial imagery and navigation sensors using area-based matching techniques*, Photogrammetric Engineering & Remote Sensing, 67(7) (Jul. 2001) 825-31.
Ackermann, *Airborne laser scanning for elevation models*, Geomatics Info Magazine 10(10), Feature 1 (Oct. 1996) 24-25.
Alamus, et al., *On the accuracy and performance of the GeoMobil System*, IAPRS vol. XXXV, Part B5, Comm. V (XXth ISPRS Congress, Istanbul, Jul. 12-23, 2004) 262-67, available at http://www.isprs.org/proceedings/XXXV/congress/comm5/comm5.aspx.
Ambrosia, et al., *Remotely sensed wildland fire data and information product processing and delivery report*, The Institute for the Application of Geospatial Technology (IAGT) at Cayuga Community College, Auburn, NY (Dec. 2003) (151 pages).
Artan, et al., *Characteristic length scale of input data in distributed models: Implications for modeling grid size*, J. Hydrology 227(1-4) (Jan. 31, 2000) 128-39.

(56) References Cited

OTHER PUBLICATIONS

Axelsson, *Integrated sensors for platform orientation and topographic data acquisition* (Proceedings of Symposium on Digital Photogrammetry, Istanbul, May 21-22, 1998) 1-11.
Axholt, et al., *User boresighting for AR calibration: A preliminary analysis*, IEEE Virtual Reality 2008, Reno, Nevada (Mar. 8-12, 2008) 43-46.
Crosby, et al., *Remote sensing inputs and a GIS interface for distributed hydrological modelling*, Remote Sensing and Hydrology 2000 (Proceedings of Symposium, Santa Fe, New Mexico, Apr. 2000), IAHS Pub. No. 267 (2001) 421-26.
Fischer, et al., *Fusion of digital multispectral videography with interferometric synthetic aperture radar*, U.S. Army Topographic Engineering Center, Alexandria, VA (1997), Pub. No. 091 (Oct. 26, 1998) (11 pages).
Fischer, et al., *The use of digital multispectral video for littoral zone applications*, U.S. Army Topographic Engineering Center, Alexandria, VA (1997), Pub. No. 051 (Oct. 20, 1998) (6 pages).
Heier, et al., *Calibration of the digital modular camera*, FIG XXII International Congress, Washington, D.C. (Apr. 19-26, 2002) 1-11.
Hiatt, *Sensor integration aids mapping at ground zero*, Photogrammetric Engineering & Remote Sensing (Sep. 2002) 877 & 879.
Holzwarth, et al., *Determination and monitoring of boresight misalignment angles during the HyMap campaigns HyEurope 2003 and HyEurope 2004*, Proceedings of 4th EARSeL Workshop on Imaging Spectroscopy (2005) 91-100.
Huyck, et al., *Engineering and organizational issues related to the World Trade Center terrorist attack: Emergency response in the wake of the World Trade Center attach: The remote sensing perspective*, MCEER Special Report Series, vol. 3 (Jun. 2002) (60 pages).
Jacobsen, et al., *Dependencies and problems of direct sensor orientation*, Institute of Photogrammetry and GeoInformation, Univ. of Hannover, Germany, OEEPE Official Pub. No. 43 (2002) 73-84 (11 pages).
Jacobsen, *System calibration for direct and integrated sensor orientation*, Institute of Photogrammetry and GeoInformation, Univ. of Hannover, Germany, Proceedings of RSPRS Workshop for Working Group 5 (2003) (6 pages).
Kurz, et al., *Calibration of a wide-angle digital camera system for near real time scenarios*, Proceedings ISPRS Hannover Workshop (2007) 1682-777 (6 pages).
Mostafa, *Camera/IMU boresight calibration: New advances and performance analysis* (2002), available at http://applanix.com/articles-and-papers/pos-av/256-cameraimu-boresight-ca- libration-new-advances-and-performance-analysis.html (12 pages).
Mostafa, *Performance analysis of the DSS in map production environment* (2004), available at http://applanix.com/articles-and-papers/dss.html (6 pages).
Neukum, et al., *The airborne HRSC-AX cameras: evaluation of the technical concept and presentation of application results after one year of operations*, Photogrammetric Week 01 (D. Fritsch & R. Spiller, Eds.) (2001) 117-31, available at http://www.ifp.uni-stuttgart.de/publications/phowo01/Neukum.pdf.
Reiger, et al., *Boresight alignment method for mobile laser scanning systems*, Proceedings RSPRS Conference in Moscow (Dec. 2008), published J. Applied Geodesy 4(1) (Jan. 2010) 13-21.
Schade, *Combining GPS and photogrammetry for a kinematic surveying system*, Geodetical Information Magazine 8(12) (Dec. 1994) 32-33 & 35.
Schultz, et al., *A system for read-time generation of geo-referenced terrain models*, SPIE Enabling Technologies for Law Enforcement, Boston, MA (Nov. 5-8, 2000) (8 pages).
Schultz, et al., *Cost-effective determination of biomass from aerial images*, Integrated Spatial Databases Digital Images and GIS, International Workshop ISD'99, Portland, ME (Jun. 14-16, 1999) 67-76.
Skaloud, et al., *Rigorous approach to bore-sight self-calibration in airborne laser scanning*, ISPRS J. Photogrammetry & Remote Sensing 61 (2006) 47-59.
Snider, et al., *Use of aerial videography to evaluate the effects of Flaming Gorge Dam operations on natural resources of the Green River*, Report of the Environmental Assessment Division, Argonne National Laboratory (1993) (10 pages).
Yastikli, et al., *In-situ camera and boresight calibration with LIDAR data*, Proceedings of 5th International Symposium on Mobile Mapping Technology vol. 7 (2007) (6 pages).
Zajkowski, et al., *Infrared Field Users' Guide and Vendor Listings*, USDA Forest Service Report RSAC-1309-RPT1 (Oct. 2003) (23 pages).
Zajkowski, et al., *Infrared Field Users' Guide*, USDA Forest Service Report RSAC-1309-RPT3 (Mar. 2011) (Update) (15 pages).
Zhu, et al., *Stereo mosaics from a moving video camera for environmental monitoring*, First Int'l Workshop on Digital and Computational Video, Tampa, FL (Dec. 10, 1999) (10 pages).
Track'Air MIDAS (Multi-cameras Integrated Digital Acquisition System) brochure (2007) (10 pages).
Track'Air The Tracker: snapBASE Aerial Survey Management Utility Users Manual (2008) (5 pages).
Track'Air The Tracker: snapPLOT Aerial Survey Printing and Plotting Utility Users Manual (2008) (40 pages).
Track'Air The Tracker: snapSHOT Aerial Survey Navigation and Photography Users Manual (2008) (141 pages).
Track'Air The Tracker: snapXYZ Aerial Survey Coordinates Entry Utility Users Manual (Apr. 29, 2002) (58 pages).
Track'Air TRACKER system: Hardware installation Users Manual (2008) (49 pages).
Track'Air NANOtrack Installation manual (May 2010).
Track'Air—Lead'Air MIDAS-5 brochure (2010-2015).
Gonsalves, *A comprehensive uncertainty analysis and method of geometric calibration for a circular scanning airborne LIDAR* (Dec. 2010) (Ph.D. Dissertation, U. S. Miss.) (416 pages).
Leberl, et al., *The UltraCam Story*, Photogrammetry, Remote Sensing & Spatial Information Sciences 39(B1) (2012) 39-44, available at http://download.microsoft.com/download/C/7/0/C70BAE4C-4A56-4410-9A4D-6453- 3D70B66A/papersandpublications/TheUltraCamStory.pdf.
Lee, et al., *Boresight calibration of the aerial multi-head camera system*, Proceedings of SPIE vol. 8059 (2011).
Image America brochure (2002).
Neale et al., *Spatial mapping of evapotranspiration and energy balance components over riparian vegetation using airborne remote sensing*, Remote Sensing and Hydrology 2000 (Proceedings of a symposium held at Santa Fe, New Mexico, USA, Apr. 2000), IAHS Publ. No. 267, 2001.
GeoVantage Aerial Digital Imaging GeoScanner Airborne Imagery Collection System Support Manual Build 1—May 2000 (Mar. 15, 2001).
GeoVantage Digital Camera System Description (Aug. 20, 2001), pp. 1-11.
GeoVantage Aerial Digital Imaging Operations Manual (2000), pp. 1-26.
Leica Geosystems Brochure: ALS40 Airborne Laser Scanner—Airborne LIDAR for Professionals (Aug. 9, 2002).
Tuck Mapping Solutions: Eagleeye Mapping System Project Summaries (2006).
Tuck Mapping Solutions Brochure: Air Force Base Mapping re eagleeye mapping system (2003).
Tuck, *LIDAR: A New Perspective*, Professional Surveyor Magazine 24(11) (Nov. 2004), 26-28.
EP Apr. 15, 2016 Partial Supplementary European Search Report mailed in related European Patent Application No. EP 13831711.0.
PCT Apr. 6, 1999 International Search Report issued for International Application No. PCT/JP98/05679 (Revised Version Aug. 26, 1999) (with English translation).
Mostafa and Hutton, *Emerge DSS: A Fully Integrated Digital System for Airborne Mapping*, Proceedings—ISPRS Int'l Workshop—Working Group I/5, Castelldefels, Spain, Sep. 22-23, 2003.
PCT Oct. 20, 2004 International Search Report mailed for International Application PCT/US2003/026950.
May 25, 2016 Notice of Allowance with Examiner's Amendment/Comment mailed in U.S. Appl. No. 13/772,994, filed Feb. 21, 2013.

(56) References Cited

OTHER PUBLICATIONS

CA Jan. 11, 2016 Response (Amendment "H") to Examiner's Report dated Jul. 20, 2015 in Canadian Patent Application No. 2,534,978 filed Aug. 28, 2003.
CA Oct. 25, 2016 Examiner's Report mailed in Canadian Patent Application No. 2,534,978 filed Aug. 28, 2003.
CA Nov. 23, 2016 Examiner's Report mailed in Canadian Patent Application No. 2,796,162 filed Mar. 31, 2011.
CN Oct. 26, 2015 Notification of the Second Office Action issued in Chinese Patent Application No. 201180029220.1 filed Mar. 31, 2011 (with English translation).
CN Jan. 7, 2016 Response to Second Office Action in Chinese Patent Application No. 201180029220.1 filed Mar. 31, 2011 (with English translation of Amended Claims).
EP Aug. 18, 2016 Supplementary European Search Report and Search Opinion mailed in European Patent Application No. 13831711.0 filed Jul. 26, 2013.
Photograph of the Bagley Three Lens Camera 1919-1928.
Bagley, James W., *Aerophotography and Aerosurveying*, New York: McGraw-Hill Book Company, Inc., OCLC: 938332 (1st ed. 1941)—Part 1 (pp. 1-86).
Bagley, James W., Aerophotography and Aerosurveying, New York: McGraw-Hill Book Company, Inc., OCLC: 938332 (1st ed. 1941)—Part 2 (pp. 87-189).
Bagley, James W., Aerophotography and Aerosurveying, New York: McGraw-Hill Book Company, Inc., OCLC: 938332 (1st ed. 1941)—Part 3 (pp. 190-277).
Bagley, James W., Aerophotography and Aerosurveying, New York: McGraw-Hill Book Company, Inc., OCLC: 938332 (1st ed. 1941)—Part 4 (pp. 278-324).
Bagley, *Concerning Aerial Photographic Mapping: A Review*, Geographical Review 12(4) (Oct. 1922) 628-635, American Geographical Society, Article Stable URL: http://www.jstor.org/stable/208595.
Bagley, *Stereophotography in Aerial Mapping*, The Military Engineer 16(88) (Jul.-Aug. 1924) 303-306.
Bagley, *Study of Search-Light Triangulation*, The Military Engineer 18(100) (Jul.-Aug. 1926) 280-283.
Bagley, *Surveying with the Five-Lens Camera*, The Military Engineer 24(134) (Mar.-Apr. 1932) 111-114.
Bagley, *The Tri-Lens Camera in Aerial Photography and Photographic Mapping*, The Military Engineer (May-Jun. 1920) 358-363.
Bagley, *The Use of the Panoramic Camera in Topographic Surveying With Notes on the Application of Photogrammetry to Aerial Surveys*, U.S. Geological Survey Bulletin No. 657, Washington: Government Printing Office (1917) 1-88.
Bagley, *Topographic Surveying from the Air*, The Military Engineer 15(84) (Nov.-Dec. 1923) 505-515.
Campbell, *Origins of Aerial Photographic Interpretation*, U.S. Army, 1916 to 1918, Photogrammetric Engineering & Remote Sensing 74(1) (Jan. 2008) 77-93.
Talley, *Mapping by the Use of Aerial Photographs*, The Military Engineer 27(155) (Sep.-Oct. 1935) 357-361.
Photograph of the 1934 Fairchild T-3A Five Lens Camera.
*Surveys From Above: A Brief History of Aerial Survey Photography in the C&GS* (Jul. 17, 2009), http://www.ngs.noaa.gov/web/about_ngs/history/camera_timeline_web.pdf.
CN Mar. 16, 2017 First Office Action issued for Chinese Patent Application No. 201380053255.8 filed Jul. 26, 2013.
EP Jan. 10, 2017 EPO Communication Pursuant to Article 94(3) EPC (first examiniation report) issued for European Patent Application No. 11862219.0, filed Mar. 31, 2011.
EP May 22, 2017 Response to EPO Communication (first examination report) dated Jan. 10, 2017 for European Patent Application No. 11862219.0, filed Mar. 31, 2011.
EP Jun. 26, 2017 Summons to Oral Proceedings Pursuant to Rule 115(1) EPC issued for European Patent Application No. 03755838.4, filed Sep. 18, 2003.
JP Jun. 27, 2017 First Office Action Notice of Reasons for Refusal issued for Japanese Patent Application No. 2015-528490, filed Jul. 26, 2013.

* cited by examiner

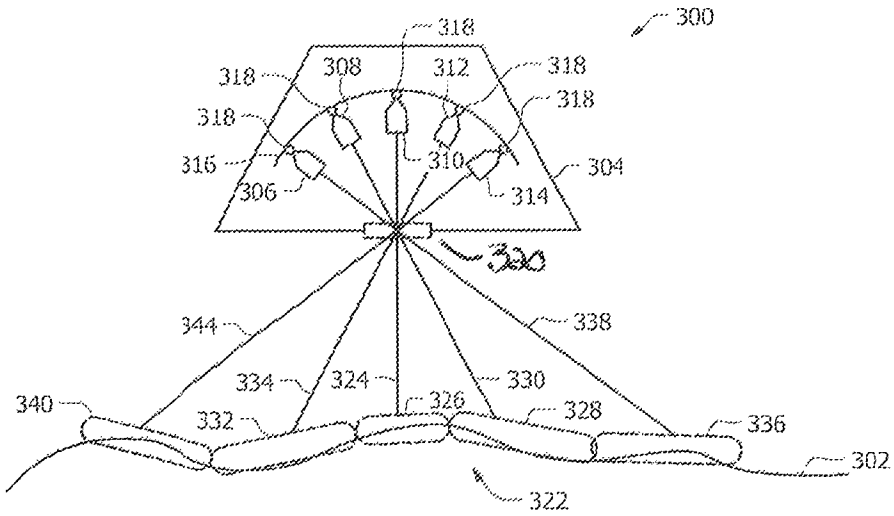
FIG. 3
AMENDED

SELF-CALIBRATED, REMOTE IMAGING AND DATA PROCESSING SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is a *reissue of U.S. patent application Ser. No. 15/200,883* (*now issued as U.S. Pat. No. 9,797,980*), *filed on Jul. 1, 2016, which was a* continuation of U.S. patent application Ser. No. 13/772,994 ([to issue] *now issued* as U.S. Pat. No. 9,389,298), *filed on Feb. 21, 2013*, which was a continuation of U.S. patent application Ser. No. [12/798,8999] *12/798,899* (now issued as U.S. Pat. No. 8,483,960), filed on Apr. 13, 2010, which was a continuation-in-part of U.S. patent application Ser. No. 11/581,235 (now issued as U.S. Pat. No. 7,725,258), filed on Oct. 11, 2006, which was a continuation-in-part of and claimed priority to U.S. patent application Ser. No. 10/664,737 (now issued as U.S. Pat. No. 7,127,348), filed on Sep. 18, 2003, which claimed priority to U.S. Provisional Patent Application Ser. No. 60/412,504, filed on Sep. 20, 2002 for "Vehicle Based Data Collection and Processing System."

TECHNICAL FIELD OF THE INVENTION

The present invention relates, generally, to the field of remote imaging techniques and, more particularly, to a system for rendering high-resolution, high accuracy, low distortion digital images over very large fields of view.

BACKGROUND OF THE INVENTION

Remote sensing and imaging are broad-based technologies having a number of diverse and extremely important practical applications—such as geological mapping and analysis, and meteorological forecasting. Aerial and satellite-based photography and imaging are especially useful remote imaging techniques that have, over recent years, become heavily reliant on the collection and processing of data for digital images, including spectral, spatial, elevation, and vehicle location and orientation parameters. Spatial data—characterizing real estate improvements and locations, roads and highways, environmental hazards and conditions, utilities infrastructures (e.g., phone lines, pipelines), and geophysical features—can now be collected, processed, and communicated in a digital format to conveniently provide highly accurate mapping and surveillance data for various applications (e.g., dynamic GPS mapping). Elevation data may be used to improve the overall system's spatial and positional accuracy and may be acquired from either existing Digital Elevation Model (DEM) data sets or collected with the spectral sensor data from an active, radiation measuring Doppler based devices, or passive, stereographic calculations.

Major challenges facing remote sensing and imaging applications are spatial resolution and spectral fidelity. Photographic issues, such as spherical aberrations, astigmatism, field curvature, distortion, and chromatic aberrations are well-known problems that must be dealt with in any sensor/imaging application. Certain applications require very high image resolution—often with tolerances of inches. Depending upon the particular system used (e.g., aircraft, satellite, or space vehicle), an actual digital imaging device may be located anywhere from several feet to miles from its target, resulting in a very large scale factor. Providing images with very large scale factors, that also have resolution tolerances of inches, poses a challenge to even the most robust imaging system. Thus, conventional systems usually must make some trade-off between resolution quality and the size of a target area that can be imaged. If the system is designed to provide high-resolution digital images, then the field of view (FOV) of the imaging device is typically small. If the system provides a larger FOV, then usually the resolution of the spectral and spatial data is decreased and distortions are increased.

Ortho-imaging is an approach that has been used in an attempt to address this problem. In general, ortho-imaging renders a composite image of a target by compiling varying sub-images of the target. Typically, in aerial imaging applications, a digital imaging device that has a finite range and resolution records images of fixed subsections of a target area sequentially. Those images are then aligned according to some sequence to render a composite of a target area.

Often, such rendering processes are very time-consuming and labor intensive. In many cases, those processes require iterative processing that measurably degrades image quality and resolution—especially in cases where thousands of sub-images are being rendered. In cases where the imaging data can be processed automatically, that data is often repetitively transformed and sampled—reducing color fidelity and image sharpness with each successive manipulation. If automated correction or balancing systems are employed, such systems may be susceptible to image anomalies (e.g., unusually bright or dark objects)—leading to over or under-corrections and unreliable interpretations of image data. In cases where manual rendering of images is required or desired, time and labor costs are immense.

There is, therefore, a need for an ortho-image rendering system that provides efficient and versatile imaging for very large FOVs and associated data sets, while maintaining image quality, accuracy, positional accuracy and clarity. Additionally, automation algorithms are applied extensively in every phase of the planning, collecting, navigating, and processing all related operations.

SUMMARY OF THE INVENTION

The present invention relates to remote data collection and processing system using a variety of sensors. The system may include computer console units that control vehicle and system operations in real-time. The system may also include global positioning systems that are linked to and communicate with the computer consoles. Additionally, cameras and/or camera array assemblies can be employed for producing an image of a target viewed through an aperture. The camera array assemblies are communicatively connected to the computer consoles. The camera array assembly has a mount housing, a first imaging sensor centrally coupled to the housing having a first focal axis passing through the aperture. The camera array assembly also has a second imaging sensor coupled to the housing and offset from the first imaging sensor along an axis, that has a second focal axis passing through the aperture and intersecting the first focal axis within an intersection area. The camera array assembly has a third imaging sensor, coupled to the housing and offset from the first imaging sensor along the axis, opposite the second imaging sensor, that has a third focal axis passing through the aperture and intersecting the first focal axis within the intersection area. Any number of one-to-n cameras may be used in this manner, where "n" can be any odd or even number.

The system may also include an Attitude Measurement Unit (AMU) such as inertial, optical, or similar measurement units communicatively connected to the computer consoles and the camera array assemblies. The AMU may determine the yaw, pitch, and/or roll of the aircraft at any instant in time and successive DGPS positions may be used to measure the vehicle heading with relation to geodesic north. The AMU data is integrated with the precision DGPS data to produce a robust, real-time AMU system. The system may further include a mosaicing module housed within the computer consoles. The mosaicing module includes a first component for performing initial processing on an input image. The mosaicing module also includes a second component for determining geographical boundaries of an input image with the second component being cooperatively engaged with the first component. The mosaicing module further includes a third component for mapping an input image into the composite image with accurate geographical position. The third component being cooperatively engaged with the first and second components. A fourth component is also included in the mosaicing module for balancing color of the input images mapped into the composite image. The fourth component can be cooperatively engaged with the first, second and third components. Additionally, the mosaicing module can include a fifth component for blending borders between adjacent input images mapped into the composite image. The fifth component being cooperatively engaged with the first, second, third and fourth components.

A sixth component, an optional forward oblique and/or optional rear oblique camera array system may be implemented that collects oblique image data and merges the image data with attitude and positional measurements in order to create a digital elevation model using stereographic techniques. Creation of which may be performed in real-time onboard the vehicle or post processed later. This sixth component works cooperatively with the other components. All components may be mounted to a rigid platform for the purpose of providing co-registration of sensor data. Vibrations, turbulence, and other forces may act on the vehicle in such a way as to create errors in the alignment relationship between sensors. Utilization of common, rigid platform mount for the sensors provides a significant advantage over other systems that do not use this co-registration architecture.

Further, the present invention may employ a certain degree of lateral oversampling to improve output quality and/or co-mounted, co-registered oversampling to overcome physical pixel resolution limits.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which:

FIG. 3 illustrates a camera array assembly in accordance with certain aspects of the present invention;

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not limit the scope of the invention.

Figure 1:
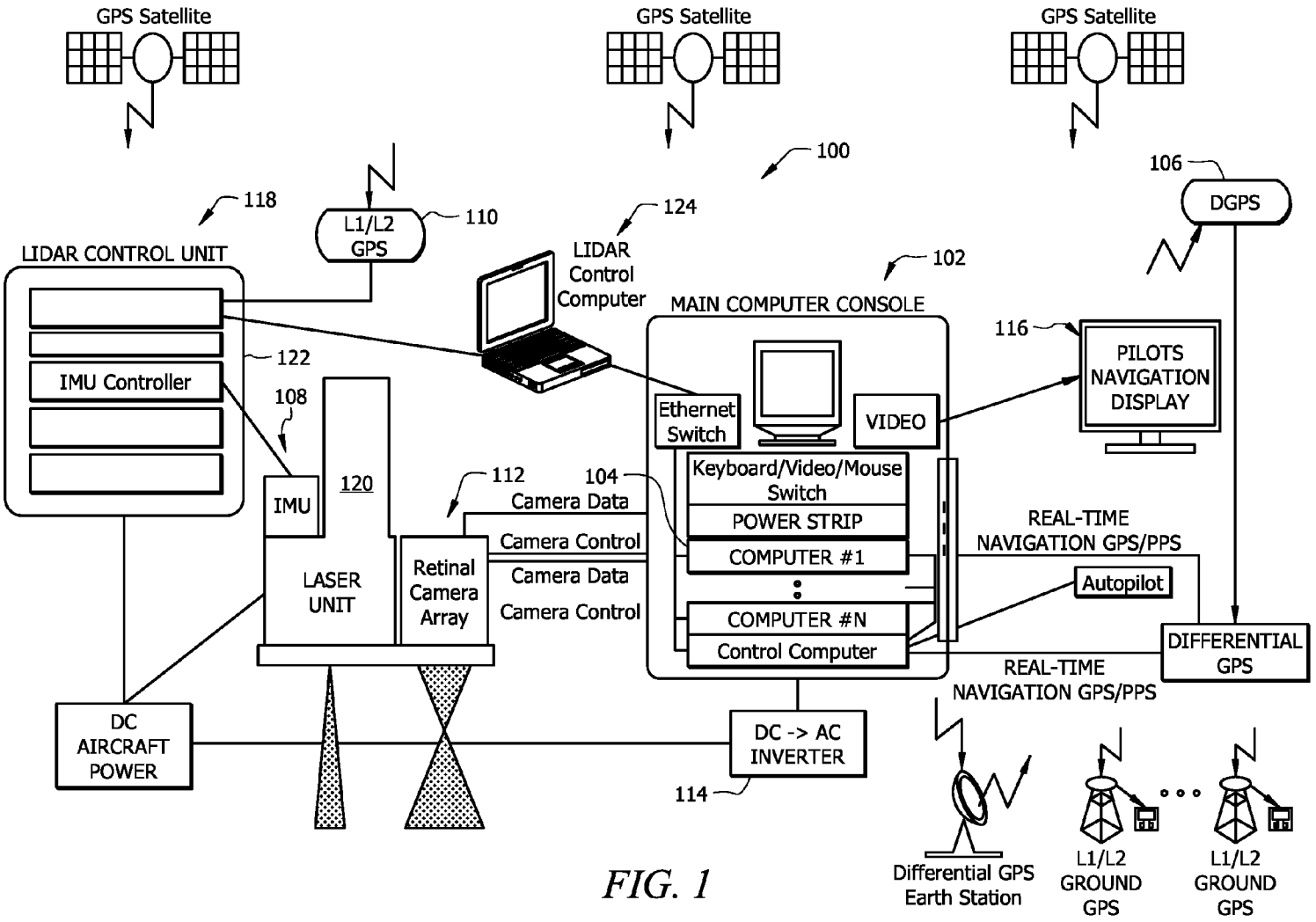
FIG. 1 illustrates a vehicle based data collection and processing system of the present invention.
Figure 1A:
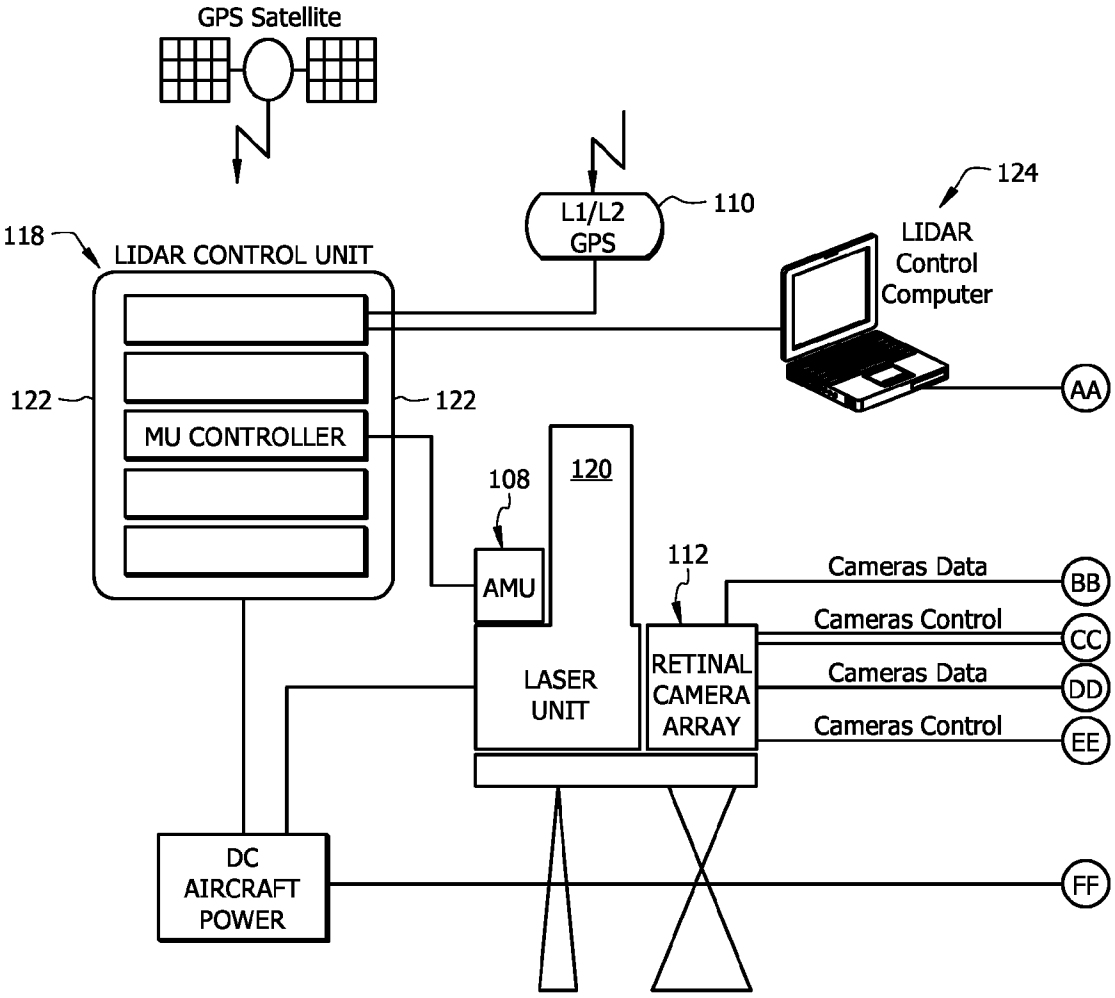
FIG. 1A illustrates a portion of the vehicle based data collection and processing system of FIG. 1.
Figure 1B:
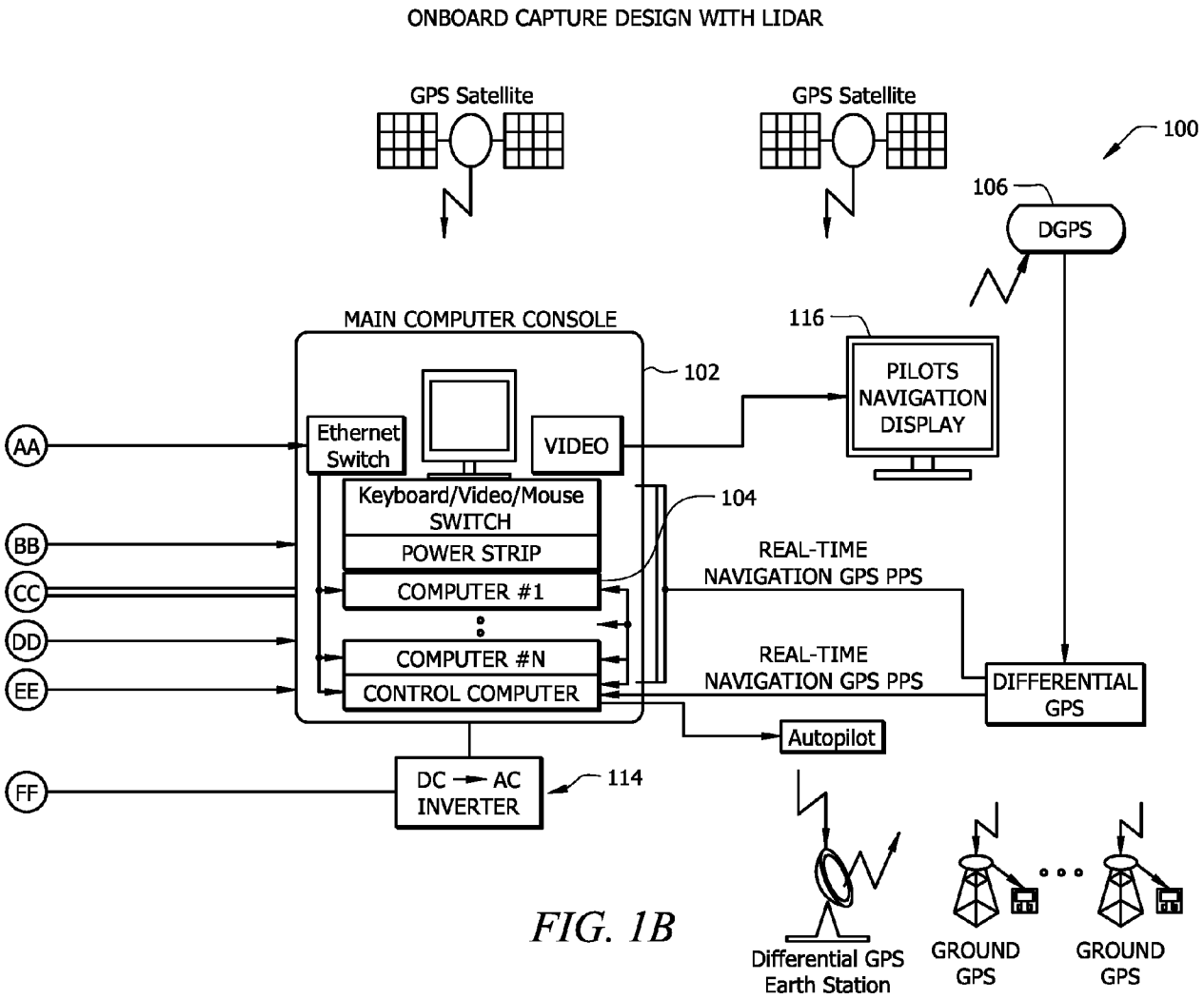
FIG. 1B illustrates a portion of the vehicle based data collection and processing system of FIG. 1.
Figure 2:
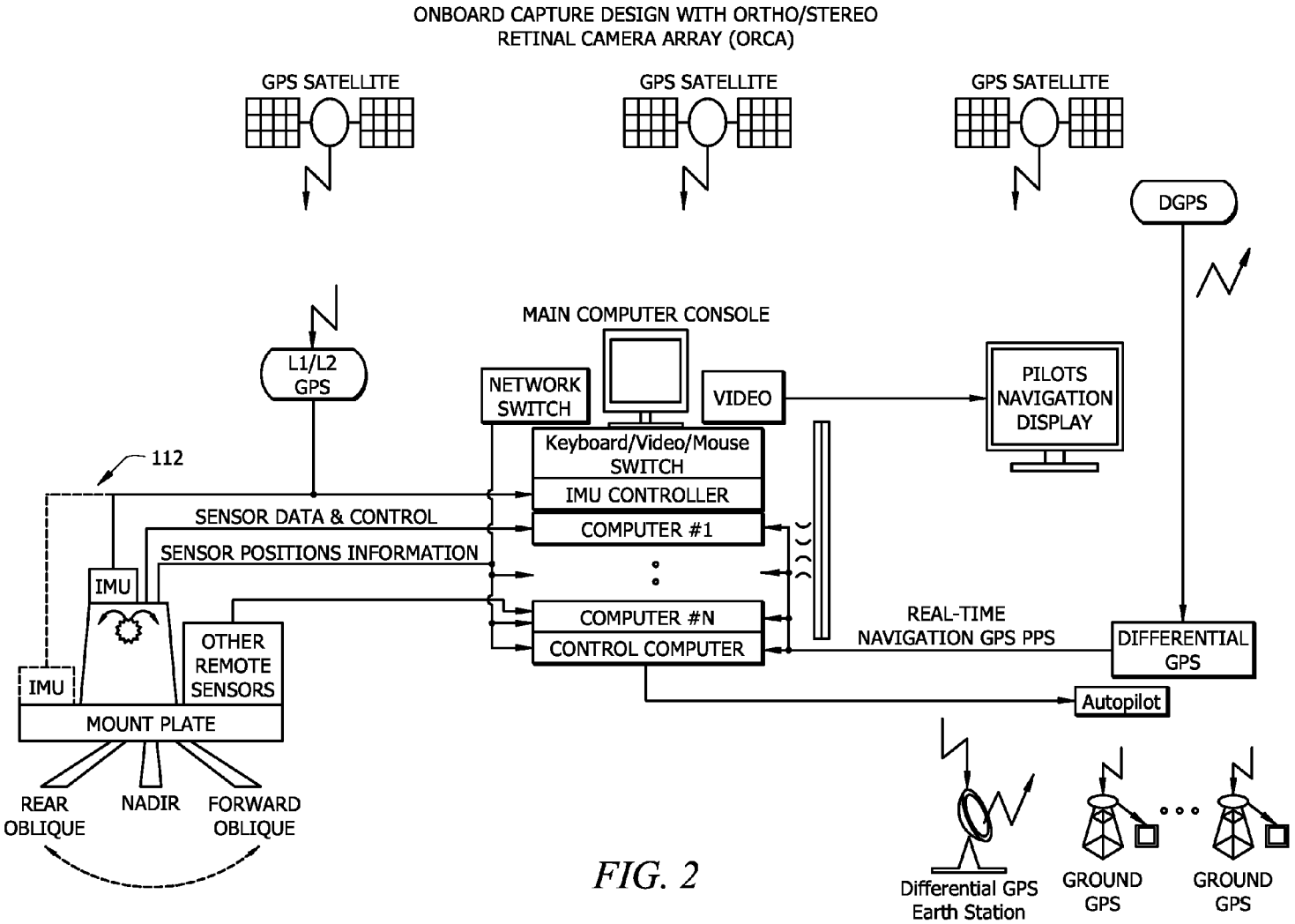
FIG. 2 illustrates a vehicle based data collection and processing system of FIG. 1 with the camera array assembly of the present invention shown in more detail.
Figure 18:
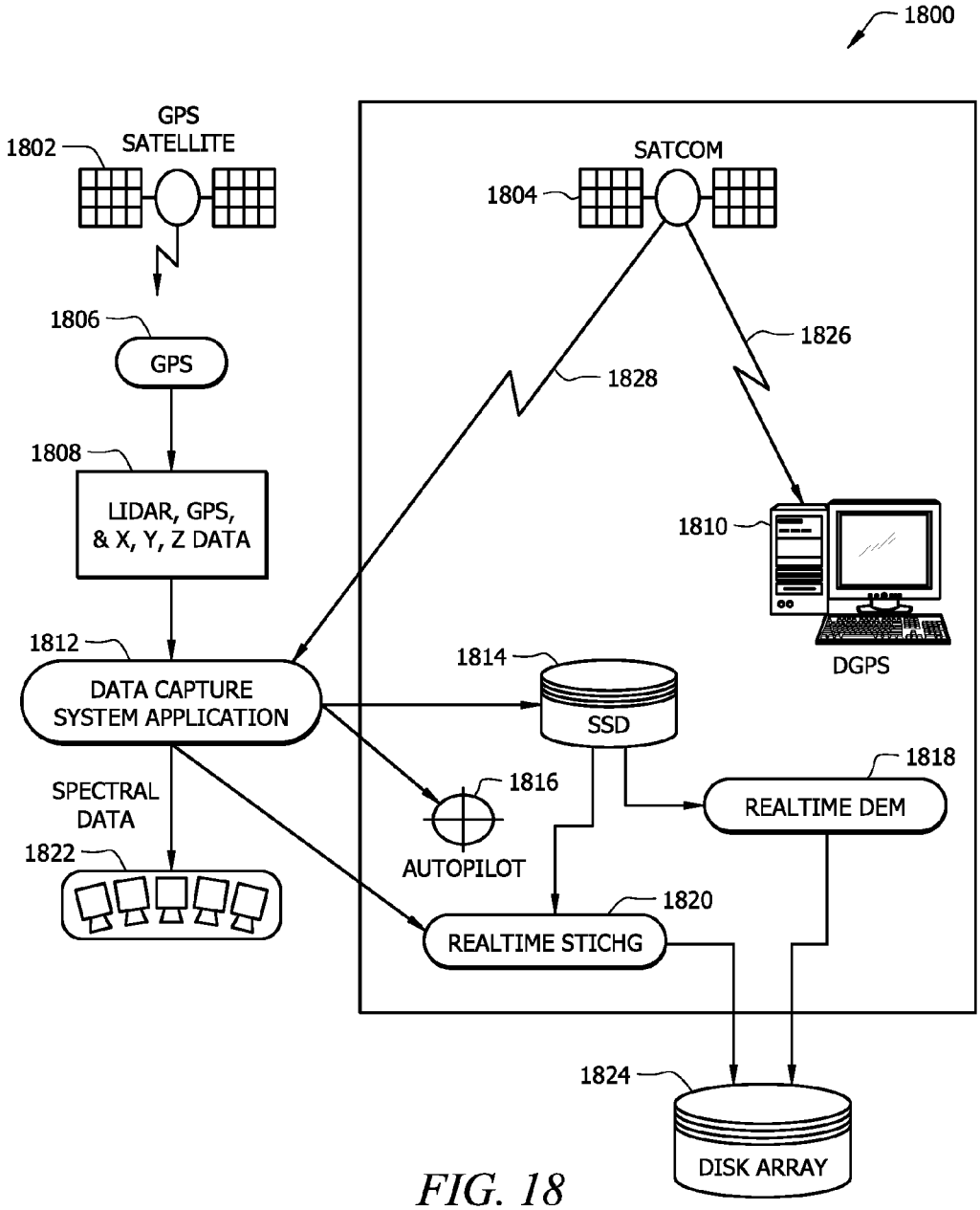
FIG. 18 is a schematic of the system architecture according to certain embodiments of the present invention.

A vehicle based data collection and processing system 100 of the present invention is shown in FIGS. 1, 1A, and 1B. Additional aspects and embodiments of the present invention are shown in FIGS. 2 and 18. System 100 includes one or more computer consoles 102. The computer consoles contain one or more computers 104 for controlling both vehicle and system operations. Examples of the functions of the computer console are the controlling digital color sensor systems that can be associated with the data collection and processing system, providing the display data to a pilot, coordinating the satellite generated GPS pulse-per-second (PPS) event trigger (which may be 20 or more pulses per second), data logging, sensor control and adjustment, checking and alarming for error events, recording and indexing photos, storing and processing data, flight planning capability that automates the navigation of the vehicle, data, and providing a real-time display of pertinent information. A communications interface between the control computer console and the vehicle autopilot control provides the ability to actually control the flight path of the vehicle in real-time. This results in a more precise control of the vehicle's path than is possible by a human being. All of these functions can be accomplished by the use of various computer programs that are synchronized to the GPS PPS signals and take into account the various electrical latencies of the measurement devices. In an embodiment, the computer is embedded within the sensor.

One or more differential global positioning systems 106 are incorporated into the system 100. The global positioning systems 106 are used to navigate and determine precise flight paths during vehicle and system operations. To accomplish this, the global positioning systems 106 are communicatively linked to the computer console 102 such that the information from the global positioning systems 106 can be acquired and processed without flight interruption. Zero or more GPS units may be located at known survey points in order to provide a record of each sub-seconds' GPS satellite-based errors in order to be able to back correct the accuracy of the system 100. GPS and/or ground based positioning services may be used that eliminate the need for ground control points altogether. This technique results in greatly improved, sub-second by sub-second positional accuracy of the data capture vehicle.

One or more AMUs 108 that provide real-time yaw, pitch, and roll information that is used to accurately determine the attitude of the vehicle at the instant of data capture are also communicatively linked to the computer console 102. The present attitude measurement unit (AMU) (e.g., Applanix POS AV), uses three high performance fiber optic gyros, one gyro each for yaw, pitch, and roll measurement. AMUs from other manufacturers, and AMUs that use other inertial measurement devices can be used as well. Additionally, an AMU may be employed to determine the instantaneous attitude of the vehicle and make the system more fault tolerant to statistical errors in AMU readings. Connected to the AMU can be one or more multi-frequency DGPS receivers 110. The multi-frequency DGPS receivers 110 can be integrated with the AMU's yaw, pitch, and roll attitude data in order to more accurately determine the location of the remote sensor platform in three dimensional space. Additionally, the direction of geodesic North may be determined by the vector created by successive DGPS positions, recorded in a synchronized manner with the GPS PPS signals.

One or more camera array assemblies 112 for producing an image of a target viewed through an aperture are also communicatively connected to the one or more computer consoles 102. The camera array assemblies 112, which will be described in greater detail below, provide the data collection and processing system with the ability to capture high resolution, high precision progressive scan or line scan, color digital photography.

The system may also include DC power and conditioning equipment 114 to condition DC power and to invert DC power to AC power in order to provide electrical power for the system. The system may further include a navigational display 116, which graphically renders the position of the vehicle versus the flight plan for use by the pilot (either onboard or remote) of the vehicle to enable precision flight paths in horizontal and vertical planes. The system may also include an EMU module comprised of LIDAR, SAR 118 or a forward and rear oblique camera array for capturing three dimensional elevation/relief data. The EMU module 118 can include a laser unit 120, an EMU control unit 122, and an EMU control computer 124. Temperature controlling devices, such as solid state cooling modules, can also be deployed as needed in order to provide the proper thermal environment for the system.

The system also includes a mosaicing module, not depicted, housed with the computer console 102. The mosaicing module, which will be described in further detail below, provides the system the ability to gather data acquired by the global positioning system 106, the AMU 108, and the camera system 112 and process that data into useable orthomaps.

The system 100 also can include a self-locking flight path technique that provides the ability to micro-correct the positional accuracy of adjacent flight paths in order to realize precision that exceeds the native precision of the AMU and DGPS sensors alone.

A complete flight planning methodology is used to micro plan all aspects of missions. The inputs are the various mission parameters (latitude/longitude, resolution, color, accuracy, etc.) and the outputs are detailed on-line digital maps and data files that are stored onboard the data collection vehicle and used for real-time navigation and alarms. The ability to interface the flight planning data directly into the autopilot is an additional integrated capability. A computer program may be used that automatically controls the flight path, attitude adjustments, graphical display, moving maps of the vehicle path, checks for alarm conditions and corrective actions, notifies the pilot and/or crew of overall system status, and provides for fail-safe operations and controls. Safe operations parameters may be constantly monitored and reported. Whereas the current system uses a manned crew, the system is designed to perform equally well in an unmanned vehicle.

FIG. 2 shows another depiction of the present invention. In FIG. 2, the camera array assembly 112 is shown in more detail. As is shown, the camera array assembly 112 allows for images to be acquired from the rear oblique, the forward obliques and the nadir positions. FIG. 3 describes in more detail a camera array assembly of the present invention. FIG. 3 provides a camera array assembly 300 airborne over target 302 (e.g., terrain). For illustrative purposes, the relative size of assembly 300, and the relative distance between it and terrain 302, are not depicted to scale in FIG. 3. The camera array assembly 300 comprises a housing 304 within which imaging sensors 306, 308, 310, 312 and 314 are disposed along a concave curvilinear axis 316. The radius of curvature of axis 316 may vary or be altered dramatically, providing the ability to effect very subtle or very drastic degrees of concavity in axis 316. Alternatively, axis 316 may be completely linear—having no curvature at all. The imaging sensors 306, 308, 310, 312 and 314 couple to the housing 304, either directly or indirectly, by attachment members 318. Attachment members 318 may comprise a number of fixed or dynamic, permanent or temporary, connective apparatus. For example, the attachment members 318 may comprise simple welds, removable clamping devices, or electromechanically controlled universal joints.

Additionally, the system 100 may have a real-time, onboard navigation system to provide a visual, bio-feedback display to the vehicle pilot, or remote display in the case of operations in an unmanned vehicle. The pilot is able to adjust the position of the vehicle in real-time in order to provide a more accurate flight path. The pilot may be onboard the vehicle or remotely located and using the flight display to control the vehicle through a communication link.

The system 100 may also use highly fault-tolerant methods that have been developed to provide a software interleaved disk storage methodology that allows one or two hard drives to fail and still not lose target data that is stored on the drives. This software inter-leaved disk storage methodology provides superior fault-tolerance and portability versus other, hardware methodologies, such as RAID-5.

The system 100 may also incorporate a methodology that has been developed that allows for a short calibration step just before mission data capture. The calibration methodology step adjusts the camera settings, mainly exposure time, based on sampling the ambient light intensity and setting near optimal values just before reaching the region of interest. A moving average algorithm is then used to make second-by-second camera adjustments in order to deliver improved, consistent photo results. This improves the color processing of the orthomaps. Additionally, the calibration may be used to check or to establish the exact spatial position of each sensor device (cameras, DPG, AMU, EMU, etc.). In this manner, changes that may happen in the spatial location of these devices may be accounted for and maintain overall system precision metrics.

Additionally, the system 100 may incorporate a methodology that has been developed that allows for calibrating the precision position and attitude of each sensor device (cameras, DPG, AMU, EMU, etc.) on the vehicle by flying over an area that contains multiple known, visible, highly accurate geographic positions. A program takes this data as input and outputs the micro positional data that is then used to precisely process the orthomaps.

As depicted in FIG. 3, housing 304 comprises a simple enclosure inside of which imaging sensors 306, 308, 310, 312 and 314 are disposed. Whereas FIG. 3 depicts a 5-camera array, the system works equally well when utilizing any number of camera sensors from 1 to any number. Sensors 306 through 314 couple, via the attachment members 318, either collectively to a single transverse cross member, or individually to lateral cross members disposed between opposing walls of the housing 304. In alternative embodiments, the housing 304 may itself comprise only a supporting cross member of concave curvature to which the imaging sensors 306 through 314 couple, via members 318. In other embodiments, the housing 304 may comprise a hybrid combination of enclosure and supporting cross member. The housing 304 further comprises an aperture 320 formed in its surface, between the imaging sensors and target 302. Depending upon the specific type of host craft, the aperture 320 may comprise only a void, or it may comprise a protective screen or window to maintain environmental integrity within the housing 304. In the event that a protective transparent plate is used for any sensor, special coatings may be applied to the plate to improve the quality of the sensor data. Optionally, the aperture 320 may comprise a lens or other optical device to enhance or alter the nature of the images recorded by the sensors. The aperture 320 is formed with a size and shape sufficient to provide the imaging sensors 306 through 314 proper lines of sight to a target region 322 on terrain 302.

The imaging sensors 306 through 314 are disposed within or along housing 304 such that the focal axes of all sensors converge and intersect each other within an intersection area bounded by the aperture 320. Depending upon the type of image data being collected, the specific imaging sensors used, and other optics or equipment employed, it may be necessary or desirable to offset the intersection area or point of convergence above or below the aperture 320. The imaging sensors 306 through 314 are separated from each other at angular intervals. The exact angle of displacement between the imaging sensors may vary widely depending upon the number of imaging sensors utilized and on the type of imaging data being collected. The angular displacement between the imaging sensors may also be unequal, if required, so as to provide a desired image offset or alignment. Depending upon the number of imaging sensors utilized, and the particular configuration of the array, the focal axes of all imaging sensors may intersect at exactly the same point, or may intersect at a plurality of points, all within close proximity to each other and within the intersection area defined by the aperture 320.

As depicted in FIG. 3, the imaging sensor 310 is centrally disposed within the housing 304 along axis 316. The imaging sensor 310 has a focal axis 324, directed orthogonally from the housing 304 to align the line of sight of the imaging sensor with the image area 326 of the region 322. The imaging sensor 308 is disposed within the housing 304 along the axis 316, adjacent to the imaging sensor 310. The imaging sensor 308 is aligned such that its line of sight coincides with the image area 328 of the region 322, and such that its focal axis 330 converges with and intersects the axis 324 within the area bounded by the aperture 320. The imaging sensor 312 is disposed within the housing 304 adjacent to the imaging sensor 310, on the opposite side of the axis 316 as the imaging sensor 308. The imaging sensor 312 is aligned such that its line of sight coincides with the image area 332 of the region 322, and such that its focal axis 334 converges with and intersects axes 324 and 330 within the area bounded by the aperture 320. The imaging sensor 306 is disposed within the housing 304 along the axis 316, adjacent to the sensor 308. The imaging sensor 306 is aligned such that its line of sight coincides with the image area 336 of region 322, and such that its focal axis 338 converges with and intersects the other focal axes within the area bounded by aperture 320. The imaging sensor 314 is disposed within housing 304 adjacent to sensor 312, on the opposite side of axis 316 as sensor 306. The imaging sensor 314 is aligned such that its line of sight coincides with image area 340 of region 322, and such that its focal axis 344 converges with and intersects the other focal axes within the area bounded by aperture 320.

The imaging sensors 306 through 314 may comprise a number of digital imaging devices including, for example, individual area scan cameras, line scan cameras, infrared sensors, hyperspectral and/or seismic sensors. Each sensor may comprise an individual imaging device, or may itself comprise an imaging array. The imaging sensors 306 through 314 may all be of a homogenous nature, or may comprise a combination of varied imaging devices. For ease of reference, the imaging sensors 306 through 314 are hereafter referred to as cameras 306 through 314, respectively.

In large-format film or digital cameras, lens distortion is typically a source of imaging problems. Each individual lens must be carefully calibrated to determine precise distortion factors. In one embodiment of this invention, small-format digital cameras having lens angle widths of 17 degrees or smaller are utilized. This alleviates noticeable distortion efficiently and affordably.

Cameras 306 through 314 are alternately disposed within housing 304 along axis 316 such that each camera's focal axis converges upon aperture 320, crosses focal axis 324, and aligns its field of view with a target area opposite its respective position in the array resulting in a "cross-eyed", retinal relationship between the cameras and the imaging target(s). The camera array assembly 300 is configured such that adjoining borders of image areas 326, 328, 332, 336 and 340 overlap slightly.

If the attachment members 318 are of a permanent and fixed nature (e.g., welds), then the spatial relationship between the aperture 320, the cameras, and their lines of sight remain fixed as will the spatial relationship between image areas 326, 328, 332, 336 and 340. Such a configuration may be desirable in, for example, a satellite surveillance application where the camera array assembly 300 will remain at an essentially fixed distance from region 322. The position and alignment of the cameras is set such that areas 326, 328, 332, 336 and 340 provide full imaging coverage of region 322. If the attachment members 318 are of a temporary or adjustable nature, however, it may be desirable to selectively adjust, either manually or by remote automation, the position or alignment of the cameras so as to shift, narrow or widen areas 326, 328, 332, 336 and 340—thereby enhancing or altering the quality of images collected by the camera array assembly 300.

In an embodiment, multiple, i.e., at least two, rigid mount units are affixed to the same rigid mount plate. The mount unit is any rigid structure to which at least one imaging sensor may be affixed. The mount unit is preferably a housing, which encloses the imaging sensor, but may be any rigid structure including a brace, tripod, or the like. For the purposes of this disclosure, an imaging sensor means any device capable of receiving and processing active or passive radiometric energy, i.e., light, sound, heat, gravity, and the like, from a target area. In particular, imaging sensors may include any number of digital cameras, including those that utilize a red-blue-green filter, a bushbroom filter, or a hyperspectral filter, LIDAR sensors, infrared sensors, heat-sensing sensors, gravitometers and the like. Imagining sensors do not include attitude measuring sensors such as gyroscopes, GPS devices, and the like devices, which serve to orient the vehicle with the aid of satellite data and/or inertial data. Preferably, the multiple sensors are different.

In the embodiment wherein the imaging sensor is a camera, LIDAR, or the like imaging sensor, the mount unit preferably has an aperture through which light and/or energy may pass. The mount plate is preferably planer, but may be non-planer. In the embodiment, wherein the imaging sensor is a camera, LIDAR, or the like imaging sensor, the mount plate preferably has aperture(s) in alignment with the aperture(s) of the mount unit(s) through which light and/or energy may pass.

A rigid structure is one that flexes less than about $100^{th}$ of a degree, preferably less than about $1{,}000^{th}$ of a degree, more preferably less than about $10{,}000^{th}$ of a degree while in use. Preferably, the rigid structure is one that flexes less than about $100^{th}$ of a degree, preferably less than about $1{,}000^{th}$ of a degree, more preferably less than about $10{,}000^{th}$ of a degree while secured to an aircraft during normal, i.e., non-turbulent, flight. Objects are rigidly affixed to one another if during normal operation they flex from each other less than about $100^{th}$ of a degree, preferably less than about $1{,}000^{th}$ of a degree, more preferably less than about $10{,}000^{th}$ of a degree.

Camera 310 is designated as the principal camera. The image plane 326 of camera 310 serves as a plane of reference. The orientations of the other cameras 306, 308, 312 and 314 are measured relative to the plane of reference. The relative orientations of each camera are measured in terms of the yaw, pitch and roll angles required to rotate the image plane of the camera to become parallel to the plane of reference. The order of rotations is preferably yaw, pitch, and roll.

The imaging sensors affixed to the mount unit(s) may not be aligned in the same plane. Instead, the angle of their mount relative to the mount angle of a first sensor affixed to the first mount unit, preferably the principle nadir camera of the first mount unit, may be offset. Accordingly, the imaging sensors may be co-registered to calibrate the physical mount angle offset of each imaging sensor relative to each other. In an embodiment, multiple, i.e., at least two, rigid mount units are affixed to the same rigid mount plate and are co-registered. In an embodiment, the cameras 306 through 314 are affixed to a rigid mount unit and co-registered. In this embodiment, the geometric centerpoint of the AMU, preferably a gyroscope, is determined using GPS and inertial data. The physical position of the first sensor affixed to the first mount unit, preferably the principle nadir camera of the first mount unit, is calculated relative to a reference point, preferably the geometric centerpoint of the AMU. Likewise, the physical position of all remaining sensors within all mount units are calculated—directly or indirectly—relative to the same reference point.

The boresight angle of a sensor is defined as the angle from the geometric center of that sensor to a reference plane. Preferably the reference plane is orthogonal to the target area. The boresight angle of the first sensor may be determined using the ground target points. The boresight angles of subsequent sensors are preferably calculated with reference to the boresight angle of the first sensor. The sensors are preferably calibrated using known ground targets, which are preferably photo-identifiable, and alternatively calibrated using a self-locking flight path or any other method as disclosed in U.S. Publication No. 2004/0054488A1, now U.S. Pat. No. 7,212,938B2, the disclosure of which is hereby incorporated by reference in full.

The imaging sensor within the second mount unit may be any imaging sensor, and is preferably a LIDAR. Alternative, the second imaging sensor is a digital camera, or array of digital cameras. In an embodiment, the boresight angle of so the sensor(s) affixed to the second mount unit are calculated with reference to the boresight angle of the first sensor. The physical offset of the imaging sensor(s) within the second mount unit may be calibrated with reference to the boresight angle of the first sensor within the first mount unit.

In this manner, all of the sensors are calibrated at substantially the same epoch, using the same GPS signal, the same ground target(s), and under substantially the same atmospheric conditions. This substantially reduces compounded error realized when calibrating each sensor separately, using different GPS signals, against different ground targets, and under different atmospheric conditions.

Figure 4:
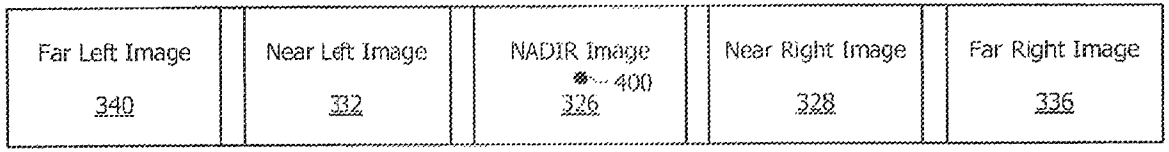
FIG. 4 illustrates one embodiment of an imaging pattern retrieved by the camera array assembly of FIG. 1.

Referring now to FIG. 4, images of areas 336, 328, 326, 332 and 340 taken by cameras 306 through 314, respectively, are illustrated from an overhead view. Again, because of the "cross-eyed" arrangement, the image of area 336 is taken by camera 306, the image of area 340 is taken by camera 314, and so on. In one embodiment of the present invention, images other than those taken by the center camera 310 take on a trapezoidal shape after perspective transformation. Cameras 306 through 314 form an array along axis 316 that is, in most applications, pointed down vertically. In an alternative embodiment, a second array of cameras, configured similar the array of cameras 306 through 314, is aligned with respect to the first array of cameras to have an oblique view providing a "heads-up" perspective. The angle of declination from horizontal of the heads-up camera array assembly may vary due to mission objectives and parameters but angles of 25-45 degrees are typical. Other alternative embodiments, varying the mounting of camera arrays, are similarly comprehended by the present invention. In all such embodiments, the relative positions and attitudes of the cameras are precisely measured and calibrated so as to facilitate image processing in accordance with the present invention.

In one embodiment of the present invention, an external mechanism (e.g., a GPS timing signal) is used to trigger the cameras simultaneously thereby capturing an array of input images. A mosaicing module then renders the individual input images from such an array into an ortho-rectified compound image (or "mosaic"), without any visible seams between the adjacent images. The mosaicing module performs a set of tasks comprising: determining the geographical boundaries and dimensions of each input image; projecting each input image onto the mosaic with accurate geographical positioning; balancing the color of the images in the mosaic; and blending adjacent input images at their shared seams. The exact order of the tasks performed may vary, depending upon the size and nature of the input image data. In certain embodiments, the mosaicing module performs only a single transformation to an original input image during mosaicing. That transformation can be represented by a 4×4 matrix. By combining multiple transformation matrices into a single matrix, processing time is reduced and original input image sharpness is retained.

During mapping of the input images to the mosaic, especially when mosaicing is performed at high resolutions, pixels in the mosaic (i.e., output pixels) may not be mapped to by any pixels in the input images (i.e., input pixels). Warped lines could potentially result as artifacts in the mosaic. Certain embodiments of the present invention overcome this with a super-sampling system, where each input and output pixel is further divided into an n×m grid of sub-pixels. Transformation is performed from sub-pixels to sub-pixels. The final value of an output pixel is the average value of its sub-pixels for which there is a corresponding input sub-pixel. Larger n and m values produce mosaics of higher resolution, but do require extra processing time.

During its processing of image data, the mosaicing module may utilize the following information: the spatial position (e.g., x, y, z coordinates) of each camera's focal point at the time an input image is captured; the attitude (i.e., yaw, pitch, roll) of each camera's image plane relative to the target region's ground plane at the time an input image was captured; each camera's fields of view (i.e., along track and cross track); and the Digital Terrain Model (DTM) of the area. The attitude can be provided by the AMUs associated with the system. Digital terrain models (DTMs) or Digital surface models (DSMs) can be created from information obtained using a LIDAR module 118. LIDAR is similar to the more familiar radar, and can be thought of as laser radar. In radar, radio waves are transmitted into the atmosphere that scatters some of the energy back to the radar's receiver. LIDAR also transmits and receives electromagnetic radiation, but at a higher frequency since it operates in the ultraviolet, visible and infrared region of the electromagnetic spectrum. In operation, LIDAR transmits light out to a target area. The transmitted light interacts with and is changed by the target area. Some of this light is reflected/scattered back to the LIDAR instrument where it can be analyzed. The change in the properties of the light enables some property of the target area to be determined. The time for the light to travel out to the target area and back to LIDAR device is used to determine the range to the target.

DTM and DSM data sets can also be captured from the camera array assembly. Traditional means of obtaining elevation data may also be used such as stereographic techniques.

There are presently three basic types of LIDAR: Range finders, Differential Absorption LIDAR (DIAL) and Doppler LIDAR. Range finder LIDAR is the simplest LIDAR and is used to measure the distance from the LIDAR device to a solid or hard target. DIAL LIDAR is used to measure chemical concentrations (such as ozone, water vapor, pollutants) in the atmosphere. A DIAL LIDAR uses two different laser wavelengths that are selected so that one of the wavelengths is absorbed by the molecule of interest while the other wavelength is not. The difference in intensity of the two return signals can be used to deduce the concentration of the molecule being investigated. Doppler LIDAR is used to measure the velocity of a target. When the light transmitted from the LIDAR hits a target moving towards or away from the LIDAR, the wavelength of the light reflected/scattered off the target will be changed slightly. This is known as a Doppler-shift and therefore Doppler LIDAR. If the target is moving away from the LIDAR, the return light will have a longer wavelength (sometimes referred to as a red shift), if moving towards the LIDAR the return light will be at a shorter wavelength (blue shifted). The target can be either a hard target or an atmospheric target (e.g. microscopic dust and aerosol particles that are carried by the wind.

A camera's focal point is preferably used as a perspective transformation center. Its position in space may be determined, for example, by a multi-frequency carrier phase post-processed GPS system mounted on the host craft. The offsets, in three dimensions, of a camera's focal point are preferably carefully measured against the center of the GPS antenna. These offsets may be combined with the position of the GPS antenna, and the orientation of the host craft, to determine the exact position of the camera's focal point. The position of the GPS antenna is preferably determined by processing of collected GPS data against similar ground-based GPS antennas deployed at precisely surveyed points.

One or more AMUs (e.g., the Applanix POS AV) are preferably mounted onboard for attitude determination. The attitude of the AMU reference plane relative to the target region's ground plane is preferably measured and recorded at short intervals, with accuracy better than one-hundredth of one degree. The attitude of the AMU reference plane may be defined as the series of rotations that can be performed on the axes of this plane to make it parallel to the ground plane. The term "align" could also be used to describe this operation.

The attitude of center camera 310 (i.e. its image plane), relative to the AMU, is preferably precisely calibrated. The attitude of each of the other cameras, relative to center camera 310, is preferably also be carefully calibrated. This dependent calibration is more efficient than directly calibrating each camera. When the camera array assembly 300 is remounted, only center camera 310 needs to be recalibrated. Effectively, a series of two transformations is applied to an input image from center camera 310. First, the center camera's image plane is aligned to the AMU plane. Then, the AMU plane is aligned again to the ground plane. These transformations, however, combine into a single operation by multiplying their respective transformation matrices. For images from each of the other cameras, an additional transformation is first performed to align it with the center camera's image plane.

The position of the focal point of center camera 310 may be determined as described above. The x and y components of this position preferably determine the position of the mosaic's nadir point 400 on the ground. Field of view (FOV) angles of each camera are known, thus the dimensions of each input image may be determined by the z component of that camera's focal point. An average elevation of the ground is preferably determined by computing the average elevation of points in the DTMs of the area, and then each input image is projected to an imaginary horizontal plane at this elevation. Relief displacement is then preferably applied using the DTMs of the area. The DTMs can be obtained from many sources including: the USGS 30-or 10-meter DTMs available for most of the US; commercial DTMs; or DTMs obtained by a LIDAR or SAR EMU device mounted on the host craft that captures data concurrently with the cameras.

Besides being geographically correctly placed, the resulting compound image also needs to have radiometric consistency throughout, and no visible seams at the joints between two adjacent images. The present invention provides a number of techniques for achieving this goal.

A characteristic of a conventional camera is the exposure time (i.e., the time the shutter is open to collect light onto the image plane). The longer the exposure time, the lighter the resultant image becomes. Exposure time must adapt to changes in ambient lighting caused by conditions such as: cloud coverage; the angle and position of the sun relative to the camera; and so forth. Optimal exposure time may also depend on a camera's orientation with respect to lighting sources (e.g., cameras pointing towards a sunlit object typically receive more ambient light than those pointing towards a shaded object). Exposure time is adjusted to keep the average intensity of an image within a certain desired range. For example, in 24-bit color images each Red, Green and Blue component can have intensity values from 0 to 255. In most instances, however, it is desirable to keep the average intensity at a mean value (i.e., 127).

In the present invention, an exposure control module controls exposure time for each of the cameras or imaging sensors. It examines each input image and calculates average image intensity. Based on a moving average (i.e., average intensity of the last X number of images), the exposure control module determines whether to increase or decrease exposure time. The module can use a longer running average to effect a slower reaction to changes in lighting conditions, with less susceptibility to unusually dark or light images (e.g., asphalt roads or water). The exposure control module controls exposure time for each camera separately.

In systems where cameras are mounted without forward-motion compensation mechanisms, there must be a maximum limit for exposure time. Setting exposure time to a value larger than the maximum may cause motion-induced blurriness. For example, assume cameras are mounted on an airplane traveling at 170 miles/hour (or about 3 inches/ms). Assume desired pixel resolution is 6 inches. Forward motion during image capture should be limited to half a pixel size—which in this case equals 3 inches. Thus, maximum exposure for example is 1 millisecond.

In controlling imaging quality, it is useful to be able to determine if changes in light intensity are caused either due to a change in ambient light or due to the presence of unusually light or dark objects (e.g., reflecting water body, metal roofs, asphalts, etc.). Certain applications of this invention involve aerial photography or surveillance. It is observed that aerial images of the ground usually contain plants and vegetation—which have more consistent reflectivity than water bodies or man-made structures such as roads and buildings. Of course, images of plants and vegetation are usually green-dominant (i.e., the green component is the greatest of the red, green and blue values). Therefore, intensity correlation can be made more accurate by focusing on the green-dominant pixels.

The exposure control module computes the average intensity of an image by selecting only green-dominant pixels. For example, if an image has 1 million pixels and 300,000 are green-dominant, only those 300,000 green-dominant pixels are included in the calculation of average intensity. This results in an imaging process that is less susceptible to biasing caused by man-made structures and water bodies, whose pixels are usually not green-dominant. As previously noted, it is desirable to maintain an intensity value of about 127. When intensity value is over 127 (i.e., over-exposed), exposure time is reduced so that less light is captured. Similarly, when intensity value is under 127 (i.e., under-exposed), exposure time is increased so that more light is captured. For example, consider a system flying over a target terrain area having many white roofs, whose intensities are very high. Average intensity for the images captured would tend to be high. In most conventional systems, exposure time would by reduced in order to compensate. In such an example, however, reducing exposure time is not proper, because the average intensity of the images has been biased by the bright roofs. Reducing exposure time would result in images where the ground is darker than it should be. In contrast, if only green-dominant pixels are processed in accordance with the present invention, then pixels representing the overly bright roofs do bias the average intensity and the exposure time is not changed.

Thus, the exposure control module reduces intensity differences between input images. Nonetheless, further processing is provided to enhance tonal balance. There are a number of factors (e.g., lens physics, atmospheric conditions, spatial/positional relationships of imaging devices) that cause an uneven reception of light from the image plane. More light is received in the center of a camera or sensor than at the edges.

Figure 5:
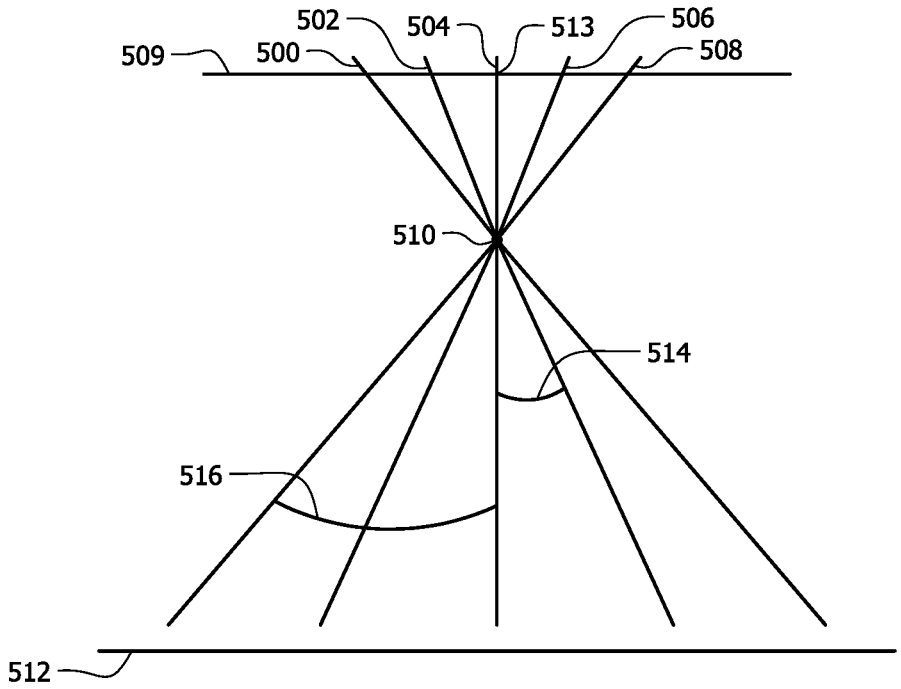
FIG. 5 depicts an imaging pattern illustrating certain aspects of the present invention.

The mosaicing module of the present invention addresses this with an anti-vignetting function, illustrated in reference now to FIG. 5. A number of focal columns 500, 502, 504, 506 and 508 converge from image plane 509 and cross through focal point 510 as they range across imaging target area 512 (e.g., ground terrain). Columns 500 through 508 may comprise individual resolution columns of a single camera or sensor, or may represent the focal axes of a number of independent cameras or sensors. For reference purposes, column 504 serves as the axis and point 513 at which column 504 intersects image plane 509 serves as a principal point. The exposure control module applies an anti-vignetting function multiplying the original intensity of an input pixel with a column-dependent anti-vignetting factor. Because the receiving surface is represented as a plane with a coordinate system, each column will have a number of resolution rows (not shown). This relationship may be expressed, for a pixel p at column x and row y, as follows:

<adjusted intensity>=<original intensity>*f(x);

where f(x) is a function of the form:

f(x)=cos(off-axis angle)**4.

The off-axis angle 514 is: zero for center column 504; larger for columns 502 and 506; and larger still for columns 500 and 508. The overall field of view angle 516 (FOVx angle) is depicted between columns 504 and 508.

The function f(x) can be approximated by a number of line segments between columns. For a point falling within a line segment between any given columns c1 and c2, an adjustment factor is computed as follows:

<adjustment factor for c>=f(c1)+[f(c2)−f(c1)*(c−c1)/(c2−c1)];

where f(c1) and f(c2) are the f function values of the off-axis angles at column c1 and c2, respectively.

Each set of input images needs to be stitched into a mosaic image. Even though the exposure control module regulates the amount of light each camera or sensor receives, the resulting input images may still differ in intensity. The present invention provides an intensity-balancing module that compares overlapping area between adjacent input images, to further balance the relative intensities. Because adjoining input images are taken simultaneously, the overlapping areas should, in theory, have identical intensity in both input images. However, due to various factors, the intensity values are usually not the same. Some such factors causing intensity difference could include, for example, the exposure control module being biased by unusually bright or dark objects present in the field of view of only a particular camera, or the boresight angles of cameras being different (i.e., cameras that are more slanted receive less light than those more vertical).

To balance two adjacent images, one is chosen as the reference image and the other is the secondary image. A correlation vector (fR, fG, FB) is determined using, for example, the following process. Let V be a 3×1 vector representing the values (R, G and B) of a pixel:

$$V = \begin{matrix} R \\ G \\ B \end{matrix}.$$

A correlation matrix C may be derived as:

$$C = \begin{matrix} FR & 0 & 0 \\ 0 & FG & 0 \\ 0 & 0 & FB \end{matrix};$$

where FR=AvgIr/AvgIn; AvgIr=Red average intensity of overlapped region in reference image; AvgIn=Red average intensity of overlapped region in new image; and FG and FB are similarly derived.

The correlation matrix scales pixel values of the secondary image so that the average intensity of the overlapping area of the secondary image becomes identical to the average intensity of the overlapping area of the reference image. The second image can be balanced to the reference image by multiplying its pixel values by the correlation matrix.

Thus, in one embodiment of a balancing process according to the present invention, a center image is considered the reference image. The reference image is first copied to the compound image (or mosaic). Overlapping areas between the reference image and an adjoining image (e.g., the near left image) are correlated to compute a balancing correlation matrix (BCM). The BCM will be multiplied with vectors representing pixels of the adjoining image to make the intensity of the overlapping area identical in both images. One embodiment of this relationship may be expressed as:

Let I(center)=Average intensity of overlapping area in center image;

I(adjoining)=Average intensity of overlap in adjoining image; then

Balancing factor=I(center)/I(adjoining).

The balancing factor for each color channel (i.e., red, green and blue) is independently computed. These three values form the BCM. The now-balanced adjoining image is copied to the mosaic. Smooth transitioning at the border of the copied image is providing by "feathering" with a mask. This mask has the same dimension as the adjoining image and comprises a number of elements. Each element in the mask indicates the weight of the corresponding adjoining image pixel in the mosaic. The weight is zero for pixels at the boundary (i.e. the output value is taken from the reference image), and increases gradually in the direction of the adjoining image until it becomes unity—after a chosen blending width has been reached. Beyond the blending area, the mosaic will be entirely determined by the pixels of the adjoining image. Similarly, the overlaps between all the other constituent input images are analyzed and processed to compute the correlation vectors and to balance the intensities of the images.

Figure 6:
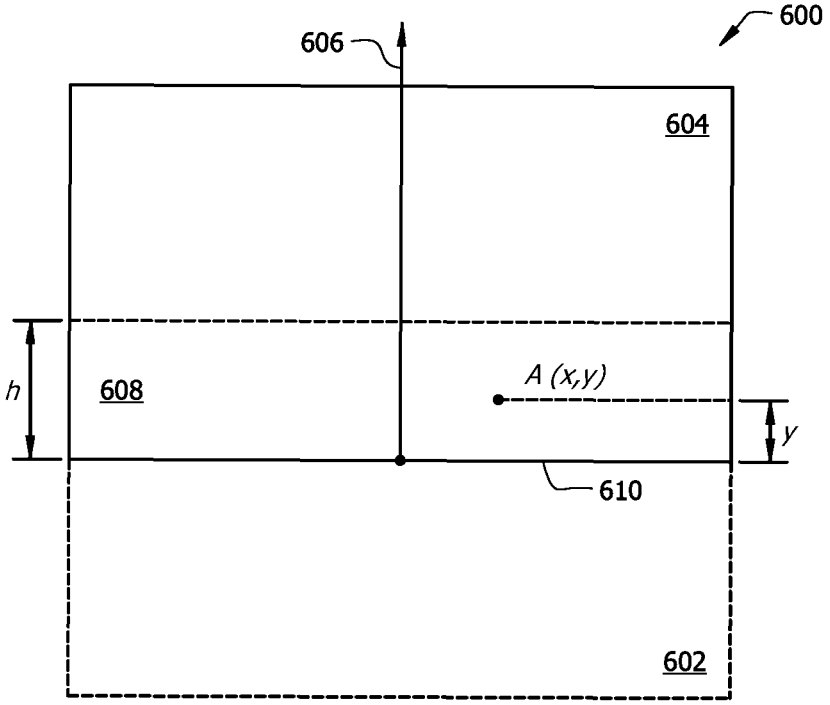
FIG. 6 illustrates an image strip in accordance with the present invention.

A correlation matrix is determined using, for example, the following process with reference to FIG. 6. FIG. 6 depicts a strip 600 being formed in accordance with the present invention. A base mosaic 602 and a new mosaic 604, added along path (or track) 606, overlap each other in region 608. Let V be a vector that represents the R, G and B values of a pixel:

$$V = \begin{matrix} R \\ G \\ B \end{matrix}$$

Let h be the transition width of region 608, and y be the along-track 606 distance from the boundary 610 of the overlapped region to a point A, whose pixel values are represented by V. Let C be the correlation matrix:

$$C = \begin{matrix} FR & 0 & 0 \\ 0 & FG & 0 \\ 0 & 0 & FB \end{matrix}$$

The balanced value of V, called V' is:

$$V'=[y/h\cdot I+(1-y/h)\cdot C]\times V, \text{ for } 0<y<h;$$

$$V'=V, \text{ for } y>=h;$$

Where I is the identity matrix $$I = \begin{matrix} 1 & 0 & 0 \\ 0 & 1 & 0 \\ 0 & 0 & 1 \end{matrix}.$$

Note that the "feathering" technique is also used in combination with the gradient to minimize seam visibility.

When mosaics are long, differences in intensity at the overlap may change from one end of the mosaic to the other. Computing a single correlation vector to avoid creating visible seams may not be possible. The mosaic can be divided into a number of segments corresponding to the position of the original input images that make up the mosaic. The process described above is applied to each segment separately to provide better local color consistency.

Under this refined algorithm, pixels at the border of two segments may create vertical seams (assuming north-south flight lines). To avoid this problem, balancing factors for pixels in this area have to be "transitioned" from that of one segment to the other. This is explained now with reference to FIG. 7.

Figure 7:
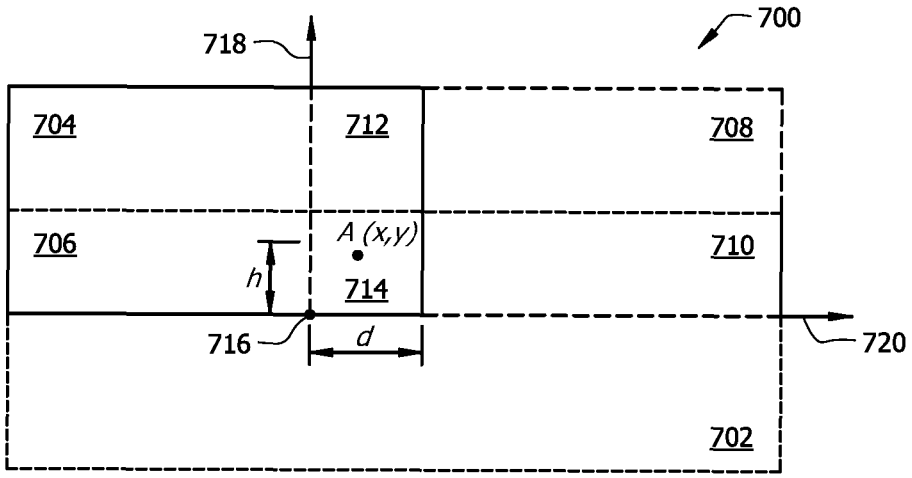
FIG. 7 illustrates another embodiment of an image strip in accordance with the present invention.

FIG. 7 depicts a strip 700 being formed in accordance with the present invention. A base mosaic 702 and a new segment 704 overlap in area 706. Mosaic 702 and another new segment 708 overlap in area 710. Segments 704 and 708 overlap in area 712, and areas 706, 710 and 712 all overlap and coincide at area 714. For explanation purposes, point 716 serves as an origin for y-axis 718 and x-axis 720. Movement along y-axis 718 represents movement along the flight path of the imaging system. Point 716 is located at the lower left of area 714.

According to the present invention, the dimensions of a strip are determined by the minimum and maximum x and y values of the constituent mosaics. An output strip is initialized to a background color. A first mosaic is transferred to the strip. The next mosaic (along the flight path) is processed next. Intensity values of the overlapping areas of the new mosaic and the first mosaic are correlated, separately for each color channel. The new mosaic is divided into a number of segments corresponding to the original input images that made up the mosaic. A mask matrix, comprising a number of mask elements, is created for the new mosaic. A mask element contains the correlation matrix for a corresponding pixel in the new mosaic. All elements in the mask are initialized to unity. The size of the mask can be limited to just the transition area of the new mosaic. The correlation matrix is calculated for the center segment. The mask area corresponding to the center segment is processed. The values of the elements at the edge of the overlap area are set to the correlation vector. Then, gradually moving away from the first mosaic along the strip, the components of the correlation matrix are either increased or decreased (whether they are less or more than unity, respectively) until they become unity at a predetermined transition distance. The area of the mask corresponding to a segment adjoining the center segment is then processed similarly. However, the area 714 formed by the first mosaic and the center and adjoining segments of the new image requires special treatment. Because the correlation matrix for the adjoining segment may not be identical to that of the center segment, a seam may appear at the border of the two segments in the overlap area 714 with the first mosaic. Therefore, the corner is influenced by the correlation matrices from both segments. For a mask cell A at distance x to the border with the center segment and distance y to the overlap edge, its correlation matrix is the distance-weighted average of the two segments, evaluated as follows:

For pixel A(x, y) in area 714 at distance x to the border with the center segment, its balanced values are computed as the distance-weighted averages of the values computed using the two segments;

V1 is the balanced RGB vector based on segment 704;

V2 is the balanced RGB vector based on segment 708;

V' is the combined (final) balanced RGB vector $$V'=((d-x)/d)\cdot V1+(x/d)\cdot V2;$$

Where x-axis is the line going through bottom of overlapped region;

y-axis is the line going through the left side of the overlapped region between segments 704 and 708;

h is the transition width; and d is the width of the overlapped region between segments 704 and 708.

The mask areas corresponding to other adjoining segments are computed similarly.

Further according to the present invention, a color fidelity (i.e., white-balance) filter is applied. This multiplies R and B components with a determinable factor to enhance color fidelity. The factor may be determined by calibrating the cameras and lenses. The color fidelity filter ensures that the colors in an image retain their fidelity, as perceived directly by the human eye. Within the image capture apparatus, the Red, Green and Blue light receiving elements may have different sensitivities to the color they are supposed to capture. A "while-balance" process is applied—where image of a white object is captured. Theoretically, pixels in the image of that white object should have equivalent R, G and B values. In reality, however, due to different sensitivities and other factors, the average color values for each R, G and B may be avgR, avgG and avgB, respectively. To equalize the color components, the R, G and B values of the pixels are multiplied by the following ratios:

R values are multiplied by the ratio avgG/avgR; and

B values are multiplied by the ratio avgG/avgB.

The end result is that the image of the white object is set to have equal R G B components.

In most applications, a strip usually covers a large area of non-water surface. Thus, average intensity for the strip is unlikely to be skewed by anomalies such as highly reflecting surfaces. The present invention provides an intensity normalization module that normalizes the average intensity of each strip so that the mean and standard deviation are of a desired value. For example, a mean of 127 is the norm in photogrammetry. A standard deviation of 51 helps to spread the intensity value over an optimal range for visual perception of image features. Each strip may have been taken in different lighting conditions and, therefore, may have different imaging data profiles (i.e., mean intensity and standard deviation). This module normalizes the strips, such that all have the same mean and standard deviation. This enables the strips to be stitched together without visible seams.

This intensity normalization comprises a computation of the mean intensity for each channel R, G and B, and for all channels. The overall standard deviation is then computed. Each R, G and B value of each pixel is transformed to the new mean and standard deviation:

$$\text{new value}=\text{new mean}+(\text{old value}-\text{old mean})*(\text{new std}/\text{old std}).$$

Next, multiple adjacent strips are combined to produce tiled mosaics for an area of interest. Finished tiles can correspond to the USGS quads or quarter-quads. Stitching strips into mosaics is similar to stitching mosaics together to generate strips, with strips now taking the role of the mosaics. At the seam line between two strips, problems may arise if the line crosses elevated structures such as buildings, bridges, etc. This classic problem in photogrammetry arises from the parallax caused by the same object being looked at from two different perspectives. During imaging of a building, for example, one strip may present a view from one side of the building while another strip presents a view from another side of the building. After the images are stitched together, the resulting mosaic may look like a tepee. In order to address this, a terrain-guided mosaicing process may be implemented to guide the placement of a seam line. For example, LIDAR or DEM data collected with, or analyzed from, image data may be processed to determine the configuration and shaping of images as they are mosaiced together. Thus, in some mosaiced images, a seam line may not be a straight line—instead comprising a seam line that shifts back and forth to snake through elevated structures.

Figure 8:
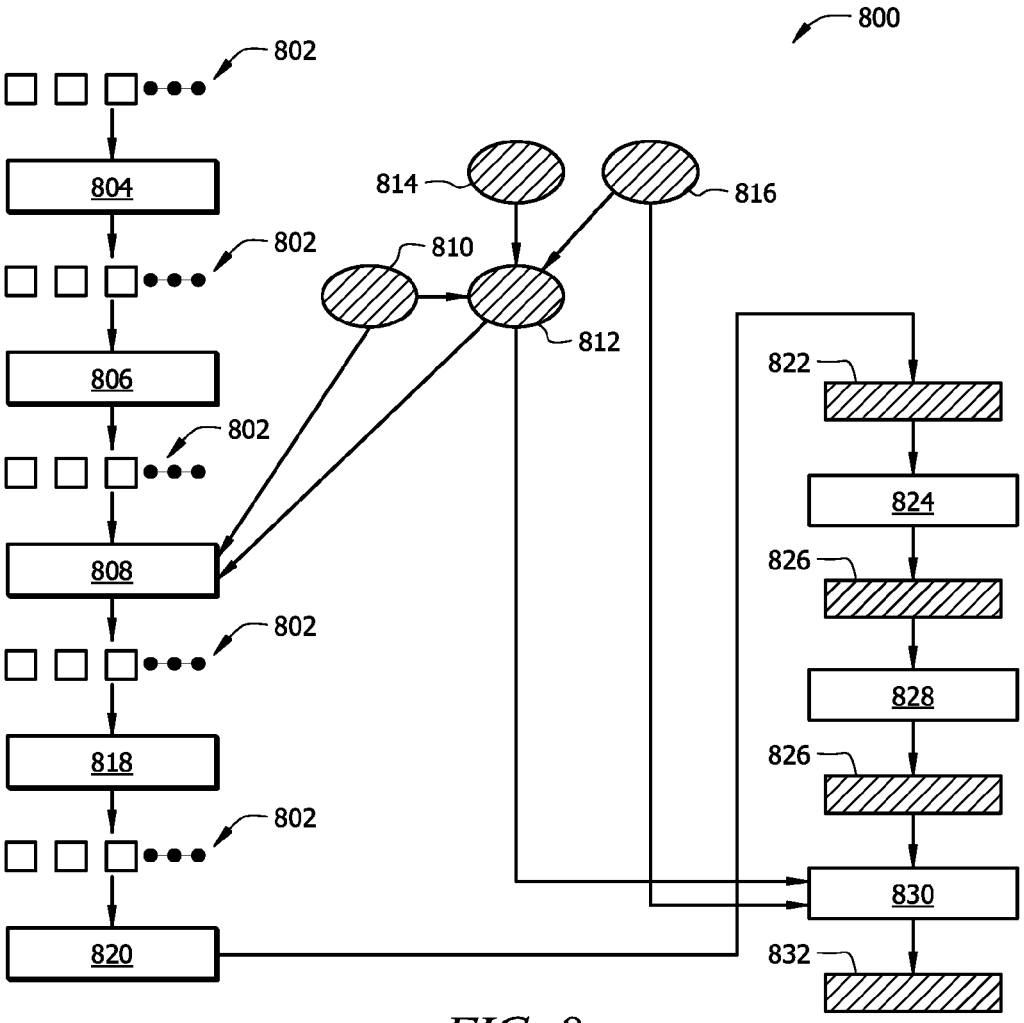
FIG. 8 illustrates one embodiment of an imaging process in accordance with the present invention.

Referring now to FIG. 8, one embodiment of an imaging process 800 is illustrated in accordance with the present invention as described above. Process 800 begins with a series 802 of one, or more, raw collected images. Images 802 are then processed through a white-balancing process 804, transforming them into a series of intermediate images. Series 802 is then processed through anti-vignetting function 806 before progressing to the orthorectification process 808. As previously noted, orthorectification may rely on position and attitude data 810 from the imaging sensor system or platform, and on DTM data 812. DTM data 812 may be developed from position data 810 and from, for example, USGS DTM data 814 or LIDAR data 816. Series 802 is now orthorectified and processing continues with color balancing 818. After color balancing, series 802 is converted by mosaicing module 820 into compound image 822. Module 820 performs the mosaicing and feathering processes during this conversion. Now, one or more compound images 822 are further combined in step 824, by mosaicing with a gradient and feathering, into image strip 826. Image strips are processed through intensity normalization 828. The now normalized strips 828 are mosaiced together in step 830, again by mosaicing with a gradient and feathering, rendering a finishing tiled mosaic 832. The mosaicing performed in step 830 may comprise a terrain-guided mosaicing, relying on DTM data 812 or LIDAR data 816.

Figure 9:
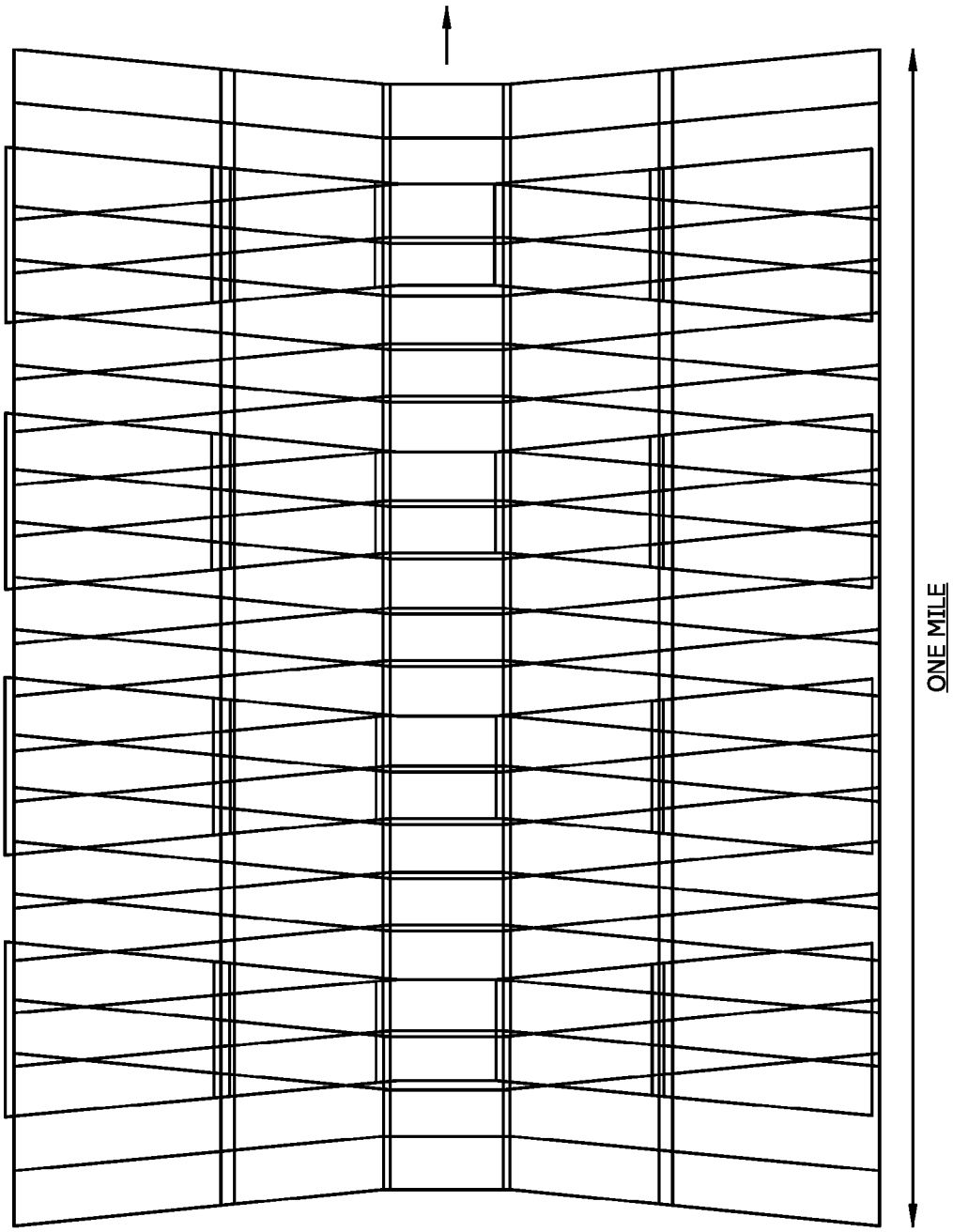
FIG. 9 illustrates diagrammatically how photos taken with the camera array assembly can be aligned to make an individual frame.

FIG. 9 illustrates diagrammatically how photos taken with the camera array assembly may be aligned to make an individual frame. This embodiment shows a photo patter illustration looking down from a vehicle, using data orthorectified from five cameras.

Figure 10:
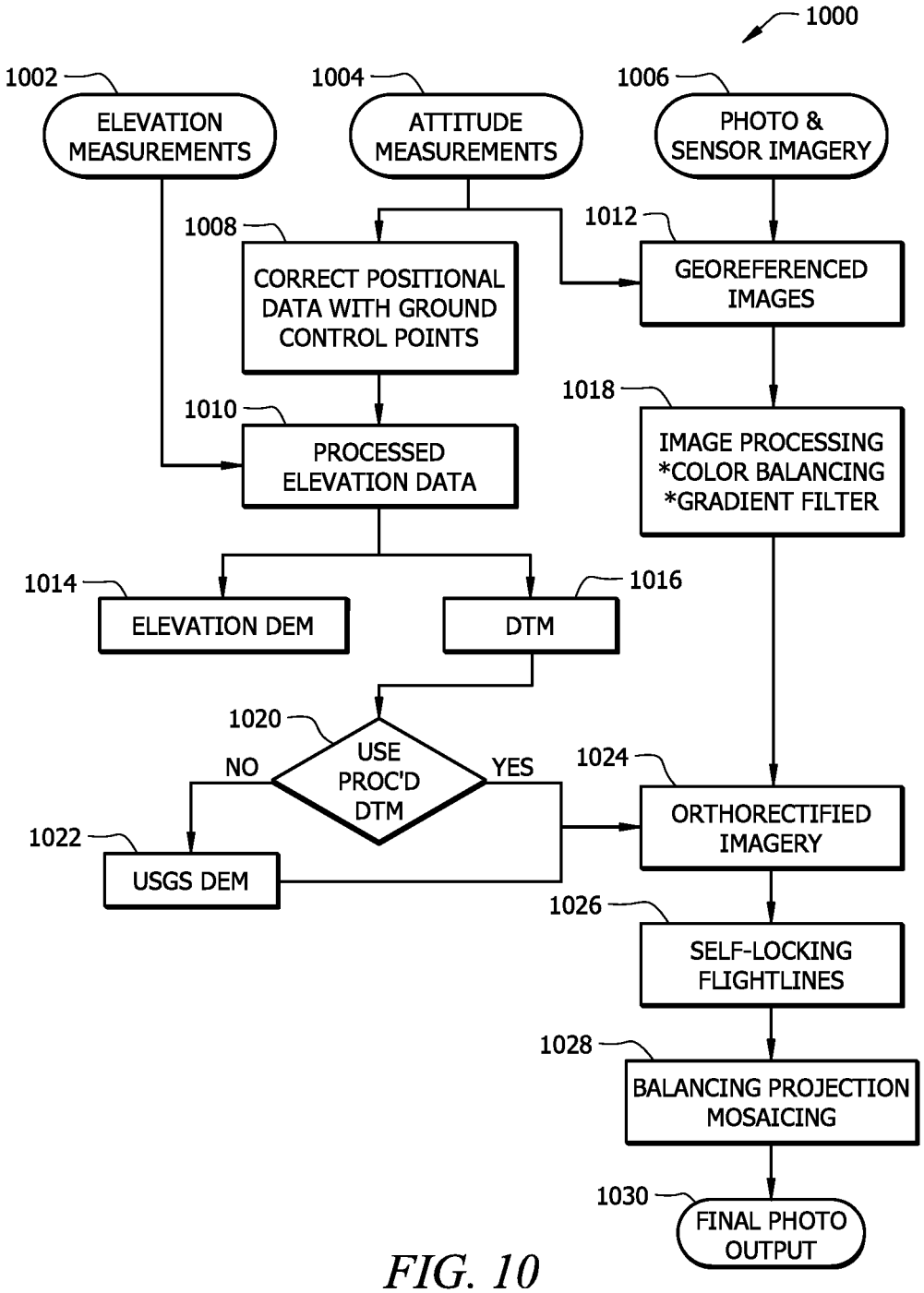
FIG. 10 is a block diagram of the processing logic according to certain embodiments of the present invention.

FIG. 10 is a block diagram of the processing logic according to certain embodiments of the present invention. As shown in block diagram 1000, the processing logic accepts one or more inputs, which may include elevation measurements 1002, attitude measurements 1004 and/or photo and sensor imagery 1006. Certain inputs may be passed through an initial processing step prior to analysis, as is shown in block 1008, wherein the attitude measurements are combined with data from ground control points. Elevation measurements 1002 and attitude measurements 1004 may be combined to generate processed elevation data 1010. Processed elevation data 1010 may then be used to generate elevation DEM 1014 and DTM 1016. Similarly, attitude measurements 1006 may be combined with photo and sensor imagery 1006 to generate georeferenced images 1012, which then undergo image processing 1018, which may include color balancing and gradient filtering.

Depending on the data set to be used (1020), either DTM 1016 or a USGS DEM 1022 is combined with processed images 1018 to generate orthorectified imagery 1024. Orthorectified imagery 1024 then feeds into self-locking flightlines 1026. Balancing projection mosaicing 1028 then follows, to generate final photo output 1030.

Figure 11:
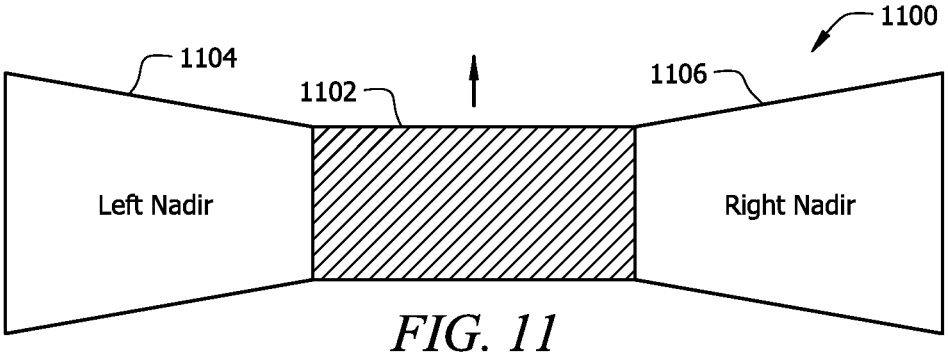
FIG. 11 is an illustration of lateral oversampling looking down from a vehicle according to certain embodiments of the present invention.
Figure 12:
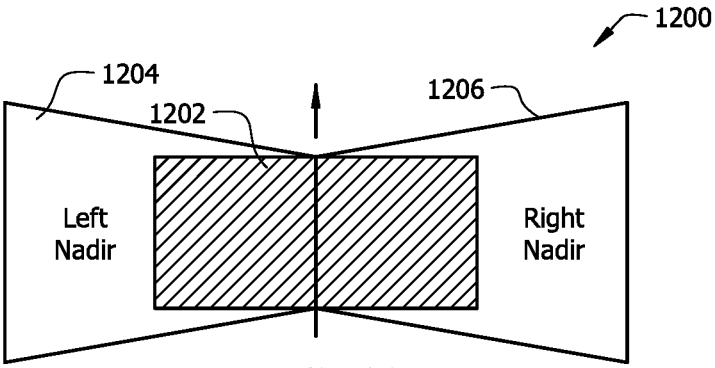
FIG. 12 is an illustration of lateral oversampling looking down from a vehicle according to certain embodiments of the present invention.

The present invention may employ a certain degree of lateral oversampling to improve output quality. FIG. 11 is an illustration of a lateral oversampling pattern 1100 looking down from a vehicle according to certain embodiments of the present invention showing minimal lateral oversampling. In this illustration, the central nadir region 1102 assigned to the center camera overlaps only slightly with the left nadir region 1104 and right nadir region 1106, so that overlap is minimized FIG. 12 is an illustration of a lateral oversampling pattern 1200 looking down from a vehicle according to certain embodiments of the present invention showing a greater degree of lateral oversampling. In this illustration, the central nadir region 1202 shows a high degree of overlap with left nadir region 1204 and right nadir region 1206.

Figure 13:
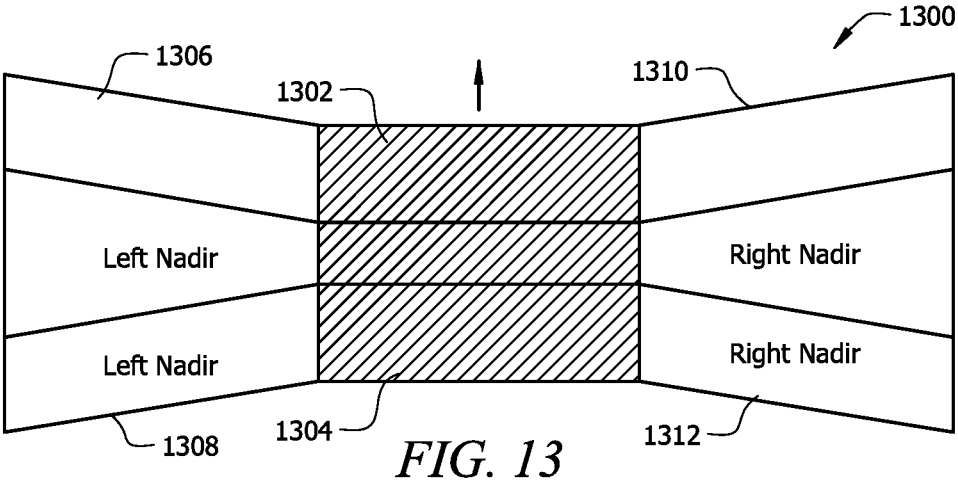
FIG. 13 is an illustration of flight line oversampling looking down from a vehicle according to certain embodiments of the present invention.

In addition to the use of lateral oversampling as shown in FIGS. 11 and 12, the present invention may employ flight line oversampling as well. FIG. 13 is an illustration of a flight line oversampling pattern 1300 looking down from a vehicle according to certain embodiments of the present invention showing a certain degree of flight line oversampling but minimal lateral oversampling. Central nadir regions 1302 and 1304 are overlapped to one another along the flight line, but do not overlap laterally with left nadir regions 1306 and 1308 or with right nadir regions 1310 and 1312.

Figure 14:
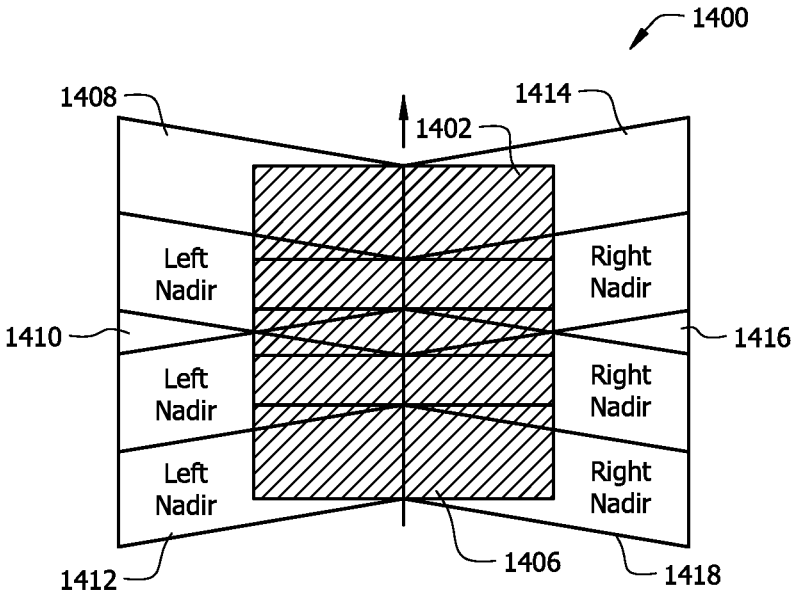
FIG. 14 is an illustration of flight line oversampling looking down from a vehicle according to certain embodiments of the present invention.

FIG. 14 is an illustration of flight line oversampling looking down from a vehicle according to certain embodiments of the present invention showing significant flight line oversampling as well as significant lateral oversampling. It can be seen that each of the central nadir regions 1402 through 1406 are significantly overlapped with one another as well as with left nadir regions 1408 through 1412 and right nadir regions 1414 through 1418. Left nadir regions 1408 through 1412 are overlapped with one another, as are right nadir regions 1414 through 1418. Accordingly, each point on the surface is sampled at least twice, and in some cases as many as four times. This technique uses the fact that in the area of an image that is covered twice, or more, by different camera sensors, a doubling of the image resolution is possible in both the lateral (across path) and flight line (along path) directions for an overall quadrupling of the resolution. In practice, the improvement in image/sensor resolution is somewhat less than doubled in each of the dimensions, approximately 40% in each dimension, or $1.4\times 1.4=\sim 2$ times. This is due to the statistical variations of the sub-pixel alignment/orientation. In effect, the pixel grid is rarely exactly equidistant from the overlaid pixel grid. If extremely precise lateral camera sensor alignments were made at the sub-pixel level, a quadrupling of image resolution could be realized.

Figure 15:
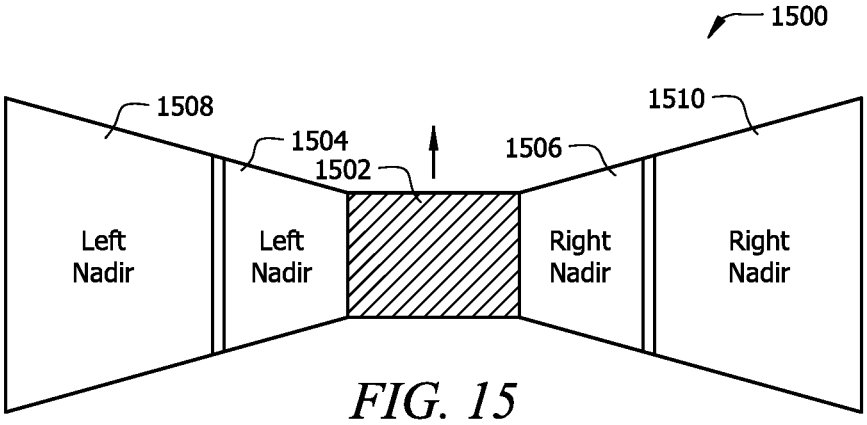
FIG. 15 is an illustration of progressive magnification looking down from a vehicle according to certain embodiments of the present invention.

FIG. 15 is an illustration of a progressive magnification pattern 1500 looking down from a vehicle according to certain embodiments of the present invention. Central nadir region 1502 is bounded on its left and right edges by inner left nadir region 1504 and inner right nadir region 1506, respectively. Inner left nadir region 1504 is bounded on its left edge by outer left nadir region 1508, while inner right nadir region 1506 is bounded on its right edge by outer right nadir region 1510. Note that these regions exhibit a minimal degree of overlap and oversampling from one to another.

Figure 16:
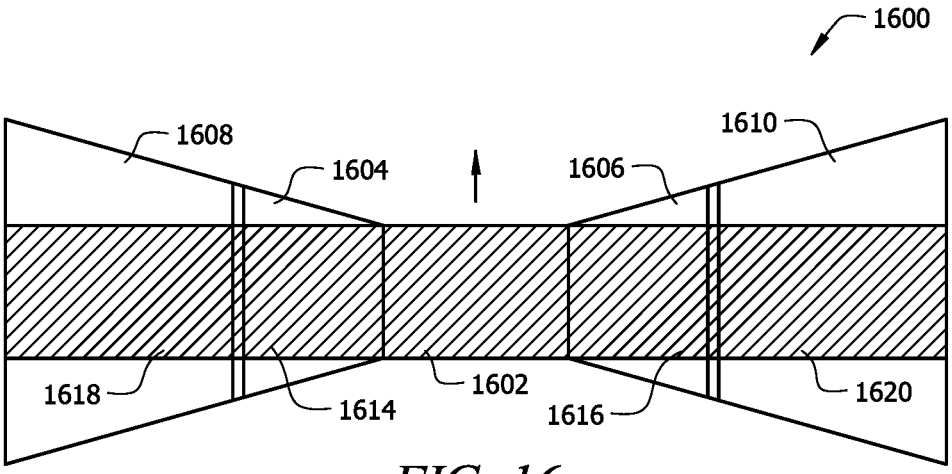
FIG. 16 is an illustration of progressive magnification looking down from a vehicle according to certain embodiments of the present invention.

FIG. 16 is an illustration of a progressive magnification pattern 1600 looking down from a vehicle according to certain embodiments of the present invention. Central nadir region 1602 is bounded on its left and right edges by inner left nadir region 1604 and inner right nadir region 1606, respectively. Inner left nadir region 1604 is bounded on its left edge by outer left nadir region 1608, while inner right nadir region 1606 is bounded on its right edge by outer right nadir region 1610. Note that, as above, these regions exhibit a minimal degree of overlap and oversampling from one to another. Within each of the nadir regions 1604 through 1610, there is a central image region 1614 through 1620 shown shaded in grey.

Figure 17:
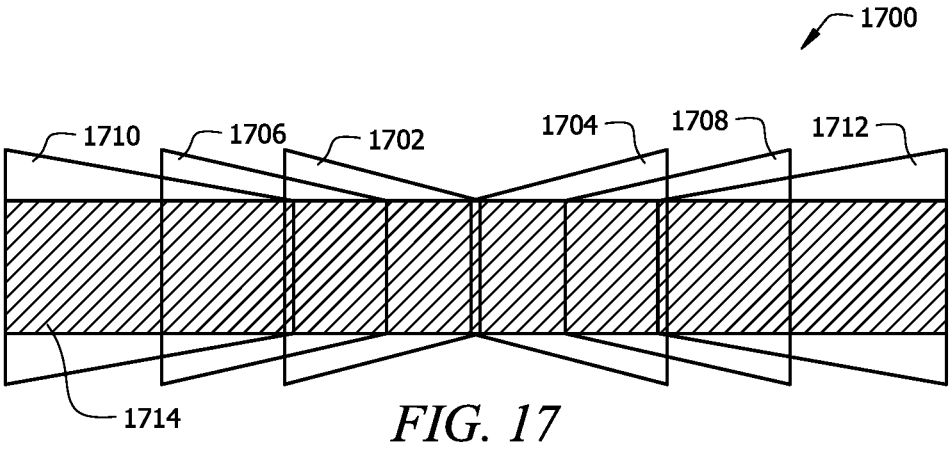
FIG. 17 is an illustration of progressive magnification looking down from a vehicle according to certain embodiments of the present invention.

FIG. 17 is an illustration of a progressive magnification pattern 1700 looking down from a vehicle according to certain embodiments of the present invention. In the center of pattern 1700, a left inner nadir region 1702 and a right inner nadir region 1704 overlap in the center. A left intermediate nadir region 1706 and a right intermediate nadir region 1708 are disposed partly outside of regions 1702 and 1704, respectively, each sharing an overlapping area with the respective adjacent area by approximately 50%. An outer left nadir region 1710 and an outer right nadir region 1712 are disposed partly outside of regions 1706 and 1708, respectively, each sharing an overlapping area with the respective adjacent area by approximately 50%. A central image region 1714 is disposed in the center of pattern 1700, comprised of the central portions of nadir regions 1702 through 1712.

FIG. 18 depicts a schematic of the architecture of a system 1800 according to certain embodiments of the present invention. System 1800 may include one or more GPS satellites 1802 and one or more SATCOM satellites 1804. One or more GPS location systems 1806 may also be included, operably connected to one or more modules 1808 collecting LIDAR, GPS and/or X, Y, Z location data and feeding such information to one or more data capture system applications 1812. One or more data capture system applications 1812 may also receive spectral data from a camera array 1822. A DGPS 1810 may communicate with one or more SATCOM satellites 1804 via a wireless communications link 1826. One or more SATCOM satellites 1804 may, in turn, communicate with one or more data capture system applications 1812.

One or more data capture system applications 1812 may interface with an autopilot 1816, an SSD and/or a RealTime StitchG system 1820, which may also interact with one another. SSD 1814 may be operably connected to RealTime DEM 1818. Finally, RealTime DEM 1818 and RealTime StitchG 1820 may be connected to a storage device, such as disk array 1824.

Figure 19:
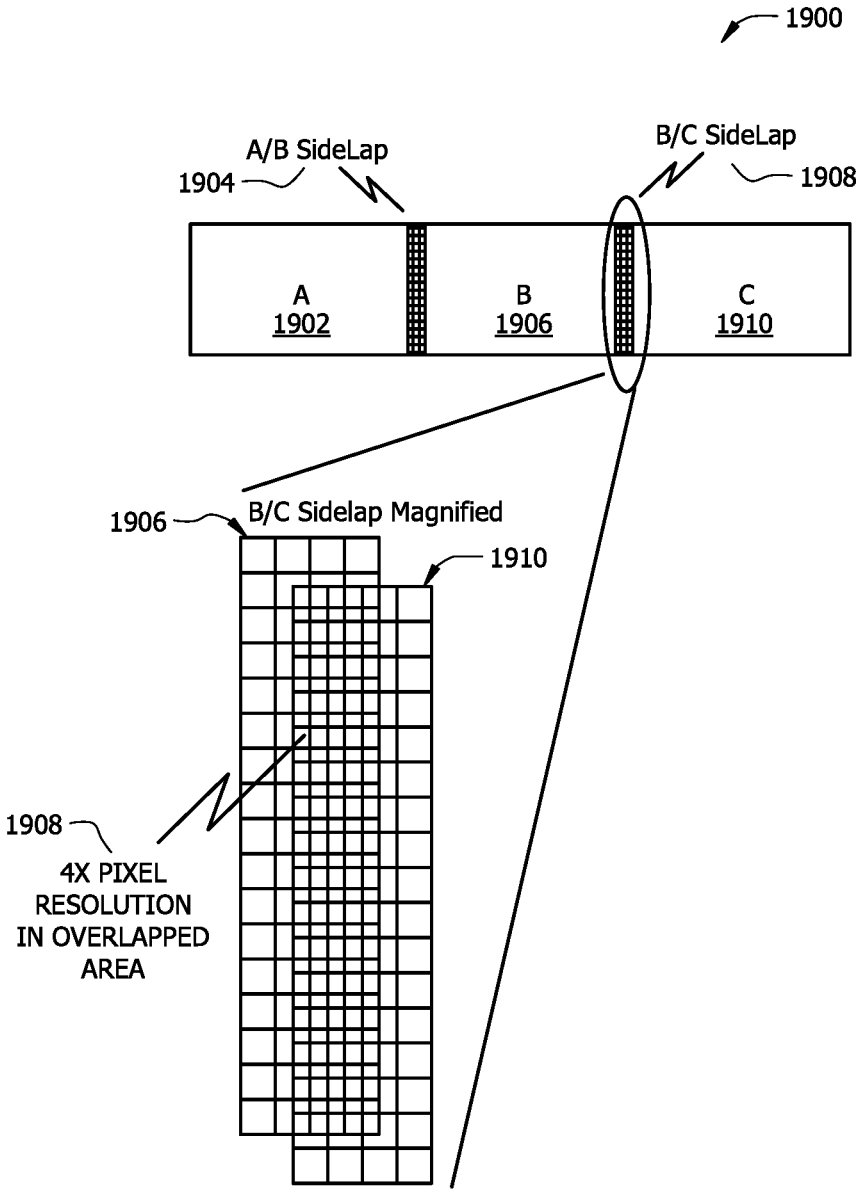
FIG. 19 is an illustration of lateral co-mounted, co-registered oversampling in a sidelap sub-pixel area for a single camera array looking down from a vehicle according to certain embodiments of the present invention.

The present invention may employ a certain degree of co-mounted, co-registered oversampling to overcome physical pixel resolution limits. FIG. 19 is an illustration of a lateral co-mounted, co-registered oversampling configuration 1900 for a single camera array 112 looking down from a vehicle according to certain embodiments of the present invention showing minimal lateral oversampling. The cameras overlap a few degrees in the vertical sidelap area 1904 and 1908. Whereas FIG. 19 depicts a 3-camera array, these subpixel calibration techniques work equally well when utilizing any number of camera sensors from 2 to any number of cameras being calibrated.

Similar to the imaging sensors in FIGS. 3 and 4, the camera sensors may be co-registered to calibrate the physical mount angle offset of each sensor relative to each other and/or to the nadir camera. This provides an initial, "close" calibration. These initial calibration parameters may be entered into an onboard computer system 104 in the system 100, and updated during flight using oversampling techniques.

Referring now to FIG. 19, the rectangles labeled A, B, and C represent image areas 1902, 1906 and 1910 from a 3-camera array C-B-A (not shown). Images of areas 1902, 1906 and 1910 taken by cameras A through C (not shown), respectively, are illustrated from an overhead view. Again, similar to FIGS. 3 and 4, because of the "cross-eyed" arrangement, the image of area 1902 is taken by right camera A, the image of area 1906 is taken by center/nadir camera B, and the image of area 1910 is taken by left camera C. Cameras A through C form an array (not shown) that is, in most applications, pointed down vertically.

In FIG. 19, the hatched areas labeled A/B and B/C sidelaps represent image overlap areas 1904 and 1908, respectively. The left image overlap area 1904 is where right camera A overlaps with the center/nadir camera B, and the right image overlap area 1908 is where the left camera C overlaps with the center/nadir camera B. In these sidelap areas 1904 and 1908, the camera sensor grid bisects each pixel in the overlap areas 1904 and 1908, which effectively quadruples the image resolution in these areas 1904 and 1908 via the mechanism of co-mounted, co-registered oversampling. In effect, the improvement in image/sensor resolution is doubled in each dimension, or $2\times2=4$ times. This quadrupling of the image resolution also quadruples the alignment precision between adjacent cameras.

Further, this quadrupling of alignment precision between adjacent cameras improves the systems 100 alignment precision for all sensors affixed to a rigid mount plate. The cameras and sensors are affixed to a rigid mount unit, which is affixed to the rigid mount plate, as discussed above. In particular, when the angular alignment of adjacent cameras affixed to the rigid mount unit is improved, the angular alignment of the other sensors is also enhanced. This enhancement of alignment precision for the other sensors affixed to the rigid mount plate also improves the image resolution for those sensors.

Figure 20:
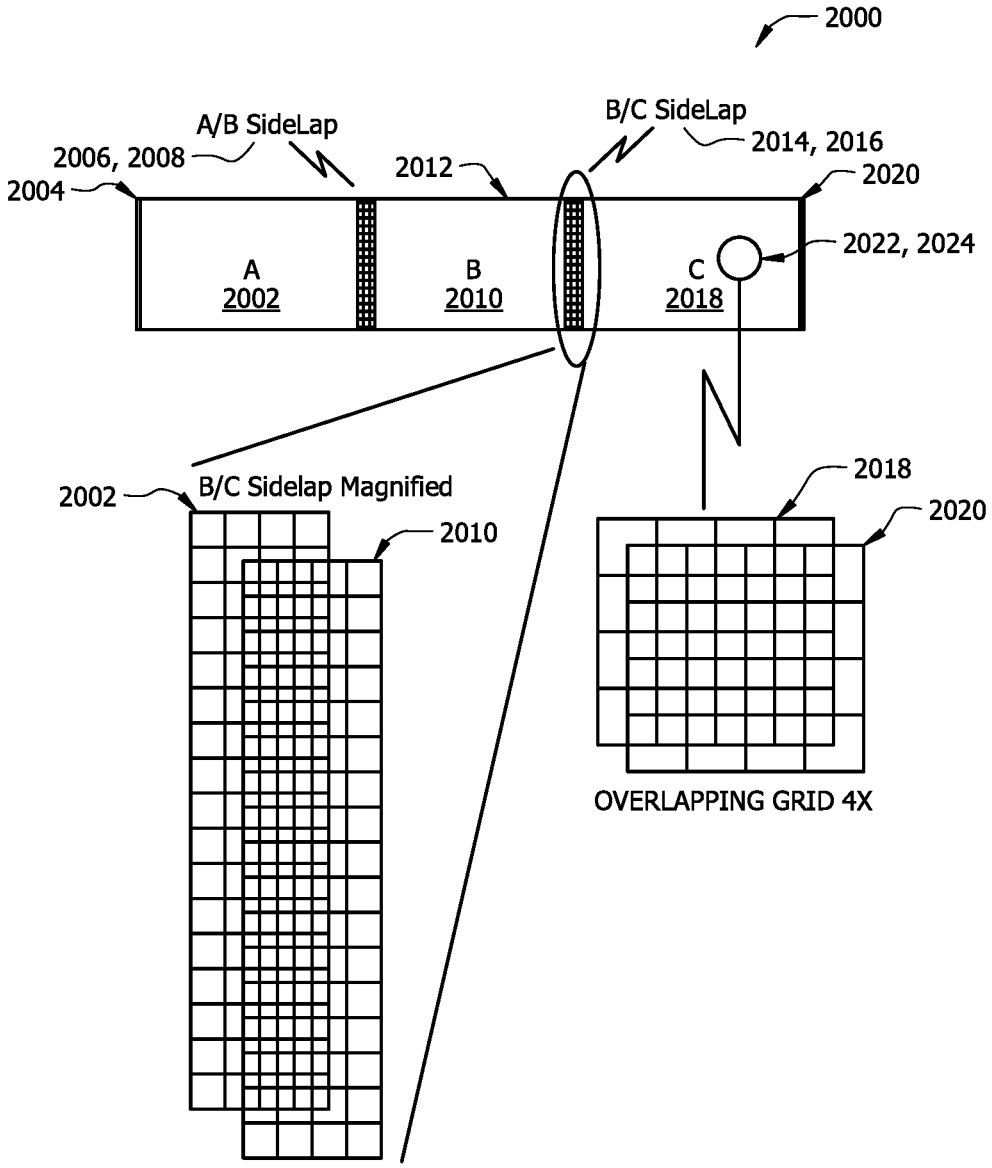
FIG. 20 is an illustration of lateral co-mounted, co-registered oversampling in a sidelap sub-pixel area for two overlapping camera arrays looking down from a vehicle according to certain embodiments of the present invention.

A lateral co-mounted, co-registered oversampling configuration 2000 for two overlapping camera arrays 112 is illustrated in FIG. 20. In particular, FIG. 20 is an illustration of a lateral co-mounted, co-registered oversampling configuration 2000 for two overlapping camera arrays 112 looking down from a vehicle according to certain embodiments of the present invention showing maximum lateral oversampling. The adjacent cameras overlap a few degrees in the vertical sidelap areas 2006, 2008, 2014 and 2016, and the corresponding cameras overlap completely in the image areas 2002, 2010, 2018 and 2004, 2012, 2020. Whereas FIG. 20 depicts two 3-camera arrays, these subpixel calibration techniques work equally well when utilizing two overlapping camera arrays with any number of camera sensors from 2 to any number of cameras being calibrated.

Similar to the imaging sensors in FIGS. 3 and 4, the camera sensors may be co-registered to calibrate the physical mount angle offset of each sensor relative to each other and/or to the nadir camera. In this embodiment, multiple, i.e., at least two, rigid mount units are affixed to a rigid mount plate and are co-registered. This provides an initial, "close" calibration. These initial calibration parameters may be entered into an onboard computer system 104 in the system 100, and updated during flight.

Referring now to FIG. 20, the rectangles labeled A, B, and C represent image areas 2002, 2010, 2018, and 2004, 2012, 2020 from two overlapping 3-camera arrays C-B-A (not shown), respectively. Images of areas 2002, 2010, 2018, and 2004, 2012, 2020 taken by cameras A through C (not shown) and overlapping cameras A' through C' (not shown), respectively, are illustrated from an overhead view. Again, similar to FIGS. 3 and 4, because of the "cross-eyed" arrangement, the image of area 2002 is taken by right camera A, the image of area 2010 is taken by center/nadir camera B, and the image of area 2018 is taken by left camera C. Further, the image of area 2004 is taken by right camera A', the image of area 2012 is taken by center camera B', and the image of area 2020 is taken by left camera C'. Cameras A through C and overlapping cameras A' through C' form arrays (not shown) that are, in most applications, pointed down vertically.

In FIG. 20, the hatched areas labeled A/B and B/C sidelaps represent two overlapping image overlap areas 2006, 2008 and 2014, 2016, respectively. The left image overlap areas 2006, 2008 is where right camera A overlaps with the center/nadir camera B, and where right camera A' overlaps with the center camera B', respectively. The right image overlap areas 2014 and 2016 is where the left camera C overlaps with the center/nadir camera B, and where the left camera C' overlaps with the center camera B'. In these sidelap areas 2006, 2008 and 2014, 2016, respectively, the camera sensor grid bisects each pixel in the overlap areas 2006, 2008 and 2014, 2016, which effectively quadruples the image resolution in these areas 2006, 2008 and 2014, 2016 via the mechanism of co-mounted, co-registered oversampling. In effect, the improvement in image/sensor resolution is doubled in each dimension, or 2×2=4 times. This quadrupling of the image resolution quadruples the alignment precision between adjacent cameras, as discussed above.

By having two overlapping camera arrays, the image resolution is effectively quadrupled again for the overlapping sidelap overlap areas 2006, 2008 and 2014, 2016. This results in an astounding overall 64 times improvement in system 100 calibration and camera alignment.

In the overlapping sidelap areas 2006 and 2008, the overlapping camera sensor grids bisects each pixel in the sidelap areas 2006 and 2008, which effectively quadruples the image resolution in these areas 2006 and 2008 via the mechanism of co-mounted, co-registered oversampling. Similarly, in the overlapping sidelap areas 2014 and 2016, the overlapping camera sensor grids bisects each pixel in the sidelap areas 2014 and 2016, which effectively quadruples the image resolution in these areas 2014 and 2016. In effect, the improvement in image/sensor resolution is again doubled in each dimension, or 2×2×2×2×2×2=64 times. This overall 64 times improvement of the image resolution also enhances alignment precision by 64 times between adjacent cameras.

This 64 times improvement of alignment precision between adjacent and corresponding cameras enhances the systems 100 alignment precision for all sensors affixed to a rigid mount plate. Cameras A through C and, optionally, other sensors are affixed to a first rigid mount unit and cameras A' through C' and, optionally, other sensors are affixed to a second rigid mount unit, which are each affixed to a rigid mount plate. In particular, when the angular alignment of adjacent and/or corresponding cameras affixed to the first and/or second rigid mount units is improved, the angular alignment of the other sensors is also enhanced. This enhancement of alignment precision for the other sensors affixed to the rigid mount plate also improves the image resolution for those sensors.

By having two overlapping camera arrays, the image resolution is effectively quadrupled for the entire image, not just for the A/B and B/C sidelap overlap areas. Referring now to FIG. 20, the overlapping grid detail labeled "OVERLAPPING GRID 4X" represents overlapping areas 2022 and 2024 in right images areas 2018 and 2020, respectively. In the overlapping areas 2022 and 2024, the overlapping camera sensor grids bisects each pixel in the overlapping areas 2022 and 2024, which effectively quadruples the image resolution in these areas 2022 and 2024 via the mechanism of co-mounted, co-registered oversampling. In effect, the improvement in image resolution is doubled in each dimension, or 2×2=4 times.

In a preferred embodiment, one camera array is monochrome, and another camera array is red-green-blue. Even though each array covers different color bands, simple image processing techniques are used so that all color bands realize the benefit of this increased resolution. Another advantage provided by these techniques is that, in the case where one camera array is red-green-blue and the other, overlapping camera array is an infrared or near infrared (or some other bandwidth), which results in a superior multi-spectral image.

Accordingly, all of the improvements (i.e., 4 times) identified for the embodiment of FIG. 19 discussed above apply to the embodiment of FIG. 20, however, additional significant enhancements (i.e., 64 times) to the systems 100 calibration precision and overall image resolution may be realized through the two overlapping camera arrays.

Figure 21:
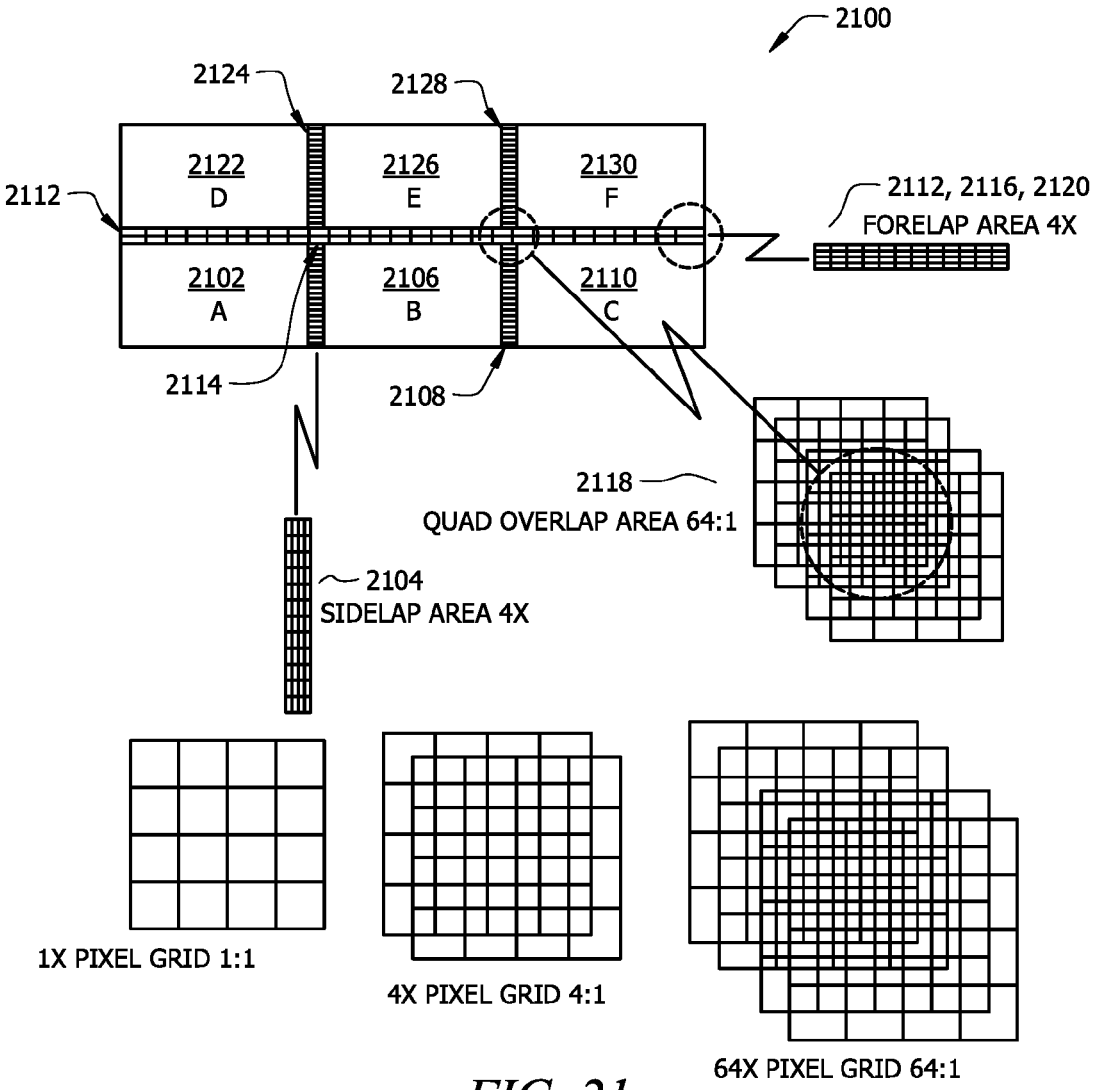
FIG. 21 is an illustration of fore and lateral co-mounted, co-registered oversampling in sidelap sub-pixel areas for two stereo camera arrays looking down from a vehicle according to certain embodiments of the present invention.

FIG. 21 is an illustration of a fore and lateral co-mounted, co-registered oversampling configuration 2100 for two camera arrays 112 looking down from a vehicle according to certain embodiments of the present invention. In particular, FIG. 21 is an illustration of a fore and lateral co-mounted, co-registered oversampling configuration 2100 for two overlapping camera arrays 112 looking down from a vehicle according to certain embodiments of the present invention showing minimal fore and minimal lateral oversampling. The adjacent cameras overlap a few degrees in the vertical sidelap areas 2104, 2108, 2124 and 2128, and the corresponding cameras overlap a few degrees along the horizontal forelap areas 2112, 2116 and 2120. Whereas FIG. 21 depicts two 3-camera arrays, these subpixel calibration techniques work equally well when utilizing two overlapping camera arrays with any number of camera sensors from 2 to any number of cameras being calibrated.

Similar to the imaging sensors in FIGS. 3 and 4, the camera sensors may be co-registered to calibrate the physical mount angle offset of each sensor relative to each other and/or to the nadir camera. In this embodiment, multiple, i.e., at least two, rigid mount units are affixed to a rigid mount plate and are co-registered. This provides an initial, "close" calibration. These initial calibration parameters may be entered into an onboard computer system 104 in the system 100, and updated during flight.

Referring now to FIG. 21, the rectangles labeled A, B, and C represent image areas 2102, 2106 and 2110 from a 3-camera array C-B-A (not shown), and the rectangles D, E, and F represent image areas 2122, 2126 and 2130 from a 3-camera array F-E-D (not shown), respectively. Images of areas 2102, 2106 and 2110 taken by cameras A through C (not shown), and images of areas 2122, 2126 and 2130 taken by cameras D through F (not shown), respectively, are illustrated from an overhead view. Again, similar to FIGS. 3 and 4, because of the "cross-eyed" arrangement, the rear, left image of area 2102 is taken by rear, right camera A, the rear, center image of area 2106 is taken by rear, center/nadir camera B, and the rear, right image of area 2110 is taken by rear, left camera C. Further, the forward, left image of area 2122 is taken by forward, right camera D, the forward, center image of area 2126 is taken by forward, center camera E, and the forward, right image of area 2020 is taken by forward, left camera F. Cameras A through C and overlapping cameras D through F form arrays (not shown) that are, in most applications, pointed down vertically.

In FIG. 21, the vertical hatched areas represent four image overlap areas 2104, 2108, 2124 and 2128. The rear, left image overlap area 2104 is where rear, right camera A overlaps with the center/nadir camera B, and the rear, right image overlap area 2108 is where rear, left camera C overlaps with the center/nadir camera B. The forward, left image overlap area 2124 is where forward, right camera D overlaps with the center/nadir camera E, and the forward, right image overlap area 2128 is where forward, left camera F overlaps with the center camera E.

Referring now to FIG. 21, the overlapping grid detail labeled "SIDELAP AREA 4:1" represents overlaping sidelap overlap areas 2104, 2108 and 2124, 2128. In these sidelap overlap areas 2104, 2108, 2124 and 2128, the camera sensor grid bisects each pixel in the overlap areas 2104, 2108, 2124 and 2128, which effectively quadruples the image resolution in these areas 2104, 2108, 2124 and 2128 via the mechanism of co-mounted, co-registered oversampling. In effect, the improvement in image/sensor resolution is doubled in each dimension, or 2×2=4 times. This quadrupling of the image resolution quadruples the alignment precision between adjacent cameras, as discussed above.

This quadrupling of alignment precision between adjacent cameras improves the systems 100 alignment precision for all sensors affixed to a rigid mount plate. Cameras A through C and, optionally, other sensors are affixed to a first rigid mount unit and cameras D through F and, optionally, other sensors are affixed to a second rigid mount unit, which are each affixed to a rigid mount plate. In particular, when the angular alignment of adjacent cameras affixed to the first or second rigid mount units is improved, the angular alignment of the other sensors affixed to the mount unit is also enhanced. This enhancement of alignment precision for the other sensors affixed to the rigid mount plate also improves the image resolution for those sensors.

Similarly, the horizontal hatched areas represent three image overlap areas 2112, 2116 and 2120. The forward, left image overlap area 2112 is where rear, right camera A overlaps with the forward, right camera D, forward, center image overlap area 2116 is where rear, center/nadir camera B overlaps with the forward, center camera E, and the rear, right image overlap area 2120 is where rear, left camera C overlaps with forward, left camera F.

Referring now to FIG. 21, the overlapping grid detail labeled "FORELAP AREA 4:1" represents overlaping forelap overlap areas 2112, 2116 and 2120. In these forelap overlap areas 2112, 2116 and 2120, the camera sensor grid bisects each pixel in the overlap areas 2112, 2116 and 2120, which effectively quadruples the image resolution in these areas 2112, 2116 and 2120 via the mechanism of co-mounted, co-registered oversampling. In effect, the improvement in image/sensor resolution is doubled in each dimension, or 2×2=4 times. This quadrupling of the image resolution quadruples the alignment precision between corresponding cameras.

This quadrupling of alignment precision between corresponding cameras improves the systems 100 alignment precision for all sensors affixed to a rigid mount plate. Cameras A through C and, optionally, other sensors are affixed to a first rigid mount unit and cameras D through F and, optionally, other sensors are affixed to a second rigid mount unit, which are each affixed to a rigid mount plate. In particular, when the angular alignment of corresponding cameras affixed to the first or second rigid mount units is improved, the angular alignment of the other sensors is also enhanced. This enhancement of alignment precision for the other sensors affixed to the rigid mount plate also improves the image resolution for those sensors.

Similar to the overlapping sidelap overlap areas 2006, 2008 and 2014, 2016 in FIG. 20, the intersecting forelap and sidelap overlap areas 2114 and 2118 in FIG. 21 results in an astounding overall 64 times improvement in system calibration and camera alignment. Referring now to FIG. 21, the intersecting grid detail labeled "QUAD OVERLAP AREA 64:1" represents intersecting forelap and sidelap overlap area 2118. In the intersecting forelap and sidelap overlap areas 2114 and 2118, the overlapping camera sensor grids bisects each pixel in the intersecting areas 2114 and 2118, which effectively quadruples the image resolution in these areas 2114 and 2118 via the mechanism of co-mounted, co-registered oversampling. In effect, the improvement in image/sensor resolution is again doubled in each dimension, or 2×2×2×2×2×2=64 times. This overall 64 times improvement of the image resolution also enhances alignment precision by 64 times between adjacent cameras.

This 64 times improvement of alignment precision between adjacent and corresponding cameras enhances the systems 100 alignment precision for all sensors affixed to a rigid mount plate. Cameras A through C and, optionally, other sensors are affixed to a first rigid mount unit and cameras D through E and, optionally, other sensors are affixed to a second rigid mount unit, which are each affixed to a rigid mount plate. In particular, when the angular alignment of adjacent and/or corresponding cameras affixed to the first and/or second rigid mount units is improved, the angular alignment of the other sensors is also enhanced. This enhancement of alignment precision for the other sensors affixed to the rigid mount plate also improves the image resolution for those sensors.

In a preferred embodiment, one camera array is monochrome, and another camera array is red-green-blue. Even though each array covers different color bands, simple image processing techniques are used so that all color bands realize the benefit of this increased resolution. Another advantage provided by these techniques is that, in the case where one camera array is red-green-blue and the other, overlapping camera array is an infrared or near infrared (or some other bandwidth), which results in a superior multi-spectral image.

As shown in FIGS. 19-21, these techniques may be used to overcome the resolution limits imposed on camera systems due to the inability of optical glass to resolve "very small" objects. In particular, there are known physical limits to the ability of optical glass in camera lenses to resolve very small objects. This is often called "the resolving limit of glass". For example, if 1 millimeter pixels are required from 10,000 feet of altitude, the use of an extremely high magnification telescopic lens would be required to obtain a ground swath of about 100 feet. This is because no matter how many pixels can be produced by a charged-coupled device sensor (e.g., 1 billion pixels), the resolving power of the purest glass would not permit image resolution to 1 millimeter pixels at 10,000 feet of altitude. This example is used to make the point that there are physical limits for pixel resolution in glass as well as pixel density limits for an imaging sensor.

The systems 100 imaging sensor alignment in the rigid mount unit(s) affixed to the rigid mount plate and related calibration techniques provide a unique solution to this problem, as described above. By using these techniques, the resolving limitations of glass can effectively be overcome. For example, a single camera array results in 1 times (or no) oversampling benefits. However, two overlapping camera arrays results in 4 times overall improvement in both image resolution and overall geospatial horizontal and vertical accuracy. Further, three overlapping camera arrays results in 16 times overall improvement, four overlapping camera arrays results in 64 times overall improvement, and so on.

As can be deduced from these examples, the equation for overall improvement is as follows:

$$\text{overall improvement}=4^N$$

where N is the number of overlapping camera arrays.

If there are four camera arrays, then there are three overlapping camera arrays (i.e., N=3). Accordingly, four camera arrays provide a 64 times (i.e., $4^3$=64 times) overall improvements in both the image resolution and overall geospatial horizontal and vertical accuracy.

Further, these subpixel calibration techniques may be combined with the self-locking flight path techniques, as disclosed in U.S. Publication No. 2004/0054488A1, now U.S. Pat. No. 7,212,938B2, the disclosure of which is hereby incorporated by reference in full.

In addition to fore and/or lateral co-mounted, co-registered oversampling as shown in FIGS. 19-21, the present invention may also employ flight line oversampling as well to further improve the image resolution, as shown in FIGS. 13-17. As shown in FIGS. 13-17, the flight lines overlap each other in an image region because each flight line is parallel to one another. These overlapping image regions may be used to calibrate the sensors by along-track and cross-track parallax of images in adjacent flight lines using stereographic techniques.

In an embodiment, the self-locking flight path may comprise any pattern that produces at least three substantially parallel travel lines out of a group of three or more travel lines. Further, at least one of the travel lines should be in an opposing direction to the other substantially parallel travel lines. In a preferred embodiment, the travel pattern comprises at least one pair of travel lines in a matching direction and at least one pair of travel lines in an opposing direction.

When using the self-locking flight path in opposite directions, the observable positional error may be doubled in some image regions. According, the self-locking flight path technique includes an algorithm to significantly reduce these positional errors. This reduction in positional errors is especially important in the outside, or far left and far right "wing" image areas where the greatest positional errors occur.

In an embodiment, these positional improvements may be realized by using a pattern matching technique to automatically match a pixel pattern area obtained from a flight line (e.g., North/South) with the same pixel pattern area obtained from an adjacent flight line (e.g., North/South). In a preferred embodiment, the latitude/longitude coordinates from one or more GPS location systems may be used to accelerate this pattern matching process.

Similarly, these subpixel calibration and self-locking flight path techniques may be combined with stereographic techniques because stereographic techniques rely heavily on the positional accuracy of each pixel relative to all other pixels. In particular, these techniques improve the stereographic image resolution and overall geospatial horizontal and vertical accuracy, especially, in the far left and far right "wing" image areas, where the greatest positional errors occur. Further, stereographic techniques are used to match known elevation data with the improved stereographic datasets. Accordingly, the combined subpixel calibration, self-locking flight path and stereographic techniques provide a greatly improved Digital Elevation Model, which results in superior image.

Further, these subpixel calibration and self-locking flight path techniques may be used to provide a dynamic, Real-Time calibration of the system 100. In particular, these techniques provide the ability to rapidly "roll on" one or more camera array assemblies 112 onto the system 100, to immediately begin collecting image data of a target area and to quickly produce high-quality images because the individual sensors have been initially calibrated in the rigid mount unit(s) affixed to the rigid mount plate, as discussed above. In particular, the camera sensors are co-registered to calibrate the physical mount angle offset of each sensor relative to each other and/or to the nadir camera. In an embodiment, multiple, i.e., at least two, rigid mount units are affixed to a rigid mount plate and are co-registered. This provides an initial, "close" calibration. These initial calibration parameters may be entered into an onboard computer system 104 in the system 100, and updated during flight using oversampling techniques, as discussed above.

In an embodiment, the system 100 comprises a RealTime, self-calibrating system to update the calibration parameters. In particular, the onboard computer 104 software comprises a RealTime software "daemon" (i.e., a background closed-loop monitoring software) to constantly monitor and update the calibration parameters using the co-mounted, co-registered oversampling and flight line oversampling techniques, as discussed above. In a preferred embodiment, the Real-Time daemon combines subpixel calibration, self-locking flight path and stereographic techniques to improve the stereographic image resolution and overall geospatial horizontal and vertical accuracy. In particular, stereographic techniques are used to match known elevation data to the improved stereographic datasets. Accordingly, the combined subpixel calibration, self-locking flight path and stereographic techniques provide a greatly improved Digital Elevation Model, which results in superior image.

In an embodiment, the system 100 comprises a RealTime GPS data system to provide GPS input data. Calibration accuracy is driven by input data from electronic devices such as a GPS and an IMU, and by calibration software which is augmented by industry standard GPS and IMU software systems. Accordingly, a key component of this RealTime, self-calibrating system is a RealTime GPS input data via a potentially low bandwidth communication channel such as satellite phone, cell phone, RF modem, or similar device. Potential sources for the RealTime GPS input data include project controlled ad-hoc stations, fixed broadcast GPS locations (or similar) or inertial navigation via an onboard IMU.

The modules, algorithms and processes described above can be implemented in a number of technologies and configurations. Embodiments of the present invention may comprise functional instances of software or hardware, or combinations thereof. Furthermore, the modules and processes of the present invention may be combined together in a single functional instance (e.g., one software program), or may comprise operatively associated separate functional devices (e.g., multiple networked processor/memory blocks). All such implementations are comprehended by the present invention.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A system for generating a map of a target area, comprising:

a global positioning receiver;

an imaging sensor system having a view of the target area, comprising:

a rigid mount unit having at least two imaging sensors disposed within the mount unit, wherein a first imaging sensor and a second imaging sensor each has a focal axis passing through an aperture in the mount unit, wherein the first imaging sensor generates a first image area comprising a first data array of pixels and the second imaging sensor generates a second image area comprising a second data array of pixels, wherein the first and second imaging sensors are offset to have a first image overlap area in the target area, wherein the first sensors image data bisects the second sensors image data in the first image overlap area; and a computer in communication with [the] *a* global positioning antenna, the first imaging sensor, and the second imaging sensor; correlating at least a portion of the image areas from the first imaging sensor and the second imaging sensor to a portion of the target area based on input from the global positioning antenna.

2. The system of claim 1 further comprising:

a third imaging sensor disposed within the mount unit, wherein the third imaging sensor has a focal axis passing through the aperture in the mount unit, wherein the third imaging sensor generates a third image area comprising a third data array of pixels.

3. The system of claim 2, further comprising:

a fourth imaging sensor disposed within the mount unit, wherein the fourth imaging sensor has a focal axis passing through the aperture in the mount unit, wherein the fourth imaging sensor generates a fourth image area comprising a fourth data array of pixels, wherein the third and fourth imaging sensors are offset to have a second image overlap area in the target area, wherein the third sensors image data bisects the fourth sensors image data in the second image overlap area.

4. The system of claim 3, wherein a first sensor array comprising the first and second image sensors and a second sensor array comprising the third and fourth image sensors are offset to have a third image overlap area in the target area, wherein the first sensor arrays image data bisects the second sensor arrays image data in the third overlap area.

5. The system of claim 3, wherein the first sensors arrays image data completely overlaps the second sensors arrays image data.

6. The system of claim 3, wherein third and fourth imaging sensors are selected from the group consisting of digital cameras, *light detection and ranging* (LIDAR), infrared, heat-sensing and gravitometers.

7. The system of claim 3, wherein the first and second imaging sensors are a digital camera and the third imaging sensor is a *light detection and ranging* (LIDAR).

8. The system of claim 2, wherein the third imaging sensor is selected from the group consisting of digital cameras, *light detection and ranging* (LIDAR), infrared, heat-sensing and gravitometers.

9. The system of claim 2, wherein the third imaging sensor is selected from the group consisting of a digital camera having a hyperspectral filter and a *light detection and ranging* (LIDAR).

10. The system of claim 2, wherein the first and second imaging sensors are a digital camera and the third imaging sensor is a *light detection and ranging* (LIDAR).

11. The system of claim 1, wherein the mount unit flexes less than 100th of a degree during operation.

12. The system of claim 11, wherein the mount unit flexes less than 1,000th of a degree during operation.

13. The system of claim 12, wherein the mount unit flexes less than 10,000th of a degree during operation.

14. The system of claim 1, wherein the first imaging sensor is calibrated relative to one or more attitude measuring devices selected from the group consisting of a gyroscope, an *inertial measurement unit* (IMU), and a *global positioning system* (GPS).

15. The system of claim 1, wherein the first and second imaging sensors are selected from the group consisting of digital cameras, *light detection and ranging* (LIDAR), infrared, heat-sensing and gravitometers.

16. An imaging sensor system comprising:

a mount unit in alignment with a target area, having at least two imaging sensors disposed within the mount unit, wherein a first imaging sensor and a second imaging sensor each has a focal axis passing through an aperture in the mount unit, wherein the first imaging sensor generates a first image area comprising a first data array of pixels and the second imaging sensor generates a second image area comprising a second data array of pixels, wherein the first and second imaging sensors are offset to have a first image overlap area in the target area, wherein the first sensors image data bisects the second sensors image data in the first image overlap area.

17. The system of claim 16 further comprising:

a third imaging sensor disposed within the mount unit, wherein the third imaging sensor has a focal axis passing through the aperture in the mount unit, wherein the third imaging sensor generates a third image area comprising a third data array of pixels.

18. The system of claim 17 further comprising:

a fourth imaging sensor disposed within the mount unit, wherein the fourth imaging sensor has a focal axis passing through the aperture in the mount unit, wherein the fourth imaging sensor generates a fourth image area comprising a fourth data array of pixels, wherein the third and fourth imaging sensors are offset to have a second image overlap area in the target area, wherein the third sensors image data bisects the fourth sensors image in the second image overlap area.

19. The system of claim 18, wherein a first sensors array comprising the first and the second image sensor and a second sensors array comprising the third and the fourth image sensor are offset to have a third image overlap area in the target area, wherein first sensor arrays image data bisects the second sensor arrays image data in the third image overlap area.

20. The system of claim 18, wherein the first sensors arrays image data completely overlaps the second sensors arrays image data.

21. The system of claim 18, wherein the third and fourth imaging sensors are selected from the group consisting of digital cameras, *light detection and ranging* (LIDAR), infrared, heat-sensing and gravitometers.

22. The system of claim 18, wherein the first and second imaging sensors are a digital camera and the third imaging sensor is a *light detection and ranging* (LIDAR).

23. The system of claim 17, wherein the third imaging sensor is selected from the group consisting of digital cameras, *light detection and ranging* (LIDAR), infrared, heat-sensing and gravitometers.

24. The system of claim 17, wherein the third imaging sensor is selected from the group consisting of a digital camera having a hyperspectral filter and a *light detection and ranging* (LIDAR).

25. The system of claim 17, wherein the first and second imaging sensors are a digital camera and the third imaging sensor is a *light detection and ranging* (LIDAR).

26. The system of claim 16, wherein the mount unit flexes less than 100th of a degree during operation.

27. The system of claim 26, wherein the mount unit flexes less than 1,000th of a degree during operation.

28. The system of claim 27, wherein the mount unit flexes less than 10,000th of a degree during operation.

29. The system of claim 16, wherein the first imaging sensor is calibrated relative to one or more attitude measuring devices selected from the group consisting of a gyroscope, an *inertial measurement unit* (IMU), and a *global positioning receiver* (GPS).

30. The system of claim 16, wherein the first and second imaging sensors are selected from the group consisting of digital cameras, *light detection and ranging* (LIDAR), infrared, heat-sensing and gravitometers.

31. A method of calibrating imaging sensors comprising the steps of:

performing an initial calibration of the imaging sensors comprising:

determining the position of an *attitude measurement unit* (AMU) selected from the group consisting of a gyroscope, an *inertial measurement unit* (IMU), and a *global positioning system* (GPS);

determining the position of a first imaging sensor within a rigid mount unit relative to the AMU;

determining the position of a second imaging sensor within the rigid mount unit relative to the AMU;

calibrating the first imaging sensor against a target area and determining a boresight angle of the first imaging sensor; and calculating the position of one or more subsequent imaging sensors within the rigid mount unit relative to the first imaging sensor; and calibrating the one or more subsequent imaging sensors using the boresight angle of the first imaging sensor; and using oversampling techniques to update at least one initial calibration parameter of the first imaging sensor against a target area and the boresight angle of the first imaging sensor;

using oversampling techniques to update the position of one or more subsequent imaging sensors within the rigid mount unit relative to the first imaging sensor; and updating at least one calibration parameter of one or more subsequent imaging sensors within the rigid mount using the updated boresight angle of the first imaging sensor.

32. The method of claim 31, wherein the initial calibration step further comprises the step of:

calibrating the second imaging sensor using the updated boresight angle of the first imaging sensor.

33. The method of claim 32, further comprising the step of:

using oversampling techniques to update the position of the second imaging sensor within the rigid mount unit relative to the first imaging sensor.

34. The method of claim 31, further comprising the steps of:

using flight line oversampling techniques to update the calibration of the first imaging sensor against a target area and the boresight angle of the first imaging sensor; and using flight line oversampling techniques to update the position of one or more subsequent imaging sensors within the rigid mount unit relative to the first imaging sensor.

35. The method of claim 34, further comprising the steps of:

using flight line oversampling techniques to update the position of the second imaging sensor within the rigid mount unit relative to the first imaging sensor;

using flight line oversampling techniques to update the position of one or more subsequent imaging sensors within the rigid mount unit relative to the first imaging sensor; and updating at least one calibration parameter of one or more subsequent imaging sensors within the rigid mount using the updated boresight angle of the first imaging sensor.

36. A system for generating a map of a surface, comprising:

a global position receiver;

a global positioning antenna;

an imaging array, having a view of the surface, comprising:

a mount unit;

an aperture, formed in the mount unit;

a first imaging sensor, coupled to the mount unit, having a first focal axis passing through the aperture, wherein the first image sensor generates a first image area of the surface comprising a first data array of pixels, wherein the first data array of pixels is at least two dimensional; and a second imaging sensor, coupled to the mount unit and offset from the first imaging sensor, having a second focal axis passing through the aperture and intersecting the first focal axis, wherein the second imaging sensor generates a second image area of the surface comprising a second data array of pixels, wherein the second data array of pixels is at least two dimensional; and a computer, connected to the global positioning antenna, and first and second imaging sensors; correlating at least a portion of the image area from the first and second imaging sensors to a portion of the surface based on input from the global positioning antenna.

37. The system of claim 36, further comprising a third imaging sensor, coupled to the mount unit and offset from the first imaging sensor, having a third focal axis passing through the aperture and intersecting the first focal axis within an intersection area.

38. The system of claim 37, wherein the focal axes of the third imaging sensor lies in a common plane with the focal axes of the first and second imaging sensors.

39. The system of claim 37, wherein the focal axes of the first and second imaging sensors lie in a first common plane and the focal axis of the third imaging sensor lies in a plane orthogonal to the first common plane.

[40. A system for generating a map of a surface, comprising:

a global position receiver;

a global positioning antenna;

a first imaging sensor, having a view of the surface, having a focal axis disposed in the direction of the surface, wherein the first imaging sensor generates an image area comprising a first data array of pixels, wherein the first data array of pixels is at least two dimensional; and a computer, connected to the global positioning antenna, and the first imaging sensor; generating a calculated longitude and calculated latitude value for a coordinate corresponding to at least one pixel in the array based on input from the global positioning antenna.]

41. A system for generating a map of a target area, comprising:

a global position receiver;

a global positioning antenna;

an imaging sensor system, having a view of the target area, comprising:

a mount unit, having a first and second imaging sensor disposed within the mount unit, wherein the first and second imaging sensors each have a focal axis passing through an aperture in the mount unit, wherein the first imaging sensor generates a first image area comprising a first data array of pixels and second imaging sensor generates a second image area comprising a second data array of pixels, wherein the first and second data array of pixels is at least two dimensional; and a computer in communication with the global positioning antenna, the first imaging sensor, and the second imaging sensor; correlating at least a portion of the image area from the first imaging sensor and the second imaging sensor to a portion of the target area based on input from the global positioning antenna.

42. The system of claim 41, further comprising a third imaging sensor disposed within the mount unit, wherein the third imaging sensor has a focal axis passing through an aperture in the mount unit, wherein the third imaging sensor generates a third image area comprising a third data array of pixels.

43. An imaging sensor system comprising:

a mount unit, having a first and second imaging sensors disposed within the mount unit, wherein the first imaging and second imaging sensors each have a focal axis passing through an aperture in the mount unit, wherein the first imaging sensor generates a first image area comprising a first data array of pixels and the second imaging sensor generates a second image area comprising a second data array of pixels, wherein the first and second data array of pixels is at least two dimensional.

44. The system of claim 43, further comprising a third imaging sensor disposed within the mount unit, wherein the third imaging sensor has a focal axis passing through an aperture in the mount unit, wherein the third imaging sensor generates a third image area comprising a third data array of pixels.

*45. A system for generating a map of a target area, comprising:*

*a global positioning receiver;*

*an imaging sensor system having a view of the target area, comprising:*

*a rigid mount unit having a first imaging sensor and a second imaging sensor,*

*wherein the first imaging sensor generates a first image area comprising a first data array of pixels and the second imaging sensor generates a second image area comprising a second data array of pixels,*

*wherein the first and second imaging sensors are offset to have a first image overlap area in the target area,*

*wherein the first data array of pixels bisects the second data array of pixels in the first image overlap area; and*

*a computer in communication with the global positioning receiver, the first imaging sensor, and the second imaging sensor, wherein at least a portion of the first image area from the first imaging sensor is correlated to a portion of the target area based on input from the global positioning receiver or other geographical positioning technique.*

*46. The system of claim 45, wherein the first image overlap area comprises at least one oversampling pattern.*

*47. The system of claim 46, wherein the at least one oversampling pattern comprises a plurality of pixels that have been positioned using an oversampling technique to a precision that is less than one pixel in magnitude.*

*48. The system of claim 47, wherein the mount unit flexes less than 100th of a degree during operation.*

*49. The system of claim 47, wherein the mount unit flexes less than 1,000th of a degree during operation.*

*50. The system of claim 47, wherein the mount unit flexes less than 10,000th of a degree during operation.*

*51. An imaging sensor system comprising:*

*a rigid mount unit in alignment with a target area;*

*a first imaging sensor rigidly connected to the mount unit, wherein the first imaging sensor generates a first image area comprising a first data array of pixels;*

*a second imaging sensor rigidly connected to the mount unit, wherein the second imaging sensor generates a second image area comprising a second data array of pixels;*

*wherein the first and second imaging sensors are offset to have a first image overlap area in the target area,*

*wherein the first data array of pixels bisects the second data array of pixels in the first image overlap area.*

*52. The system of claim 51, wherein the first image overlap area comprises at least one oversampling pattern.*

*53. The system of claim 52, wherein the at least one oversampling pattern comprises a plurality of pixels that have been positioned using an oversampling technique to a precision that is less than one pixel in magnitude.*

*54. A method of calibrating imaging sensors comprising the steps of:*

*performing an initial calibration of the imaging sensors comprising:*

*determining the position of an attitude measurement unit (AMU) selected from the group consisting of a gyroscope, an inertial measurement unit (IMU), and a global positioning system (GPS);*

*determining the position of a first imaging sensor relative to the AMU;*

*calibrating the first imaging sensor against a target area and determining a boresight angle of the first imaging sensor; and*

*determining the position of the second imaging sensor relative to the first imaging sensor; and*

*calibrating the second imaging sensor using the boresight angle of the first imaging sensor; and*

*using oversampling techniques to update at least one initial calibration parameter of the first imaging sensor against a target area and the boresight angle of the first imaging sensor;*

*using oversampling techniques to update the position of the second imaging sensor relative to the first imaging sensor; and*

*updating at least one calibration parameter of the second imaging sensor using the updated boresight angle of the first imaging sensor.*

*55. The method of claim 54, wherein the oversampling techniques comprise flight line oversampling.*

*56. The method of claim 54, wherein the oversampling techniques comprise lateral oversampling.*

*57. The method of claim 54, wherein the oversampling techniques comprise generating at least one pixel that has been positioned using the oversampling techniques to a precision that is less than one pixel in magnitude.*

*58. The method of claim 54, wherein the oversampling techniques comprise generating a plurality of pixels that have been positioned using the oversampling techniques to a precision that is less than one pixel in magnitude.*

*59. A system for generating an image of a surface, comprising:*

*a global position receiver;*

*an imaging array, having a view of the surface, comprising:*

*a mount unit;*

*a first imaging sensor, coupled to the mount unit, having a first focal axis passing through an aperture in the mount unit,*

*wherein the first image sensor generates a first image area of the surface comprising a first data array of pixels,*

*wherein the first data array of pixels is at least two dimensional; and*

*a second imaging sensor, coupled to the mount unit and offset from the first imaging sensor, having a second focal axis passing through an aperture in the mount unit,*

*wherein the second imaging sensor generates a second image area of the surface comprising a second data array of pixels,*

*wherein the second data array of pixels is at least two dimensional; and*

*a computer, connected to the global position receiver, the first imaging sensor, and the second imaging sensor, wherein at least a portion of the first image area from the first imaging sensor is correlated to a portion of the surface based on input from the global position receiver.*

*60. The system of claim 59, wherein the mount unit flexes less than 100th of a degree during operation.*

*61. The system of claim 59, wherein the mount unit flexes less than 1,000th of a degree during operation.*

*62. The system of claim 59, wherein the mount unit flexes less than 10,000th of a degree during operation.*

*63. A system for generating an image of a surface, comprising:*

*a global position receiver;*

*a first imaging sensor adapted to view a surface and disposed at least partially in a mount unit, wherein the mount unit flexes less than 100th of a degree during operation,*

*wherein the first imaging sensor generates a first image area comprising a first data array of pixels,*

*wherein the first data array of pixels is at least two dimensional; and*

*a computer connected to the global position receiver and the first imaging sensor, wherein a calculated longitude value and a calculated latitude value are generated for at least one pixel in the first data array of pixels based on input from the global position receiver.*

*64. The system of claim 63, wherein the mount unit flexes less than 1,000th of a degree during operation.*

*65. The system of claim 63, wherein the mount unit flexes less than 10,000th of a degree during operation.*

*66. A system for generating an image, comprising:*

*a rigid mount unit;*

*a first imaging sensor disposed at least partially within the rigid mount unit, wherein the first imaging sensor generates a first image area comprising a first two-dimensional data array of pixels;*

*a second imaging sensor disposed at least partially within the rigid mount unit, wherein the second imaging sensor generates a second image area comprising a second two-dimensional data array of pixels;*

*wherein the first imaging sensor and the second imaging sensor are offset such that the first image area overlaps with the second image area to form a first image overlap area;*

*a computer in communication with the first imaging sensor and the second imaging sensor;*

*a mosaicking module associated with the computer for balancing the color of the second two-dimensional data array of pixels based on the average intensity of green-dominant pixels in the first two-dimensional data array of pixels.*

*67. The system of claim 66, wherein the first image overlap area comprises at least one oversampling pattern.*

*68. The system of claim 67, wherein the at least one oversampling pattern comprises a plurality of pixels that have been positioned using an oversampling technique to a precision that is less than one pixel in magnitude.*

*69. The system of claim 66, wherein the mount unit flexes less than 100th of a degree during operation.*

*70. The system of claim 66, wherein the mount unit flexes less than 1,000th of a degree during operation.*

*71. The system of claim 66, wherein the mount unit flexes less than 10,000th of a degree during operation.*

*72. An imaging sensor system comprising:*

*a rigid mount unit;*

*a first imaging sensor disposed at least partially within the rigid mount unit, wherein the first imaging sensor generates a first image area comprising a first two-dimensional data array of pixels;*

*a second imaging sensor disposed at least partially within the rigid mount unit, wherein the second imaging sensor generates a second image area comprising a second two-dimensional data array of pixels;*

*wherein the first imaging sensor and the second imaging sensor are offset such that the first image area overlaps with the second image area to form a first image overlap area;*

*a computer in communication with the first imaging sensor and the second imaging sensor; and*

*an intensity balancing module associated with the computer for balancing the intensity of the first two-dimensional data array of pixels and the second two-dimensional data array of pixels using a balancing correlation matrix.*

*73. The system of claim 72, wherein the first image overlap area comprises at least one oversampling pattern.*

*74. The system of claim 73, wherein the at least one oversampling pattern comprises a plurality of pixels that have been positioned using an oversampling technique to a precision that is less than one pixel in magnitude.*

*75. The system of claim 72, wherein the mount unit flexes less than 100th of a degree during operation.*

*76. The system of claim 72, wherein the mount unit flexes less than 1,000th of a degree during operation.*

*77. The system of claim 72, wherein the mount unit flexes less than 10,000th of a degree during operation.*

* * * * *